(12) United States Patent
Yamaguchi et al.

(10) Patent No.: US 7,033,497 B1
(45) Date of Patent: Apr. 25, 2006

(54) FILTER CARTRIDGE

(75) Inventors: Osamu Yamaguchi, Moriyama (JP);
Shigenori Fukuda, Shiga-ken (JP);
Hideo Nobuhara, Otsu (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/937,129

(22) PCT Filed: Mar. 30, 2000

(86) PCT No.: PCT/JP00/01998

§ 371 (c)(1),
(2), (4) Date: Sep. 20, 2001

(87) PCT Pub. No.: WO00/57988

PCT Pub. Date: Oct. 5, 2000

(30)    Foreign Application Priority Data

| Mar. 30, 1999 | (JP) | ................. | 11-088794 |
| May 14, 1999 | (JP) | ................. | 11-133690 |
| Jun. 18, 1999 | (JP) | ................. | 11-172881 |
| Jul. 22, 1999 | (JP) | ................. | 11-207123 |
| Aug. 18, 1999 | (JP) | ................. | 11-231616 |

(51) Int. Cl.
*B01D 27/06*      (2006.01)
*B01D 27/14*      (2006.01)

(52) U.S. Cl. ............. 210/315; 210/489; 210/493.4; 210/497.1

(58) Field of Classification Search ......... 210/315–317, 210/498, 489–491, 497.1, 493.4, 497.01
See application file for complete search history.

(56)          References Cited

U.S. PATENT DOCUMENTS

| 3,334,752 | A | * | 8/1967 | Matravers | ................. | 210/457 |
| 3,532,800 | A |   | 10/1970 | Wyly et al. | | |
| 3,834,547 | A | * | 9/1974 | Renjilian | ................. | 210/497.1 |
| 4,100,009 | A |   | 7/1978 | Nakajima et al. | | |
| 4,278,551 | A |   | 7/1981 | Hou et al. | | |
| 5,652,041 | A | * | 7/1997 | Buerger et al. | ............. | 428/198 |
| 5,721,180 | A | * | 2/1998 | Pike et al. | ................. | 442/346 |
| 6,090,731 | A | * | 7/2000 | Pike et al. | ................. | 442/409 |

FOREIGN PATENT DOCUMENTS

| EP | 0 307 234 | 3/1989 |
| EP | 0 313 920 | 5/1989 |
| EP | 0 466 381 | 1/1992 |
| JP | 54-36878 | 3/1979 |
| JP | 56-43139 | 10/1981 |
| JP | 62-87712 | 6/1987 |
| JP | 1-25607 | 5/1989 |
| JP | 1-115423 | 5/1989 |
| JP | 1-317513 | 12/1989 |
| JP | 3-52090 | 11/1991 |
| JP | 4-45810 | 2/1992 |
| JP | 4-45811 | 2/1992 |
| JP | 4-30007 | 3/1992 |

(Continued)

OTHER PUBLICATIONS

Machine–Assisted Translation of JP5–2715–U.*

*Primary Examiner*—Matthew O. Savage
(74) *Attorney, Agent, or Firm*—Merchant & Gould P.C.

(57)          ABSTRACT

A filter cartridge formed by winding, in a twill construction, a band-shaped unwoven cloth, which contains thermoplastic fibers and at least a part of its fiber intersections are stuck thereon, so that a cylindrical shape can be obtained, wherein 1. two types of filtrating layers are used, 2. unwoven cloth having opening hole parts is used, 3. an end face seal part is provided on both end parts of the cartridge, 4. unwoven cloth having a tongue piece part is used, or 5. two or more pieced of unwoven cloth are wound simultaneously, whereby those characteristic of the filter cartridge such as liquid permeability, filterable life, and stability of filtration accuracy can be kept in balance with each other.

9 Claims, 21 Drawing Sheets

FOREIGN PATENT DOCUMENTS

| | | |
|---|---|---|
| JP | 4-126508 | 4/1992 |
| JP | 4-131412 | 12/1992 |
| JP | 4-131413 | 12/1992 |
| JP | 5-2715 | 1/1993 |
| JP | 5-9055 | 3/1993 |
| JP | 5-18614 | 3/1993 |
| JP | 6-7767 | 3/1994 |
| JP | 6-262013 | 9/1994 |
| JP | 7-60034 | 3/1995 |
| JP | 7-82649 | 3/1995 |
| JP | 7-328356 | 12/1995 |
| JP | 8-29206 | 3/1996 |
| JP | 2509265 | 6/1996 |
| JP | 10-174822 | 6/1998 |
| JP | 2000-279727 | 10/2000 |

* cited by examiner (A)    (B)    (C)

(A)　　　　　(B)　　　　　(C)

(A)　　　　　(B)　　　　　(C)

(A)    (B)

(A)    (B)

FILTER CARTRIDGE

TECHNICAL FIELD

The present invention relates to a filter cartridge useful for filtering a liquid, specifically to a filter cartridge having a high accuracy and a long filtering life, prepared by winding a strip of nonwoven comprising a thermoplastic fiber obtained by bonding at least a part of fiber intersections in a twill form so as to make a cylindrical form.

BACKGROUND ART

Various filters for clarifying a fluid are presently developed and produced. Among them, cartridge-type filters (hereinafter abridged as filter cartridges) are widely used in the industrial field, for example, for removing suspended particles in industrial liquid materials, removing cakes flowing out of a cake filtering apparatus and clarifying industrial water.

Several kinds of structures of a filter cartridge have so far been proposed. The most typical one is a bobbin winder-type filter cartridge, which is a cylindrical filter cartridge prepared by winding a spun yarn as a filter material on a perforated cylinder in a twill form and then fluffing the spun yarn. This type has long been used due to inexpensiveness and easiness in production. Another type of structure includes a nonwoven-laminated type filter cartridge. This is a cylindrical filter cartridge prepared by winding several kinds of nonwovens such as a carding nonwoven stepwise and concentrically on a perforated cylinder. A recent advanced technique in a nonwoven production has allowed some of them to be put to practical use.

However, the above-mentioned filter cartridges have several defects. For example, in the bobbin winder-type filter cartridge for trapping particles by means of fluffs of fluffed spun yarns and also in gaps of the spun yarns, it is difficult to control the size and form of the fluffs and gaps. This limits size and amount of the particles that can be trapped.

Further, an end face of a conventional bobbin winder type filter cartridge stays in a state that spun yarns are, so to speak, arranged and therefore is inferior in smoothness. Also, the yarns have to be wound tightly in order to prevent the yarns from being untied, so that the end face is hardened as well, and bite thereof into an edge of the housing is deteriorated, which has resulted in an inferior sealing property.

Several measures have so far been taken in order to solve such defects. To thermally bond an end face of a filter is one method. This thermal bonding of the end face has avoided untying of the yarns in a filter cartridge, but this is mainly effective just for preventing the yarns from being untied, and problems still remain unsolved in respect of smoothness and a sealing property of the end face as described above.

JP-U 4-87717 discloses a method in which a synthetic resin film wound on both end faces in the periphery of the filter is used as a binder, in order to prevent a cushioning material from being peeled in filtering paints. However, this method is used merely to solve the problem of rolling up of a glass fiber nonwoven caused in winding spun yarns, and not to solve all the problems described above.

Another method is one in which a cushioning material is adhered to an end face of a filter. In this method, a binder of a low density polyethylene film, a low molecular weight polypropylene or an ethylene-vinyl acetate copolymer resin is used to adhere a cushioning material such as foamed polyethylene, foamed polypropylene or ethylene propylene rubber. This method can be used to solve the problems of smoothness and sealing property of the end face. However, addition of such new materials restricts the use conditions of the filter, for example, the temperature condition and the chemical resistance of three materials i.e., a filter material, a cushioning material and a binder material, and therefore the filter is difficult to use in every fields. In particular, as the binders are mostly inferior in heat resistance and chemical resistance, they have sometimes experienced peeling off depending on the use conditions. Further, many of binders for such uses usually contains low molecular weight components, and therefore are problematic when used for general industries as well as medicines and foods.

JP-B 8-29206 discloses a method in which a thermoplastic sheet is bonded to an end face of a filter element comprising a thermoplastic synthetic fiber by means of a hot plate. However, this method is used to bring out a maximum sealing property at an end part of the original filter element, and if the original filter element is short of a potential sealing property (for example, flexibility), the method has not necessarily been satisfactory.

In a filter in which a broad nonwoven is wound around a perforated cylinder in layers as shown in FIG. 1, a so-called nonwoven-laminated type filter cartridge, its performance depends on the kind of nonwovens used. A nonwoven is produced mostly by a method in which short fibers are confounded by means of a carding machine or an air laid machine and then subjecting them, if necessary, to heat treatment by means of a hot air heater or a heating roll, or a method in which a nonwoven is directly prepared, such as a melt blowing method and a spun bonding method. However, any machines used for producing nonwovens, such as a carding machine, an air laid machine, a hot air heater, a heating roll, a melt blowing machine and a spun bonding machine, may often cause, for example, unevenness of a mass per unit area of a nonwoven in a machine direction. Accordingly, a filter cartridge produced will be inferior in quality.

Further, Japanese Utility Model Publication No. 7767/1994 proposes a filter cartridge in which a filter material obtained by squashing a tape-shaped paper having porosity while twisting, thereby squeezing it to control a diameter thereof to about 3 mm is wound around a porous internal cylinder in a close twill. This method is advantageous in that a winding pitch can be gradually increased from the porous internal cylinder toward the outside. However, the filter material needs to be squashed and squeezed, so that particles are trapped primarily between the winding pitches of the filter material. Accordingly, it is less expected to trap particles by filter materials itself as is the case of a conventional bobbin winder type filter using spun yarns which traps particles by means of fluffs. This blocks the surface of the filter to shorten the filter life or brings about the poor liquid-permeability in a certain case.

Proposed as another method, JP-A 1-115423 proposes a filter in which strings obtained by slitting a cellulose spun bonded nonwoven into strips and passing them through narrow holes to twist them are wound around a bobbin having a lot of drilled pores. It is considered that this method shall make it possible to prepare a filter having a higher mechanical strength and being free of dissolution in water and elution of a binder, as compared with a conventional roll tissue filter prepared by winding tissue paper in a roll form, which is produced from α-cellulose prepared by refining a coniferous pulp. However, the cellulose spun bonded nonwoven used for this filter has a papery form and thus a too high rigidity, and is liable to swell in a liquid. Swelling may bring about various problems such as a decrease in a filter strength, a change in a filtering accuracy, a deterioration in liquid-permeability, a reduction in a filter life and the like. Adhesion at fiber intersections of the cellulose spun bonded nonwoven is mostly conducted by a certain chemical treatment. Such adhesion is often unsatisfactory, causing a change in a filtering accuracy or falling of fiber chips, so that a stable filtering performance is difficult to achieve.

Further, JP-A 4-45810 proposes a filter prepared by winding a slit nonwoven comprising composite fibers in which 10% by weight or more of structural fibers is split into 0.5 denier or less on a porous core cylinder so that the fiber density becomes 0.18 to 0.30 (g/cm$^3$). It is supposed that use of this method makes it possible to trap fine particles contained in a liquid by means of fibers having a small fineness. However, a physical stress has to be applied by means of high pressure water in order to split the composite fibers, and it is difficult to split evenly them all over the nonwoven by processing with high pressure water. Further, heterogeneous splitting lowers a strength of the nonwoven in a certain case. This may reduce strength of the resulting filter, so that the filter is liable to be deformed during use or the void rate of the filter is varied, so that the liquid-permeability is reduced.

On the other hand, separately from the methods described above, it has been attempted to raise a filtering performance by providing the filter with a multilayer structure. For example, JP-U 4-131412, JP-U 4-131413 and JP-U 5-2715 disclose a method for preparing a cylindrical cartridge filter comprising several layers by using a nonwoven comprising extra fine fibers which are obtained by splitting splittable composite fibers. These layer structures are a structure comprising a nonwoven-wound layer comprising extra fine fibers and a spun yarn layer (JP-U 4-131412), a structure comprising a slit nonwoven-wound layer comprising extra fine fibers, a layer prepared by winding a slit nonwoven and a yarn in combination and a spun yarn-wound layer (JP-U 4-131413) and a structure comprising a slit nonwoven-wound layer comprising extra fine fibers and a slit nonwoven-wound layer having a fiber diameter twice or more large as that of the above layer (JP-U 5-2715). All these filters having a multilayer structure are expected to extend the filtering life longer than those comprising a single layer structure. However, the problem caused by using split fibers as described above has not yet been solved.

Further, JP-U 4-30007 discloses a filter element having a two-layer structure comprising a core having a lot of communicating holes, a pleated filter prepared by folding many times a surface filter material in the periphery thereof to make it endless and a bobbin winder filter in the periphery thereof. However, spun yarns are used in this filter element, and therefore the problem caused by using the spun yarns as described above has not yet been solved.

An object of the present invention is to provide a filter cartridge which is excellent in filtering performances such as a liquid-permeability, a filtering accuracy and a filter life and in which fallen filter materials and other particles are not mixed in a filtrate and which can solve the problems of a smoothness of an end face and an inferior sealing property caused by a shortage in flexibility in sealing.

DISCLOSURE OF THE INVENTION

Intensive investigations repeated by the present inventors have resulted in finding that the object described above can be achieved by a filter cartridge produced based on the concept that a strip of nonwoven comprising a thermoplastic fiber prepared by bonding at least a part of the fiber intersections is wound in a twill form so that a cylindrical form is obtained, and the finding thus has led to completion of the present invention.

The present invention is composed of five inventions described below, when roughly classified.

The following items constitute the first invention.

(1) A filter cartridge prepared by winding a strip of nonwoven comprising a thermoplastic fiber obtained by bonding at least a part of the fiber intersections in a twill form so as to make a cylindrical form, wherein a filtration layer comprises a first filtration layer and a second filtration layer; the first filtration layer comprises a filament nonwoven; and an initial 80% trapped particle diameter in the second filtration layer is 0.05 to 0.9 time as large as an initial 80% trapped particle diameter in the first filtration layer.

(2) The filter cartridge as described in the item (1), wherein the strip of filament nonwoven is turned into a pleated matter having 4 to 50 pleats and wound around a perforated cylinder in a twill form.

(3) The filter cartridge as described in the item (2), wherein at least a part of the pleats of the pleated matter is arranged in non-parallel.

(4) The filter cartridge as described in the item (2), wherein the pleated matter has a void rate of 60 to 95%.

(5) The filter cartridge as described in any of the items (1) to (4), wherein the first filtration layer of the filter cartridge has a void rate of 65 to 90%.

(6) The filter cartridge as described in the item (1), wherein the second filtration layer is prepared by winding a perforated sheet around a perforated cylinder in a layer form.

(7) The filter cartridge as described in the item (1), wherein the second filtration layer has a two-layer structure comprising a filtration layer (a) prepared by winding a strip of filament nonwoven comprising a thermoplastic fiber prepared by bonding at least a part of fiber intersections around a perforated cylinder in a twill form and a filtration layer (b) in which the strip of filament nonwoven is continuously wound from the filtration layer (a) in a twill form while winding a perforated sheet in a layer form; and the first filtration layer is a filtration layer in which the strip of filament nonwoven is continuously wound from the second filtration layer in a twill form.

(8) The filter cartridge as described in the item (1), wherein the second filtration layer is prepared by folding a perforated sheet around a perforated cylinder in a pleat form and molding it in a cylindrical form.

The following items constitute the second invention.

(9) A filter cartridge prepared by winding a strip of nonwoven having aperture parts and comprising a thermoplastic fiber obtained by bonding at least a part of fiber intersections around a perforated cylinder in a twill form.

(10) The filter cartridge as described in the item (9), wherein the strip of nonwoven having aperture parts is a pleated matter having 4 to 50 pleats.

(11) The filter cartridge as described in the item (9) or (10), wherein the aperture part has an area ratio of 5 to 60% based on the whole area of the strip of nonwoven having aperture parts.

(12) The filter cartridge as described in any of the items (9) to (11), wherein a porous material other than the strip of nonwoven having an aperture part is used for a part of the filtration layer in the filter cartridge.

The following items constitute the third invention.

(13) A filter cartridge prepared by winding a strip of nonwoven comprising a thermoplastic fiber obtained by bonding at least a part of fiber intersections around a perforated cylinder in a twill form, wherein end face-sealed parts are provided at both end parts thereof.

(14) The filter cartridge as described in the item (13), wherein the both end face parts are sealed by melting or softening the strip of nonwoven constituting both end parts of the filter cartridge thereby integrating them with the nonwoven.

(15) The filter cartridge as described in the item (13), wherein the end face-sealed parts are formed by combining a sheet comprising the same resin as at least one of the thermoplastic resins used for the strip of nonwoven constituting both end parts on the surfaces of both end parts of the filter cartridge and melting or softening the sheet, thereby integrating it with the nonwoven.

The following items constitute the forth invention.

(16) A filter cartridge prepared by winding a strip of nonwoven comprising a thermoplastic fiber obtained by bonding at least a part of fiber intersections around a perforated cylinder in a twill form, wherein the nonwoven has a tongue section part.

(17) The filter cartridge as described in the item (16), wherein the tongue section part has an area ratio of 10 to 80% based on the whole area of the strip of nonwoven having a tongue section part.

(18) The filter cartridge as described in the item (16) or (17), wherein a porous material other than the strip of filament nonwoven having a tongue section part is used for a part of the filtration layer in the filter cartridge.

The following items constitute the fifth invention.

(19) A filter cartridge prepared by winding a strip of nonwoven comprising a thermoplastic fiber obtained by bonding at least a part of fiber intersections around a perforated cylinder in a twill form, wherein at least two of the nonwovens comprising a thermoplastic fiber are concurrently wound around the perforated cylinder.

(20) The filter cartridge as described in the item (19), wherein the widths of the strip of nonwoven are designated as $L_1, L_2, L_3 \ldots L_n$ (mm), and the winding numbers of the strip of nonwovens having the respective widths are designated as $N_1, N_2, N_3 \ldots N_n$; the relation between the former and the latter being expressed by the following equation (A):

$$7 \leq (L_1 \times N_1) + (L_2 \times N_2)^+ \ldots + (L_n \times N_n) \leq 150$$

(provided that the total of $N_1 + N_2 + \ldots + N_n$ is an integer of 2 or more).

Further, the following items are common to the inventions described above.

(21) The filter cartridge as described in any of the items (1), (9), (13), (16) and (19), wherein the thermoplastic fiber is a thermally adherent composite fiber comprising a low melting point resin and a high melting point resin, difference in melting point between both resins being 10° C. or more.

(22) The filter cartridge as described in the item (21), wherein the low melting point resin is a linear low density polyethylene and the high melting point resin is a polypropylene.

(23) The filter cartridge as described in any of the items (1), (9), (13), (16) and (19), wherein fiber intersections in the strip of nonwoven are bonded by thermal compression bonding by means of a hot embossing roll.

(24) The filter cartridge as described in any of the items (1), (9), (13), (16) and (19), wherein fiber intersections in the strip of nonwoven are bonded by hot air.

(25) The filter cartridge as described in any of the items (1), (9), (13), (16) and (19), wherein the strip of nonwoven is twisted.

(26) The filter cartridge as described in any of the items (9), (13), (16) and (19), wherein the filtration layer of the filter cartridge has a void rate of 65 to 90%.

(27) The filter cartridge as described in any of the items (9), (13), (16) and (19), wherein the strip of nonwoven comprises at least 30% by weight of the thermoplastic fiber.

(28) The filter cartridge as described in any of the items (1), (9), (13), (16) and (19), wherein the strip of nonwoven has a width of 0.5 cm or more, and a product of a width (cm) and a mass per unit area ($g/cm^2$) of the strip of nonwoven is 200 or less.

(29) The filter cartridge as described in any of the items (9), (13), (16) and (19), wherein the strip of nonwoven is a filament nonwoven.

BEST MODE FOR CARRYING OUT THE INVENTION

The embodiment of the present invention shall specifically be explained below.

Figure 1:
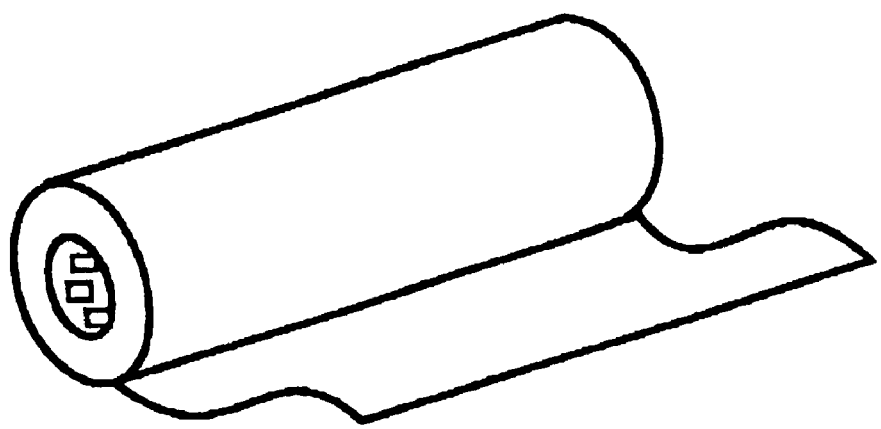
FIG. 1 shows a state in which a nonwoven is wound in a layer form.
Figure 2:
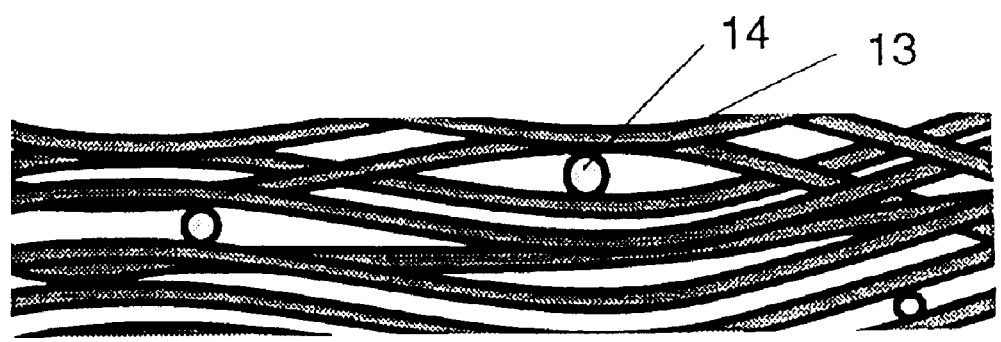
FIG. 2 is a schematic drawing of a spun-laid nonwoven. Code 13 represents a long fiber constituting the spun-laid nonwoven, and code 14 represents a particle.
Figure 3:
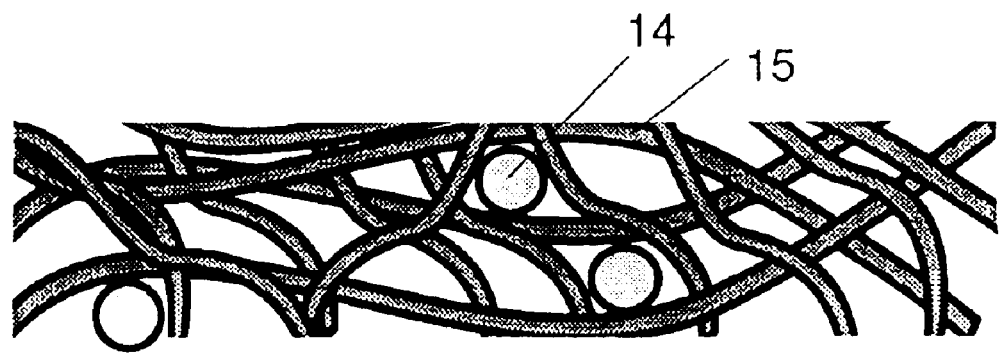
FIG. 3 is a schematic drawing of a staple nonwoven. Code 14 represents a particle, and code 14 represents a staple fiber constituting the staple nonwoven.

The strip of nonwoven used in the present invention is a staple nonwoven or a filament nonwoven. Among them, preferred one is the filament nonwoven, particularly a nonwoven obtained by a spun-laying method. The spun-laying method is a nonwoven production technique in which thermoplastic fibers discharged from a nozzle are sucked and drawn by an air gun, spread on a conveyor and then thermally bonded. A fiber direction of the filament nonwoven obtained by the spun-laying method is aligned to a machine direction as shown in FIG. 2, so that a hole formed by fibers 13 becomes long and narrow, and the maximum passing particle diameter 14 becomes small. In contrast with this, in the case of a nonwoven comprising staple fibers obtained by a carding method, the fiber direction is not fixed as shown in FIG. 3, so that the hole formed by the fibers 15 has a shape close to a circle or a square, and even if it has the same aperture rate as that of the filament nonwoven produced by the spun-laying method, the maximum passing particle diameter 14 becomes large. A water permeability of a filter material is almost decided by an aperture rate if a fiber diameter is the same, and therefore use of the filament nonwoven produced by the spun-laying method provides a filter having an excellent water permeability. This effect is reduced when used is a binder such as an adhesive which blocks the holes of the filter material, so that a cellulose spun-laid nonwoven is not preferably used. Further, use of the cellulose spun-laid nonwoven weakens a strength of the nonwoven, and therefore involved is the problem that when the filtering pressure is elevated due to clogging of the filter, the holes formed by the fibers are liable to be deformed.

Accordingly, the present inventors have researched characteristics of a lot of nonwovens including a filament nonwoven, and as a result thereof, they have found that clouds on a nonwoven are liable to be produced in a machine lateral direction but relatively reduced in a flow direction of the nonwoven. The inventors have further considered the results thereof and found that if a wide nonwoven is cut into strips of 0.5 cm to several (cm), clouds of the nonwoven become negligibly small in a range of a width of each strip. In the process of the present invention described later, it is possible to change filter performances as well by means of a molding method of a filter material, and therefore if the molding conditions are adjusted with considering the balance of the whole physical properties of a strip of nonwoven, clouds in the resulting filter almost disappear. This makes it possible to improve the productivity to a large extent.

When a wide filament nonwoven is slit into a strip of filament nonwoven, the width thereof is different depending on a mass per unit area of the nonwoven used and is preferably 0.5 cm or more. If this width is less than. 0.5 cm, the nonwoven is likely to be cut in slitting, and it becomes difficult to control the tension in winding the strip of nonwoven in a twill form at a later stage. Further, when producing a filter having the same void rate, the winding time is prolonged, and the productivity is reduced. On the other hand, an upper limit of the slit width is varied according to the mass per unit area, and a value of the slit width (cm)×mass per unit area (g/m$^2$) is preferably 200 or less. If the mass per unit area is 20 g/m$^2$, for example, the upper limit of the width is 10 cm. If this value is larger than 200, the nonwoven is increased in rigidity too much, so that it becomes difficult to wind it on a perforated cylinder in a twill form later. Further, the fiber amount grows too large, so that it becomes difficult to wind densely the nonwoven. Also when the spinning width is controlled to produce directly a strip of nonwoven, the preferred ranges of the mass per unit area and the nonwoven width are the same as those in the case where the splits are prepared by slitting. In general, the strip of nonwoven has preferably a width of 0.5 to 20 cm, more preferably 1 to 10 cm.

A mass per unit area of the strip of nonwoven is preferably 5 to 200 g/m$^2$. If this value is smaller than 5 g/m$^2$, the fiber amount is reduced, and therefore cloud in the nonwoven is increased or the strength of the nonwoven is reduced or it becomes difficult in a certain case to thermally bond the fiber intersections. On the other hand, if this value is larger than 200 g/m$^2$, the strip of nonwoven is increased in rigidity too much, so that processing such as winding in a twill form later becomes difficult.

Figure 4:
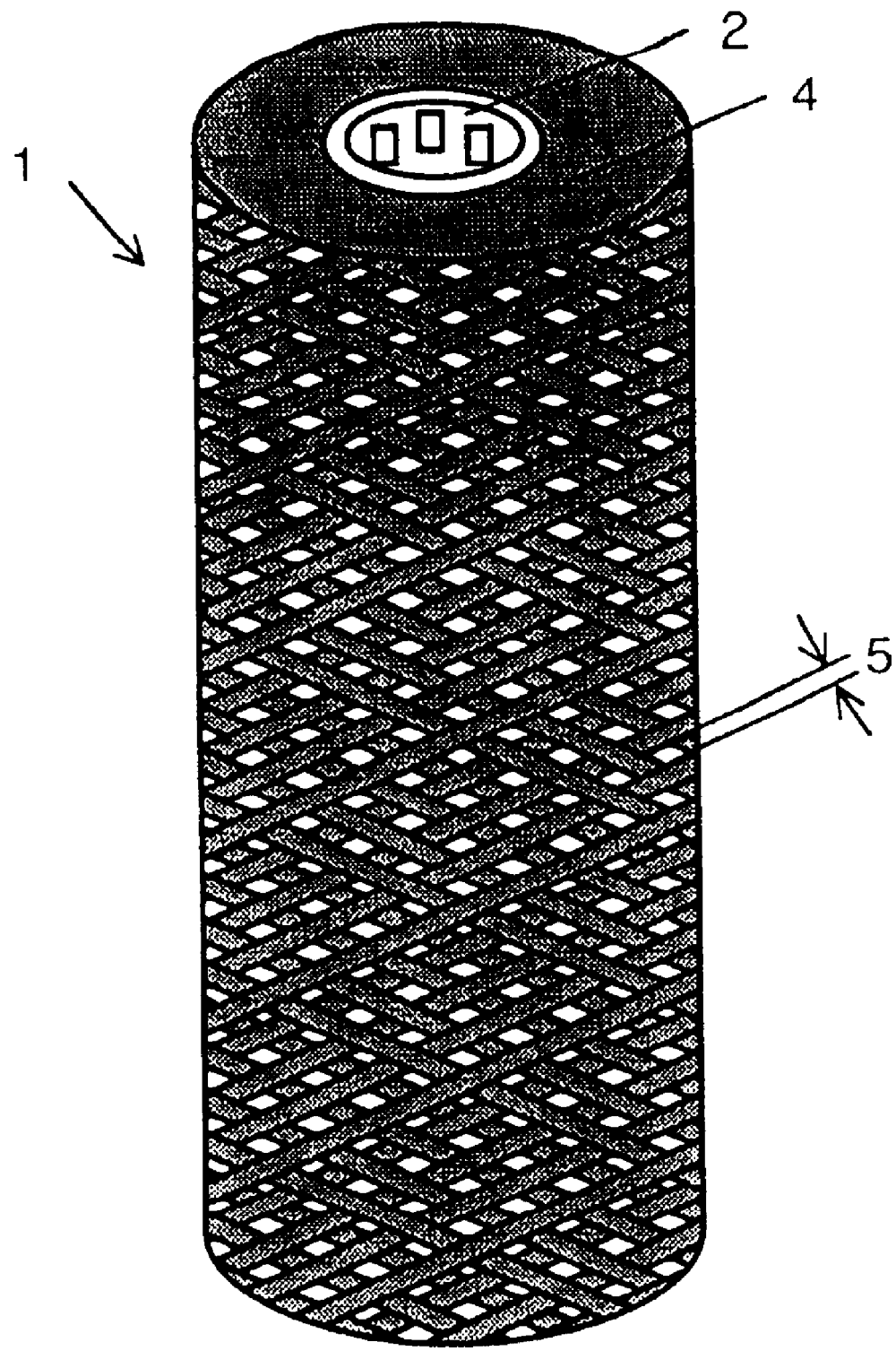
FIG. 4 is an explanatory drawing showing an appearance of the filter cartridge of the present invention. Code 1 represents the filter cartridge; code 2 represents a perforated cylinder; code 4 represents an end face-molten part; and code 5 represents a yarn space.

The perforated cylinder used in the present invention is a part represented by code 2 which functions as a core material for a filter cartridge shown in FIG. 4, and a material and a shape thereof shall not specifically be restricted as long as it has a strength which can stand an external pressure in filtering and a pressure loss is not notably high. It may be, for example, an injection-molded article prepared by processing polyethylene or polypropylene into a net type cylinder as is the case with a core material used for conventional filter cartridges, or it may be an article obtained by processing ceramics or stainless steel in the same manner. Alternatively, other filter cartridges such as a filter cartridge subjected to pleat-folding processing and a filter cartridge of a nonwoven-winding type may be used as the perforated cylinder.

Figure 5:
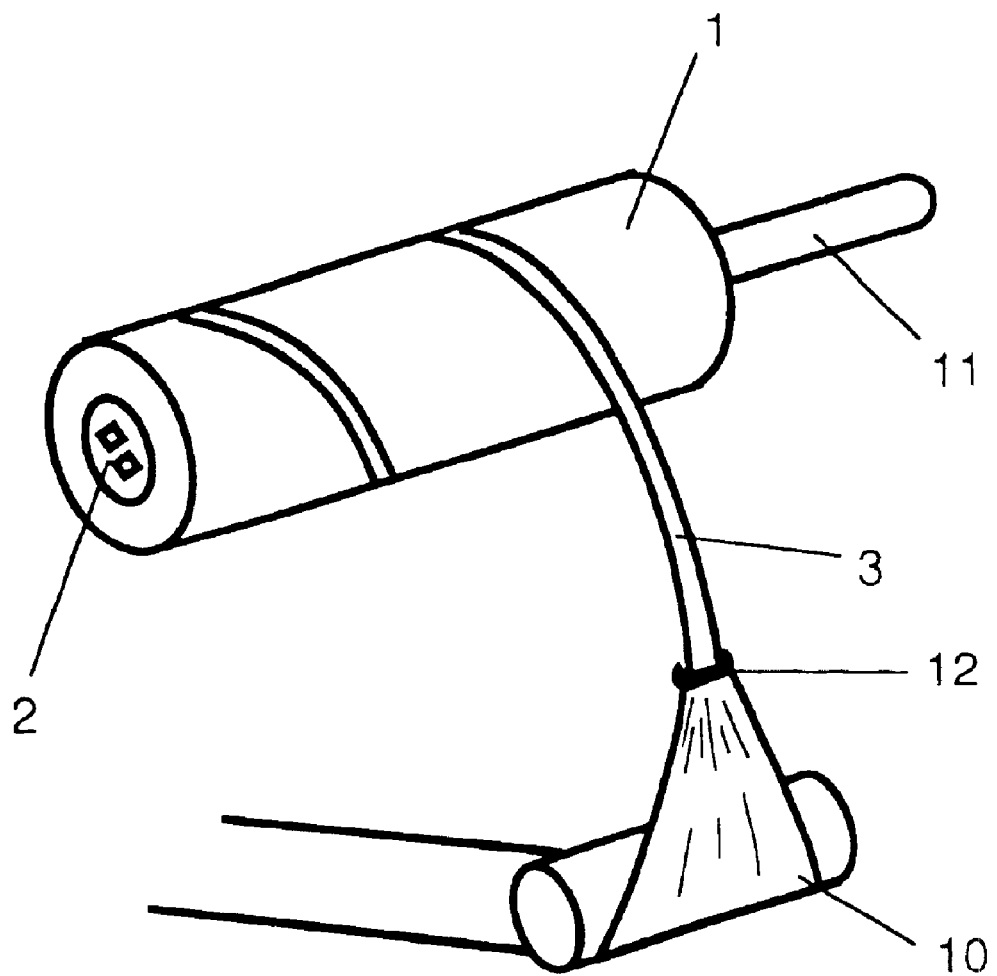
FIG. 5 is an explanatory drawing showing a state in which a strip of nonwoven is wound in a traverse form. Code 1 represents a filter cartridge; code 2 represents a perforated cylinder; code 3 represents a converged nonwoven; code 10 represents a strip of nonwoven; code 11 represents a bobbin; and code 12 represents a traverse guide.

Next, a method for winding the strip of nonwoven around a perforated cylinder shall be explained. One example of the production process thereof is shown in FIG. 5. A winder used for a conventional bobbin winder type filter cartridge can be used for the winder. A perforated cylinder 2 having a diameter of about 10 to 40 mm and a length of 100 to 1000 mm is installed in a bobbin 11 of this winder, and a strip of nonwoven 3 which is converged passing through a yarn passage and a hole of a traverse guide 12 in the winder is wound around the perforated cylinder by one to two rounds. The perforated cylinder may be bonded to an end part of the strip of nonwoven by thermal bonding in order to accurately carry out winding. The yarn passage of the winder is swung in a twill form by means of the traverse guide 12 disposed parallel to the bobbin, so that the strip of nonwoven is swung in a twill form and wound around the perforated cylinder by rotation of the bobbin. A diameter of a hole disposed in the traverse guide 12 depends on a mass per unit area and a width of the strip of nonwoven used and falls preferably in a range of 3 to 10 mm. If this diameter is smaller than 3 mm, friction between the strip of nonwoven and the hole grows large, so that the winding tension becomes too high. On the other hand, if this value is larger than 10 mm, a converged size of the strip of nonwoven is not stabilized.

The winding conditions of the strip of nonwoven can be set up according to those in producing a conventional bobbin winder type filter cartridge. The bobbin initial speed is set to, for example, 1000 to 2000 rpm, and the delivering speed is controlled to wind the nonwoven while applying a suitable tension. A void rate of the filter cartridge can be changed by the tension applied in this case. The tension applied in winding is controlled to densify the void rate in an inside of the filter cartridge, and the nonwoven is wound on an intermediate layer and an external layer while gradually reducing the tension, whereby a density gradient type filter cartridge whose void rate is varied in each of the filtration layers can be obtained as well. In particular, when a strip of nonwoven having aperture parts is turned into a pleated matter and then wound around a perforated cylinder, capable of being provided is a filter cartridge having an ideal filtering structure by deep layer filtration brought about by a difference in rough and dense structures formed in the external layer, the intermediate layer and the internal layer in combination with an increase in a filter area brought about by the pleated matter. Further, the filtering accuracy can be changed as well by controlling a ratio of a traversing speed of the traverse guide to a rotating speed of the bobbin to change the winding pattern. A method used in a conventional bobbin winder type filter cartridge can be used for a patterning method thereof, and when a length of the filter is fixed, the pattern thereof can be shown by the winding number. The winding number means a rotating number of the bobbin 11 counted while the traverse guide moves from one end of the bobbin 11 to the other end thereof. When a space between a certain yarn (the strip of nonwoven in the case of the present invention) and a yarn wound on a layer immediately thereunder is broad, the filtering accuracy is roughened. On the contrary, when it is narrow, the filtering accuracy becomes fine. By these methods, the strip of nonwoven is wound to a diameter of 1.5 to 3 times as large as the major diameter of the perforated cylinder 2 to obtain a shape of filter cartridge. This may be used for the filter cartridge as it is, or an adhesive property of the end face to a housing may be improved by sticking a gasket of foamed polyethylene having a thickness of 3 mm on the end face.

In the present invention, a filtration layer in the cylindrical filter has a void rate falling preferably in a range of 65 to 90%. If the void rate described above is smaller than 65%, the fiber density becomes too high, so that the liquid permeability is reduced. If the void rate described above is larger than 90%, the strength of the cylindrical filter is reduced, and when a filtering pressure is high, a problem of deformation is caused. A method for controlling the void rate described above includes controlling of a tension applied when winding the strip of nonwoven around the perforated cylinder and controlling of a space between the pleat-forming guides.

All thermoplastic resins capable of being melt-spun can be used for the thermoplastic fiber constituting the strip of nonwoven used in the present invention. Examples thereof capable of being presented are thermoplastic resins including polyolefin resins such as polypropylene, low density polyethylene, high density polyethylene, linear low density polyethylene and copolymerized polypropylene (for example, binary or multi-components copolymers comprising propylene as a primary component with ethylene, butene-1,4-methylpentene-1 and the like); polyester resins such as polyethylene terephthalate, polybutylene terephthalate and low melting point polyesters thereof prepared by copolymerizing isophthalic acid added as an acid component in addition to terephthalic acid; polyamide resins such as nylon 6 and nylon 66; polystyrene resins such as atactic polystyrene and syndiotactic polystyrene, polyurethane elastomers, polyester elastomers and polytetrafluoroethylene. Further, functional resins can be used as well, wherein biodegradable resins such as lactic acid polyester are used to provide a filter cartridge with biodegradability. Further, when such resin as polyolefin or polystyrene polymerized using metallocene catalysts are used for the nonwoven of the cartridge filter in the present invention, the obtained nonwoven has an improved strength and improved chemical resistance, and further, the production energy of the cartridge filter can be reduced, and therefore it is preferred. Also, these resins may be used as well in mixed with other resins in order to control a heat adhesive property and a rigidity of the nonwoven. When a filter cartridge is used for filtering an aqueous solution at a room temperature, polyolefin resins including polypropylene out of the above resins are preferably used from the viewpoints of chemical resistance and cost. When used for a solution of a relatively high temperature, polyester resins, polyamide resins or syndiotactic polystyrene resins are preferred.

The thermoplastic fiber used in the present invention is preferably a thermally adherent composite fiber comprising a low melting point resin and a high melting point resin, of which difference in melting point is 10° C. or more, preferably 15° C. or more. Since only a part of a fiber melts during thermal bonding, the shape of the bonded point is smooth and the thermal bonding of the fiber intersections of the nonwoven can be carried out stably. When the resulting nonwoven is used for a filter cartridge, particles trapped in the vicinity of the fiber-bonded points are less likely to flow out when the filtering pressure and the water flow amount are elevated, and the filter cartridge is less deformed. Further, even if the fibers are deteriorated due to substances contained in a filtrate, probability of fiber falling is reduced, and the resin is less likely to be mixed in the filtrate due to breakage of the bonded points.

The melting point difference does not specifically have an upper limit, and it corresponds to a temperature difference between a resin having the highest melting point and a resin having the lowest melting point among the thermoplastic resins capable of being melt-spun. In the case of a resin having no melting point, the flow-starting temperature is defined as the melting point.

A combination of the low melting point resin and the high melting point resin in the thermally adherent composite fiber described above shall not specifically be restricted as long as they have a melting point difference of 10° C. or more, preferably 15° C. or more and includes linear low density polyethylene/polypropylene, high density polyethylene/polypropylene, low density polyethylene/polypropylene, copolymer of propylene with other α-olefin/polypropylene, linear low density polyethylene/high density polyethylene, low density polyethylene/high density polyethylene, any of polyethylenes/thermoplastic polyester, polypropylene/thermoplastic polyester, copolymerized polyester/thermoplastic polyester, any of polyethylenes/nylon 6, polypropylene/nylon 6, nylon 6/nylon 66 and nylon 6/thermoplastic polyester. Among them, a combination of linear low density polyethylene/polypropylene is preferably used since a rigidity and a void rate of the nonwoven can readily be controlled at a step of bonding fiber intersections in producing the nonwoven. When the filter cartridge is used for a solution of a relatively high temperature, a combination of low melting point polyester prepared by copolymerization of isophthalic acid added other than terephthalic acid as an acid component/polyethylene terephthalate can suitably be used as well. Further, two or more mixed resins may be used as either component or both components for the composite fiber.

The strip of nonwoven used in the present invention comprises preferably at least 30% by weight of the thermoplastic resin. It is a matter of fact that the strip of nonwoven may comprise 100% by weight of the thermoplastic resin. If the strip of nonwoven comprises less than 30% by weight of the thermoplastic resin, the strength of the nonwoven is reduced when thermal bonding is carried out by means of thermal compression bonding treatment or through-air heat treatment, and therefore the fibers are liable to fall in filtering and likely to be mixed in the filtrate. Fibers other than the thermoplastic fibers can be used for the strip of nonwoven as long as the object of the present invention is not damaged. Examples capable of being given as the fibers other than the thermoplastic fibers include rayon, cupra, cotton, hemp, pulp and carbon fiber.

The filament nonwoven used for the strip of nonwoven in the present invention is a filament nonwoven obtained by a spun-laying method. The filament nonwoven which comprises a thermoplastic fiber and in which at least a part of fiber intersections is bonded does not contain low molecular weight components such as a fiber surface agent (for example, a surfactant) unlike a lot of staple nonwovens. Since it comprises long fibers, end parts of the fibers are limited, and the filter materials scarcely fall. Accordingly, use of this for a filter material largely reduces a possibility to contaminate a filtrate as compared with other materials.

When the strip of nonwoven used in the present invention is a filament nonwoven, an average single yarn fineness thereof can not unconditionally be prescribed since it is different according to uses of the filter cartridge and the kind of the resins, but it falls preferably in a range of 0.6 to 3000 dtex. The fineness exceeding 3000 dtex provides no difference from a case where a nonwoven obtained merely by bundling continuous yarns is used, and therefore it becomes meaningless to use the filament nonwoven. Also, the nonwoven can obtain a satisfactory strength by raising the fineness to 0.6 dtex or more, and therefore this nonwoven can readily be processed into a pleated matter by a method which shall be described later. Further, the resulting filter cartridge is preferably increased in strength. If a fiber having a smaller fineness than 0.6 dtex is spun by an existing spun-laying method, the productivity is reduced.

When the fiber used for the strip of nonwoven is a staple fiber, a single yarn fineness thereof is different according to uses of the filter cartridge and the filtering accuracy required, and it falls suitably in a range of 0.01 to 500 dtex.

Examples of the nonwoven formed by the thermoplastic fibers may include filament nonwovens, staple nonwovens and in addition thereto, nonwovens prepared by mixing a filament nonwoven and a staple nonwoven and laminated nonwovens prepared by combining these nonwovens, and all of them can be used as a material for the filter cartridge of the present invention.

Examples of the kinds of the nonwoven classified by production processes may include a spun-laid nonwoven, a melt blown nonwoven, a toe opened nonwoven, a wet-laid nonwoven, an air-laid nonwoven, a carded nonwoven and a high pressure hydroentangled nonwoven, and all of them can be used as a material for the filter cartridge of the present invention. However, among these nonwovens, a strip of melt blown nonwoven is preferred, and a strip of filament nonwoven is more preferred. Further, activated carbons, ion exchange resins and fungicides may be added to these nonwovens via a binder or by means of a thermal bonding method and a resin mixing method.

The perforated cylinder used in the present invention functions as a core material for the filter cartridge, and a material and a form thereof shall not specifically be restricted as long as it has a strength durable to an external pressure in filtering and the pressure loss is not markedly high. It may be, for example, a perforated cylinder prepared by processing a thermoplastic resin such as polypropylene or may be a perforated cylinder prepared by processing ceramics and stainless steel in the same manner. Other usable ones are filter cartridges having a small major diameter such as a pleat type filter cartridge obtained by subjecting a filter material to pleat-folding processing and a filter cartridge obtained by winding a broad nonwoven.

Examples of a bonding method of the fiber intersections in the nonwoven described above may include a method for carrying out thermal compression bonding by means of an apparatus such as a hot embossing roll and a heat flat calendar roll and a method in which a heat treating machine of a hot blast-circulating type, a hot through-air type, an infrared heater type or a vertical hot blast-blowing type is used to carry out thermal compression bonding. When the nonwoven described above is a thermally compressed nonwoven by means of a hot embossing roll, a thermal compression bonding area ratio in terms of a rate of a thermal compression bonding area to the whole area of the nonwoven is controlled preferably to 5 to 25%. A thermal compression bonding area ratio of less than 5% reduces a strength of the nonwoven. On the other hand, a thermal compression bonding area ratio of exceeding 25% reduces a liquid permeability and a filter life of the filter cartridge. The thermal compression bonding area ratio which is controlled to 5 to 25% makes it possible to maintain a strength of the nonwoven and inhibit the rigidity from growing too large, or it facilitates to allow particles to pass through the filament nonwoven to some extent and makes it possible to extend the filter life by trapping the passed particles inside of the filter.

The structural fibers for the nonwoven used in the present invention need not always have a circular cross section, and yarns having profiled cross sections can be used as well. In such case, more fine particles are trapped as the surface area of the filter becomes larger, and therefore a filter cartridge having a higher accuracy at the same liquid permeability than in the case where fibers having a circular cross section are used can be produced.

If the nonwoven is provided with hydrophilicity by mixing a raw material resin for the nonwoven with a hydrophilic resin such as polyvinyl alcohol or subjecting the surface of the nonwoven to plasma treatment as long as the effects of the present invention are not damaged, the liquid permeability is elevated when used for an aqueous solution, and therefore such nonwoven filter as provided with hydrophilicity is preferred when filtering an aqueous solution.

Further, when producing the nonwoven, granular activated carbon and ion exchange resins may be added as long as the effects of the present invention are not damaged. In such case, in order to fix granular activated carbon and ion exchange resins, they may be bonded by means of a suitable binder before or after processing the strip of filament nonwoven into a converged or pleated matter. Instead, after adding granular activated carbon and ion exchange resins to the nonwoven, they may be heated so as to thermally bond to the structural fibers of the nonwoven.

The first invention of the present invention described above shall specifically be explained firstly.

Figure 6:
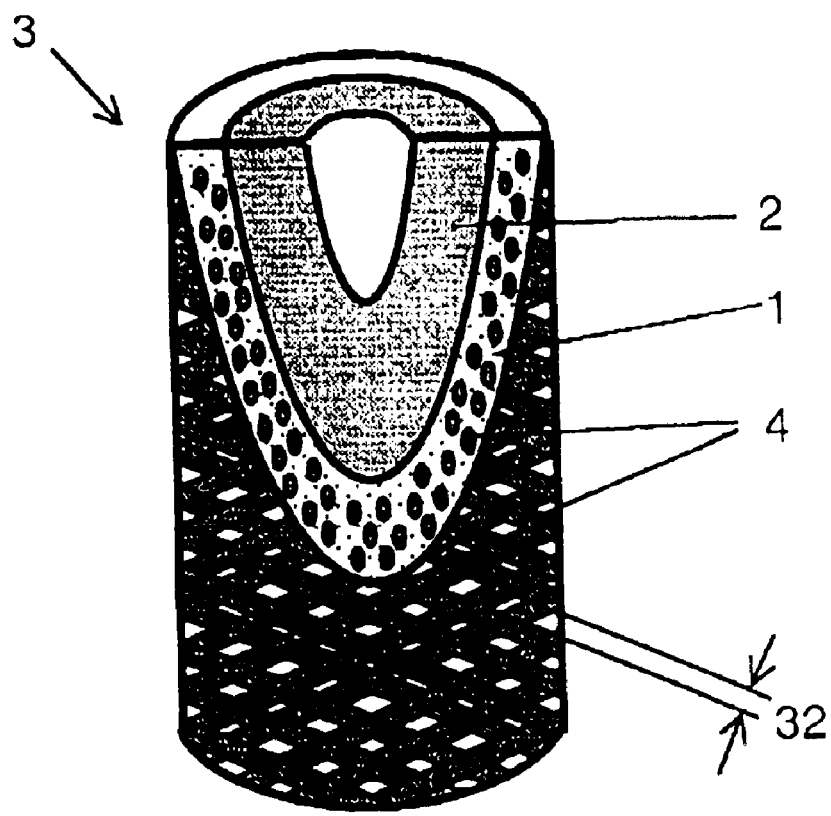
FIG. 6 is a cut-out perspective drawing of the filter cartridge according to the present invention. Code 1 represents a first filtration layer; code 2 represents a second filtration layer; code 3 represents the filter cartridge; code 4 represents a strip of filament nonwoven-converged matter; and code 32 represents a space between one strip of filament nonwoven and another strip of filament nonwoven wound on a layer immediately thereunder.

A first embodiment of the filter cartridge of the present invention is a filter cartridge comprising at least two layers comprising a first filtration layer prepared by winding a strip of filament nonwoven comprising a thermoplastic fiber obtained by bonding at least a part of fiber intersections in a twill form so as to make a cylindrical form and a second filtration layer in which an initial 80% trapped particle diameter is 0.05 to 0.9 time as large as an initial 80% trapped particle diameter in the first filtration layer. The second filtration layer is positioned in a downstream side (a side closer to a filtrate) than the first filtration layer. Shown in FIG. 6 is an example of the case where a fluid is allowed to flow from an outside of a cylinder to an inside thereof, and the first filtration layer 1 is positioned in a peripheral side of the second filtration layer 2. If the second filtration layer has a weak compressive strength, a perforated core may be provided in order to maintain the strength, or it is a matter of course that a three layer structure in which a third filtration layer is provided or a multilayer structure of three or more layers may be employed as long as the effects of the present invention are not damaged. When employing a structure of three or more layers, a layer having a purpose other than trapping particles such as an activated carbon layer may be provided, or an initial 80% trapped particle diameter in the third filtration layer may be controlled to 0.05 to 0.9 time as large as an initial 80% trapped particle diameter in the second filtration layer to try to extend further the filter life.

In this case, the initial 80% trapped particle diameter shall be explained. An initial 80% trapped particle diameter in some filter is a particle diameter in which a particle trapping efficiency in the particle diameter is just 80%. A method for determining it includes various methods, and it is said that a method described in ASTM F795-88 is a reliable method. An outline thereof is that a filter is installed in a circulating type filter performance tester and a liquid (a liquid before filtering) in which a cake such as an AC fine test dust is suspended is allowed to pass through the filter by means of a pump to obtain a filtrate and that the liquid before filtering and the filtrate are diluted at prescribed magnifications and then the numbers of the particles contained in the respective liquids are measured by means of a light-shielding type particle detector to calculate the initial trapping efficiencies in the respective particle diameters. In the present specification, the initial 80% trapped particle diameter is defined by a particle diameter in which a trapping efficiency shows 80% when interpolating the value thereof in the relation of particle diameter and the trapping efficiency. In many cases, an initial trapped efficiency monotonously increases as the particle diameter increases, and in such cases, the initial 80% trapped particle diameter is unconditionally determined in each filter. In rare cases, an initial trapping efficiency curve does not monotonously increase, and two or more particle diameters are present for which a particle trapping efficiency is just 80%. In such cases, however, the smallest particle diameter out of them is designated as the 80% trapped particle diameter in the filter.

The filter cartridge of the present invention has a structure-comprising the first filtration layer and the second filtration layer, and therefore it is difficult to determine the initial 80% trapped particle diameters in the respective layers while maintaining the shape of the filter cartridge. Accordingly, it is determined by the following two methods.

The first method is a method in which the first filtration layer and the second filtration layer each are separately produced. This method can be used only when production conditions of the respective layers are known. If the shape cannot be maintained only by the respective layers, it is recommendable to use a suitable dummy, for example, a perforated plastic molded article having a void.

The second method is a method in which measured data are analyzed to determine the trapping efficiency. This method is recommendable when production conditions of the respective layers are unknown. First, trapping efficiencies of the filter cartridge in the respective particle diameters are measured. Next, the first filtration layer is removed from the filter cartridge to allow only the second filtration layer to be present. A relation between the trapping efficiencies in the first filtration layer, the second filtration layer and the filter cartridge is shown by the following equation:

(1−trapping efficiency of filter cartridge)=(1−trapping efficiency of first filtration layer)×(1−trapping efficiency of second filtration layer)

Accordingly, if the trapping efficiencies of the filter cartridge and the second filtration layer are determined, a trapping efficiency of the first filtration layer can analytically be determined. It shall be apparent that application of this method makes it possible to determine the trapping efficiency as well in the case of three or more layers. The trapping efficiencies in the respective particle diameters in the respective layers are calculated by this method to interpolate the values thereof, whereby the initial 80% trapped particle diameters can be calculated. If it is difficult to remove the first filtration layer, the trapping efficiencies can be determined as well in the same manner by removing the second filtration layer to carry out measurement.

Figure 7:
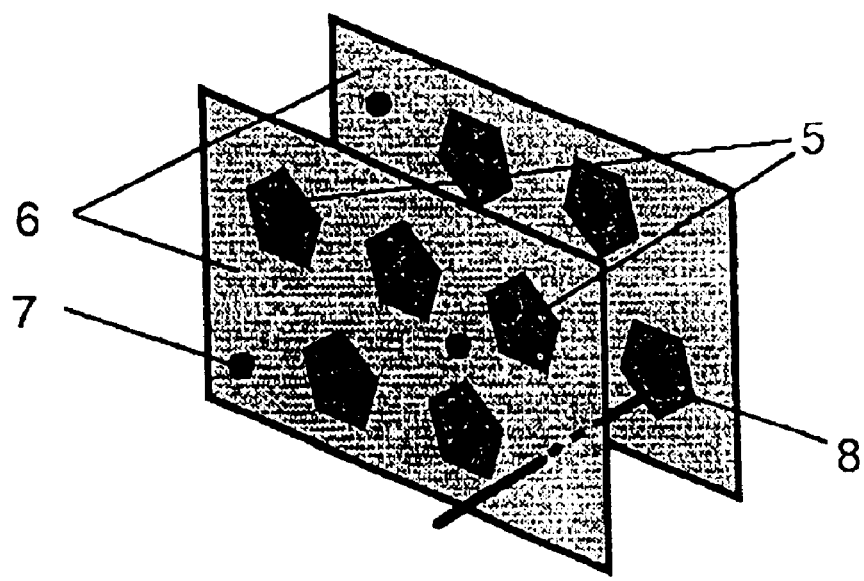
FIG. 7 is an explanatory drawing showing a status of a particle trapped by an embossing pattern of the nonwoven. Code 5 represents a part where strong thermal compression bonding is applied by the embossing pattern; code 6 represents a part where the embossing pattern is not applied and only weak thermal compression bonding is present; code 7 represents a particle; and code 8 represents a particle passing through the part where the embossing pattern is not applied and only weak thermal compression bonding is present.

As shown in FIG. 7, a filament nonwoven produced by a method using a hot embossing roll has a part where strong thermal compression bonding is applied by an embossing pattern (5) and a part where only weak thermal compression bonding due to deviation from the embossing pattern is applied (6). This makes it possible to trap a lot of particles 7, 8 in the part 5 where strong thermal compression bonding is present. On the other hand, a part of the particles is trapped in the part 6 where only weak thermal compression bonding is present, but the residual particles pass through the filament nonwoven and can be moved to the subsequent layer. Accordingly, a deep layer filtering structure making use of an inside of a filter material can be preferably obtained.

After processing the nonwoven into the form of a filter cartridge by a method shown later, the fiber intersections may be thermally bonded by means of an infrared ray or steam treatment, or the fiber intersections can be chemically bonded by means of an adhesive such as an epoxy resin, but the aperture rate is reduced as compared with a case where they are thermally bonded, so that the liquid permeability is lowered in a certain case.

Figure 8:
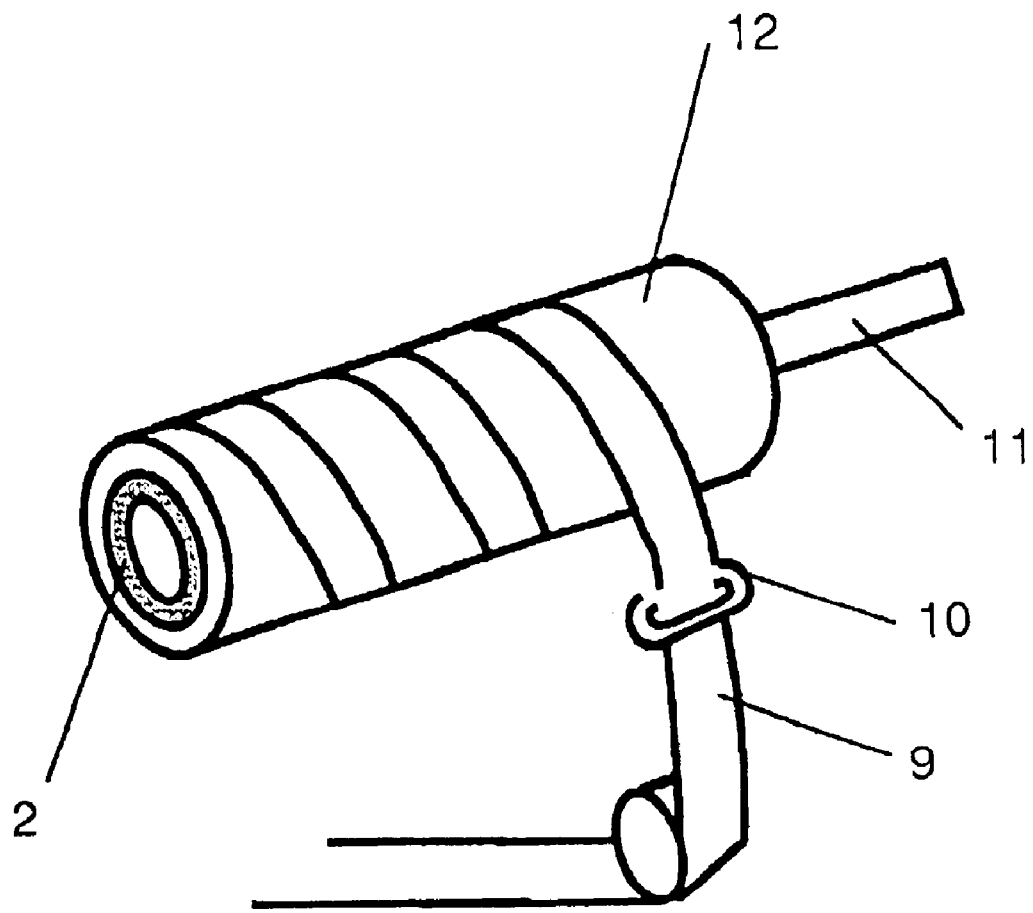
FIG. 8 is an explanatory drawing showing a state in which a strip of filament nonwoven is wound as it is without processing. Code 2 represents a second filtration layer; code 9 represents a strip of filament nonwoven or a converged matter thereof; code 10 represents a traverse guide having a narrow hole; code 11 represents a bobbin; and code 12 represents a filter cartridge.

The filament nonwoven used in the present invention is usually a spun-laid nonwoven. This may be turned into a strip of filament nonwoven by the method which has already been described and processed by a method which shall be described later, and it is then wound around the second filtration layer (details of the second filtration layer shall be described later) in a twill form, or it may be wound as it is without processing. One example of the production process in this case is shown in FIG. 8. A winder used for a conventional bobbin winder type filter cartridge can be used for the winding machine. Filters having various shapes can be obtained depending on the shapes of the winders, and they are usually cylindrical. A strip of filament nonwoven 9 fed passes through a traverse guide 10 of a narrow hole which moves while traversing and then is wound around a second filtration layer 2 mounted on a bobbin 11 to become a filter cartridge 12. The filter cartridge produced by this process becomes very dense, and therefore the filter cartridge having a fine accuracy is obtained. However, it is difficult in this process to change the production conditions to control the filtering accuracy.

Figure 9:
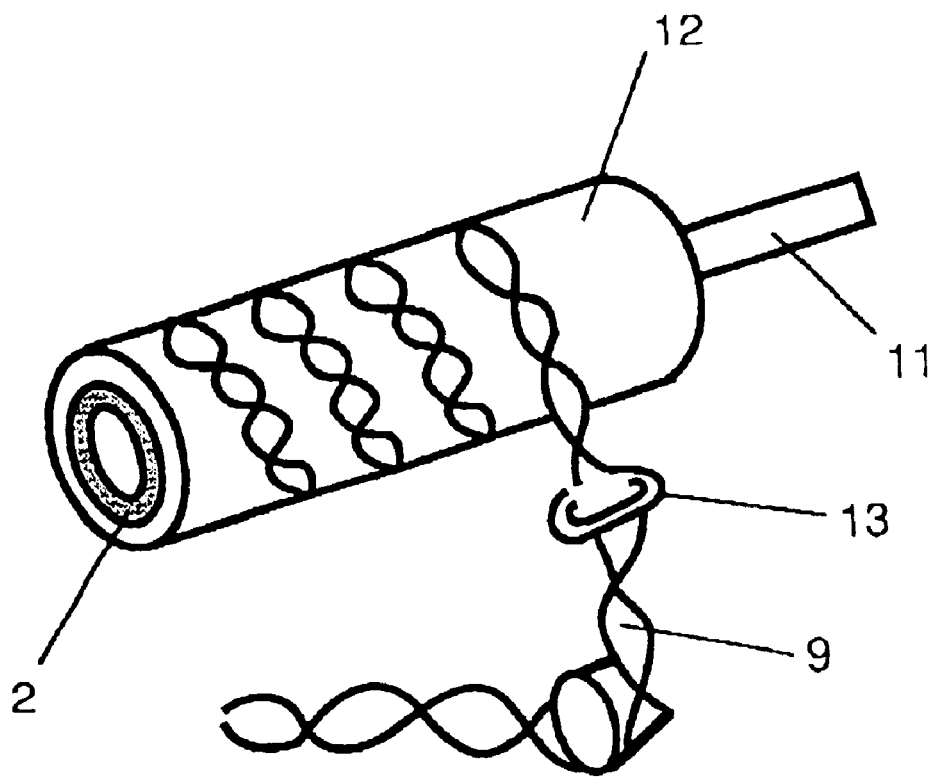
FIG. 9 is an explanatory drawing showing a state in which a strip of filament nonwoven is wound while twisting. Code 2 represents a second filtration layer; code 9 represents the strip of filament nonwoven or a converged matter thereof; code 11 represents a bobbin; code 12 represents a filter cartridge; and code 13 represents a traverse guide.

On the other hand, the strip of filament nonwoven can be wound after twisted. One example of the production process in this case is shown in FIG. 9. Also in this case, a winder used for a conventional bobbin winder type filter cartridge can be used for the winding machine. The nonwoven becomes apparently thick by twisting, and therefore a traverse guide 13 preferably has a larger hole diameter than that in the case of FIG. 8. If a nonwoven is twisted, an apparent void rate of the nonwoven can be changed according to a twisting number per unit length or a twisting strength, so that the filtering accuracy can be controlled. The twisting number in this case falls preferably in a range of 50 to 1000 rounds per meter of the strip of filament nonwoven. If this value is smaller than 50 rounds, the twisting effect is scarcely obtained. On the other hand, if this value exceeds 1000 rounds, the resulting filter cartridge has a rough liquid permeability. Accordingly, both are not preferred.

It is more preferred to converge the strip of filament nonwoven described above by a suitable method and then wind it around a perforated cylinder. In the method described above, the strip of nonwoven may be passed merely through a small hole to be converged. Otherwise, the strip of filament nonwoven may be pre-molded into one having a certain cross-sectional form by means of a suitable pleat-forming guide and then passed through a small hole to be processed into a pleated matter. Use of this method makes it possible to control a ratio of a traversing speed of the traverse guide to a rotating speed of the bobbin to change the winding pattern, and therefore filter cartridges having various performances can be produced from the same kind of the strip of filament nonwoven.

As a method for converging the strip of filament nonwoven, one example of a production process in which the nonwoven is passed merely through a small hole is shown in FIG. 5. Also in this case, a winder used for a conventional bobbin winder type filter cartridge can be used for the winding machine. In FIG. 5, the hole of a traverse guide 12 is turned into a small hole to thereby converge the strip of filament nonwoven, but a guide of a small hole may be disposed at a yarn passage on the front side of the traverse guide 12. A diameter of the small hole depends on a mass per unit area and a width of the strip of filament nonwoven used and falls preferably in a range of 3 to 10 mm. If this diameter is smaller than 3 mm, a friction between the strip of filament nonwoven and the small hole is increased, so that the winding tension becomes too high. On the other hand, if this value is larger than 10 mm, a converging size of the strip of filament nonwoven is not stabilized.

Figure 10:
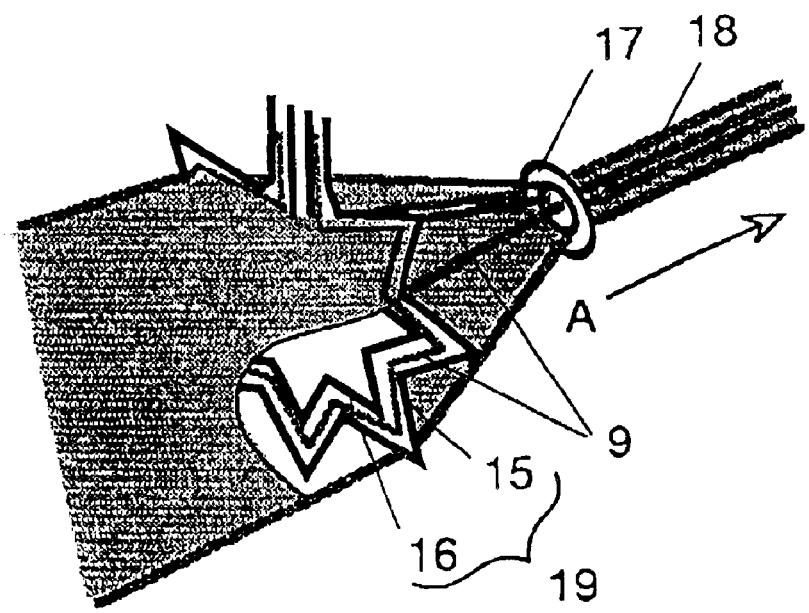
FIG. 10 is a drawing showing a state of processing a strip of filament nonwoven into a pleated matter by means of a pleat-forming guide. Code 9 represents a strip of filament nonwoven or a converged matter thereof; code 15 represents an external controlling guide; code 16 represents an internal controlling guide; code 17 represents a small hole; code 18 represents pleated matter; and code 19 represents the pleat-forming guide.

Next, shown in FIG. 10 is a partial cut-out perspective drawing of one example of a production process in which the strip of filament nonwoven is pre-molded into one having a certain cross-sectional form by means of a pleat-forming guide and then passed through a small hole to be processed into a pleated matter. Also in this case, a winder used for a conventional bobbin winder type filter cartridge can be used for the winding machine. When employing this process, a strip of filament nonwoven 9 is pre-molded into one having a certain cross-sectional form through a pleat-forming guide 19, and then the strip of filament nonwoven is passed through a small hole 17 to be turned into a pleated matter 18. The pleated matter 18 is drawn toward a direction of A to be passed through a traverse guide and wound around the second filtration layer, whereby a filter cartridge is prepared.

Figure 11:
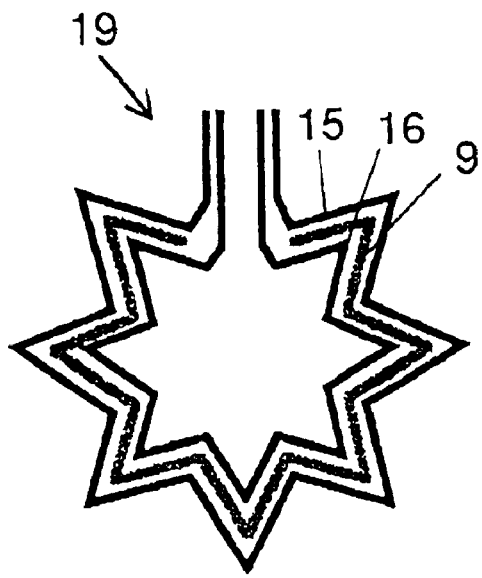
FIG. 11 is a cross section showing one example of the pleat-forming guide used in the present invention. Code 9 represents a strip of filament nonwoven or a converged matter thereof; code 15 represents an external controlling guide; code 16 represents an internal controlling guide; and code 19 represents the pleat-forming guide.
Figure 12:
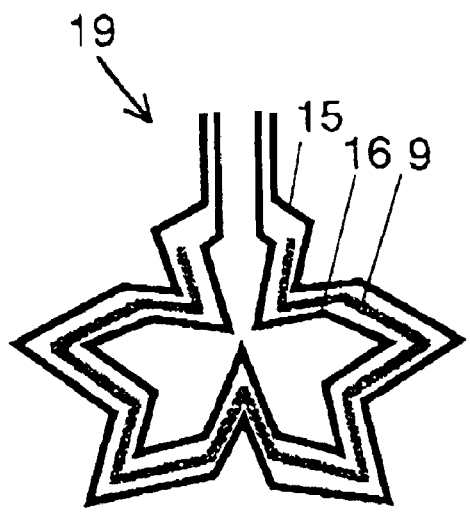
FIG. 12 is a cross section showing one example of the pleat-forming guide used in the present invention. Code 9 represents a strip of filament nonwoven or a converged matter thereof; code 15 represents an external controlling guide; code 16 represents an internal controlling guide; and code 19 represents the pleat-forming guide.
Figure 13:
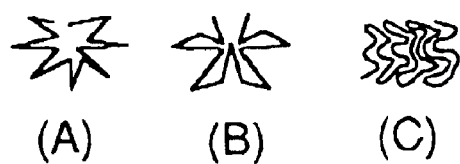
FIG. 13 is an explanatory drawing showing one example of a cross-sectional form of a pleated matter having non-parallel pleats.
Figure 14:
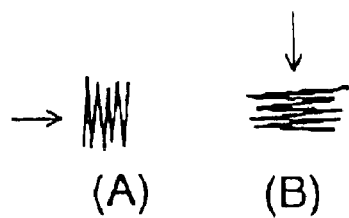
FIG. 14 is an explanatory drawing showing one example of a cross-sectional form of pleated matter having parallel pleats.

Next, the pleat-forming guide described above shall be explained. Usually, the pleat-forming guide is prepared by subjecting the surface of a processed round bar having a major diameter of 3 to 10 mm to fluororesin finishing in order to prevent friction with a nonwoven. Examples of the form thereof are shown in FIGS. 11 and 12. In the examples given above, the pleat-forming guide 19 comprises an external controlling guide 15 and an internal controlling guide 16. The form of this pleat-forming guide 19 shall not specifically be restricted and is preferably a form in which the nonwoven is converged so that pleats in the cross-sectional form of the pleated matter produced through this guide are not parallel. Examples of the cross-sectional form of the pleated matter thus produced are shown in FIGS. 13(A), (B) and (C) but shall not be restricted to them. In these embodiments of the present invention, the most preferred embodiment is the pleated matter which is formed by converging so that at least a part of the pleats is non-parallel. That is, when a part of the pleats is non-parallel as is the case with the cross-sectional forms shown in FIG. 13, the pleated matter keeps a strong form-holding power even when a filtering pressure is applied from a vertical direction as shown by an arrow as compared with a case where almost all of the pleats are parallel as shown in FIGS. 14(A) and (B). Therefore, the filtering performance of the original pleated form can be maintained. That is, in the case where the pleats are non-parallel, the ability to control a pressure loss of the filter cartridge is excellent as compared with the case where the pleats are parallel, and therefore the pleats in the pleated matter are particularly preferably non-parallel. The guide does not necessarily have to be only one, and if several guides having different forms and sizes are arranged in series to thereby gradually change a cross-sectional form of the strip of filament nonwoven, a cross-sectional form of the pleated matter is gradually varied, so that unevenness in the quality is removed. Accordingly, it is preferred.

In the present invention, when the strip of filament nonwoven is turned into the pleated matter and then wound around the second filtration layer, a final pleat number of the pleated matter is 4 to 50 pleats, more preferably 7 to 45 pleats. If the pleat number is less than 4 pleats, the effect given by expanding a filtering area by providing the pleats is poor. On the other hand, if the pleat number exceeds 50 pleats, the pleats become too small to make the production, and the filtering performance is liable to be reduced.

Figure 15:
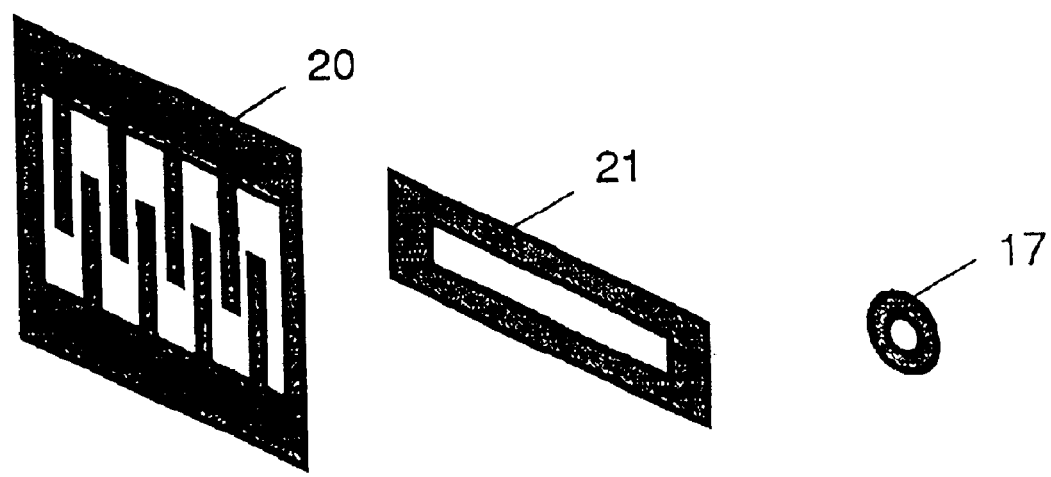
FIG. 15 is an explanatory drawing showing a locational relation between a pleat-forming guide, a narrow rectangular hole and a small hole. Code 17 represents the small hole; code 20 represents the comb-shaped pleat-forming guide; and code 21 represents the narrow rectangular hole.

A comb-shaped pleat-forming guide 20 as shown in, for example, FIG. 15 is used to provide the filament nonwoven with many pleats, and then the nonwoven is passed through a narrower rectangular hole 21, whereby it is deformed so that more pleats are provided, and the pleats can be non-parallel at random.

The pleated matter 18 obtained after passing through the small hole 17 described above can be subjected to heating processing by means of hot air-through or an infrared heater to thereby fix the cross-sectional form of the pleated matter. This step is not necessarily required, but when the cross-sectional form of the pleated matter is complicated or the strip of filament nonwoven having a high rigidity is used, the cross-sectional form is broken and deviated from the designed form in a certain case, and therefore such heating processing is preferably provided.

Figure 16:
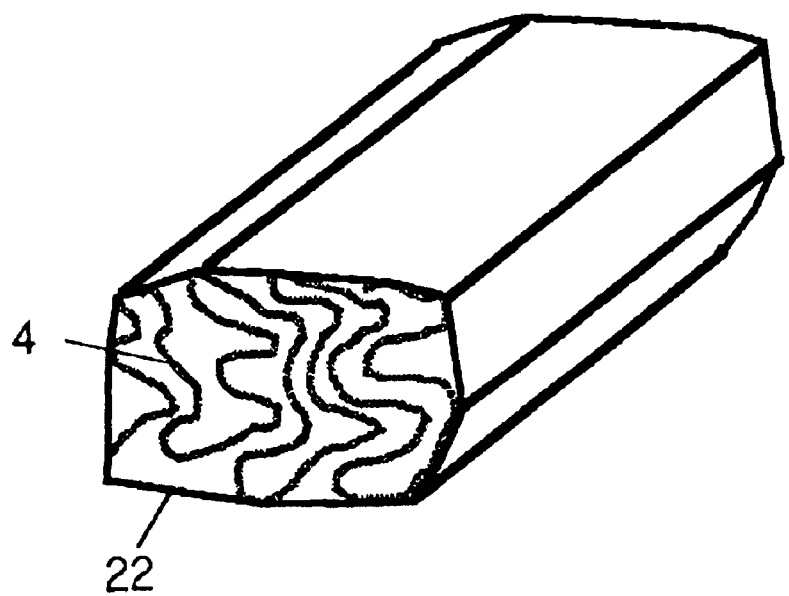
FIG. 16 is a partial cut-out perspective drawing showing one example of the strip of filament nonwoven-converged matter according to the present invention. Code 4 represents the strip of filament nonwoven-converged matter, and code 22 represents an oval figure of a minimum area involving a strip of filament nonwoven-converged matter.

Next, a void rate of the converged strip of filament nonwoven or the pleated matter used in the present invention (hereinafter called altogether a strip of filament nonwoven-converged matter) shall be explained. First, a cross-sectional area of the strip of filament nonwoven-converged matter is defined, as shown in FIG. 16, by an area of an oval FIG. 22 (the oval figure means a polygon in which all the respective internal angles fall within 180 degrees) of a minimum area containing a strip of filament nonwoven-converged matter 4. The strip of filament nonwoven-converged matter is cut to a suited length, for example, a length of 100 times as large as the square root of the cross-sectional area to define a void rate of the strip of filament nonwoven-converged matter as described later.

The void rate of the strip of filament nonwoven-converged matter thus defined is preferably 60 to 95%, more preferably 85 to 92%. If this value is controlled to 60% or more, the strip of filament nonwoven-converged matter is inhibited from becoming denser than necessary. When it is used for a filter cartridge, the pressure loss can be sufficiently reduced or the particle trapping efficiency of the strip of filament nonwoven-converged matter can be improved additionally. Further, if this value is controlled to 95% or less, the converged matter can be wound easily in the later process and the deformation of the filter caused by loaded pressure can be reduced when it is used for a filter cartridge. An example of a method for controlling this includes controlling of the winding tension and adjusting the guide form of the pleat-forming guide.

Next, the strip of filament nonwoven-converged matter produced by the process described above does not necessarily have to be produced by a continuous process if a measure is taken so that the cross-sectional form is not broken, and it may be once wound around a suitable bobbin and then wound by means of a winder. The strip of filament nonwoven was wound by the method described above.

The first filtration layer thus obtained has a void rate falling preferably in a range of 65 to 90%. If this value is smaller than 65%, the fiber density becomes too high, so that the liquid permeability is reduced. On the contrary, if this value exceeds 90%, the filter cartridge is reduced in strength, and when a filtering pressure is high, the problem that the filter cartridge is deformed is liable to be caused.

In the present invention, the resulting cartridge filter can be improved in a liquid permeability by providing the strip of filament nonwoven with cut lines or drilling holes through it. In this case, the number of the cut lines is preferably 5 to 100 lines per 10 cm of the strip of filament nonwoven, and when drilling holes, a proportion of the aperture part area is set preferably to 10 to 80%. The filtering performance can be controlled by winding plural sheets of the strip of filament nonwoven or winding it in combination with other yarns such as a spun yarn.

Next, the second filtration layer used in the present invention shall be explained.

Multilayer filters produced by conventional techniques have had a problem on a layer in an upper stream side thereof (corresponding to the first filtration layer in the present invention), and therefore there have been problems on accuracy stability and a filter life, or fallen filter materials and other particles have been mixed in a filtrate. In the present invention, the problems described above have been solved, as described above, by taking a measure for the first filtration layer, and therefore the second filtration layer has basically no problems as long as it is a filter having a higher accuracy than that of the first filtration layer. An initial 80% trapped particle diameter in the second filtration layer falls preferably in a range of 0.05 to 0.9 time as large as an initial 80% trapped particle diameter in the first filtration layer. If this value is less than 0.05, too much difference is present between trapping capacities in the first filtration layer and the second filtration layer, and therefore almost all particles are not trapped on the first filtration layer and are likely to bring about clogging on the surface of the second filtration layer, so that it is not preferred. On the contrary, if this value exceeds 0.9 time, too small difference is present between the trapping capacities in the first filtration layer and the second filtration layer, and therefore it is almost meaningless to divide the filter into plural layers. An optimum value thereof depends on particle size distribution in a liquid before filtering and therefore can not unconditionally be determined. In general, this value is preferably reduced when particles having various sizes are contained in the liquid before filtering. On the contrary, this value is preferably elevated when particles having a relatively uniform size are contained in the liquid before filtering. Examples of a filtration layer which is useful as the second filtration layer shall be given below.

Figure 17:
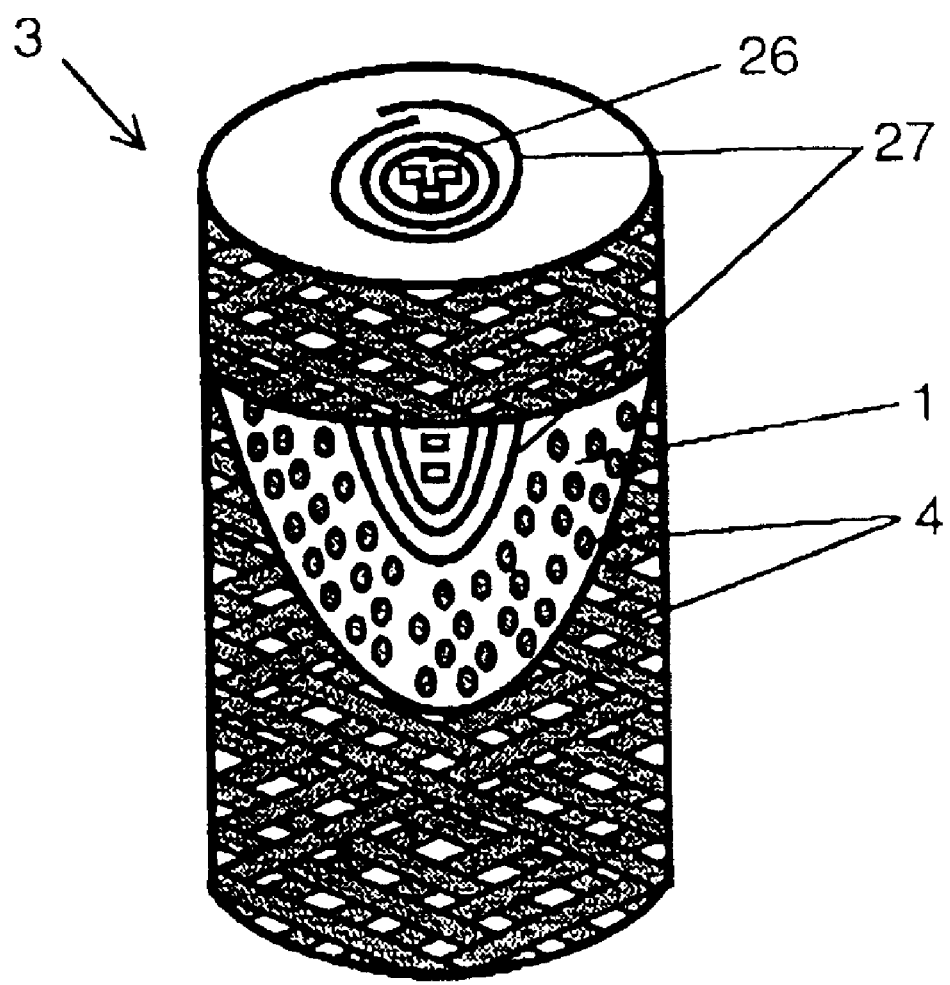
FIG. 17 is a perspective drawing of the filter cartridge according to the present invention. Code 1 represents a first filtration layer; code 3 represents the filter cartridge; code 4 represents a strip of filament nonwoven-converged matter; code 26 represents a perforated cylinder; and code 27 represents a perforated sheet.

A filtration layer prepared by winding a perforated sheet around a perforated cylinder in a layer form can be used as one of the filtration layers which are useful as the second filtration layer. The perforated sheet includes nonwovens, woven fabrics, membrane sheets, filter papers and wire gauzes. The structure of this filter is shown in FIG. 17. A perforated plastic core prepared by injection molding and a metal worked article of stainless steel can be used for a perforated cylinder 26, but it shall not specifically be restricted as long as it has a strength which can stand a filtering pressure. A perforated sheet 27 does not have a problem as long as it is wound in a layer form to achieve the initial 80% trapped particle diameter, and a publicly known method, for example, if a melt blown nonwoven is used, a method described in JP-A 10-174822 can be applied for determining a mass per unit area and a fiber diameter thereof. If the perforated sheet is wound directly around the perforated cylinder, a surface area of the perforated sheet is reduced, and therefore allowed to be employed is a three layer structure in which a third filtration layer having the same structure as that of the first filtration layer is provided around the perforated cylinder in a size of 5 to 20% of a major diameter of the whole filter cartridge. Winding in a layer form increases man-hour in a certain case depending on a production process, and therefore a cylinder which is molded in advance from a nonwoven may be merely put on a core. Further, two or more kinds of nonwovens having different fiber diameters and void rates may be wound by stages as long as the effects of the present invention are not damaged.

Figure 18:
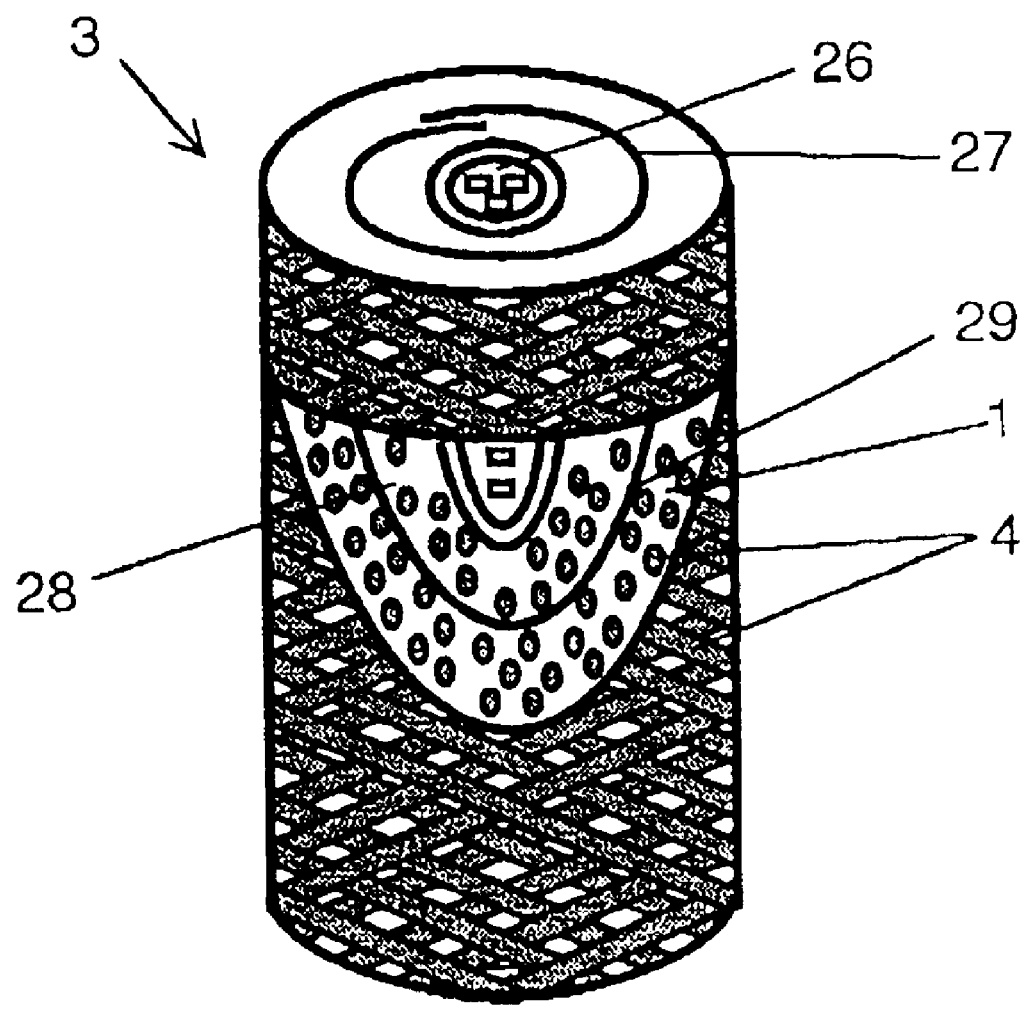
FIG. 18 is a perspective drawing of the filter cartridge according to the present invention. Code 1 represents a first filtration layer; code 3 represents the filter cartridge; code 4 represents a strip of filament nonwoven-converged matter; code 26 represents a perforated cylinder; code 27 represents a perforated sheet; code 29 represents a filtration layer wound in a twill form; and code 29 represents a perforated sheet.

One of other useful second filtration layers includes a layer having a structure shown in FIG. 18. That is, capable of being used is a layer having a two layer structure comprising a filtration layer 28 prepared by winding a strip of filament nonwoven comprising a thermoplastic fiber obtained by bonding at least a part of fiber intersections in a twill form around a perforated cylinder 26 and a filtration layer 29 prepared by continuously winding the strip of filament nonwoven from the filtration layer 28 while winding a perforated sheet 27 in a layer form. This is apparently similar to the preceding filter shown in FIG. 17, but there is a difference that only the perforated sheet is wound in the second filtration layer 27 shown in FIG. 17, and in contrast with this, the strip of filament nonwoven is interposed between the perforated sheets in a filtration layer 29 which is a part of the second filtration layer of the filter shown in FIG. 18.

Figure 19:
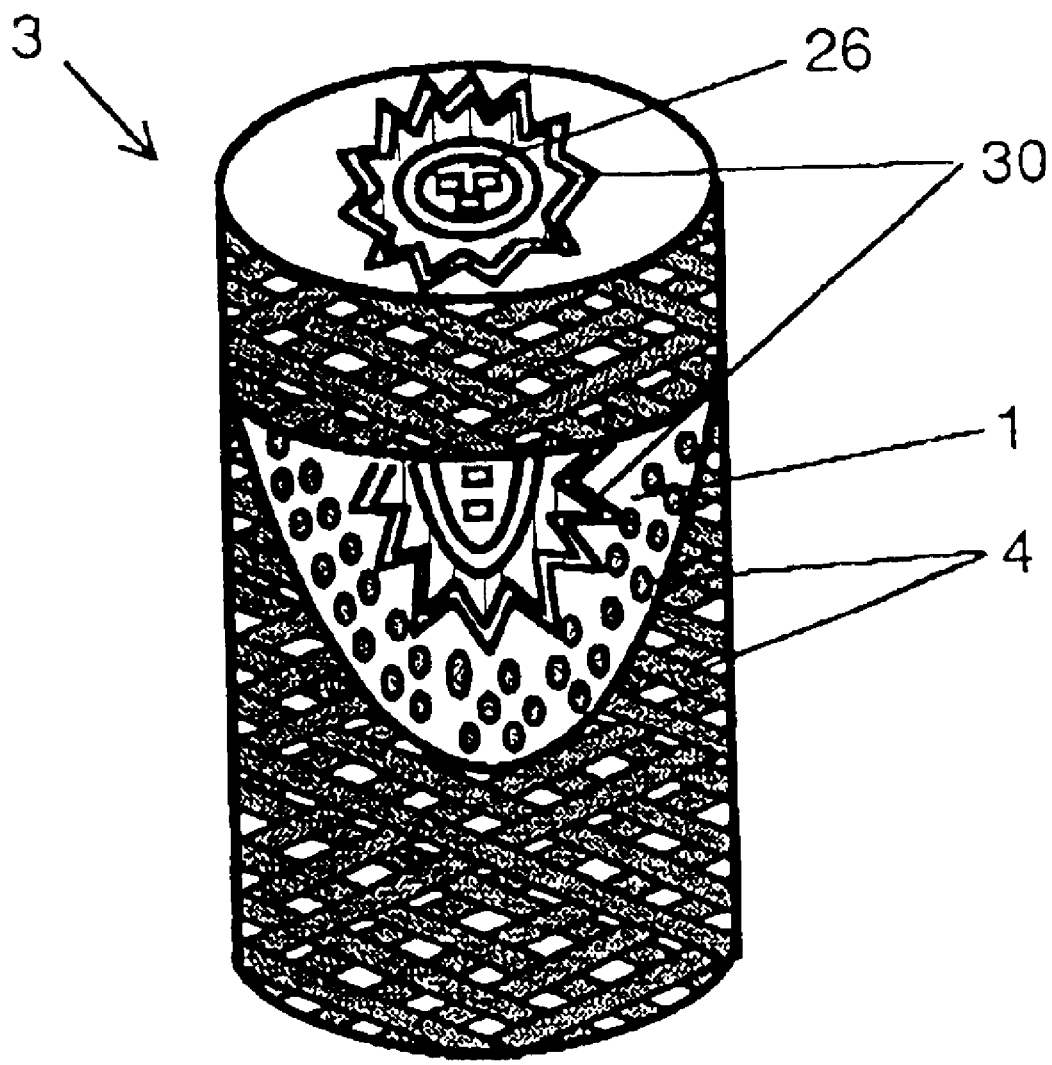
FIG. 19 is a perspective drawing of the filter cartridge according to the present invention. Code 1 represents a first filtration layer; code 3 represents the filter cartridge; code 4 represents a strip of filament nonwoven-converged matter; code 26 represents a perforated cylinder; and code 30 represents a perforated sheet subjected to wrinkling processing.

One of other useful second filtration layers includes a filter prepared by folding a perforated sheet in a pleat form around a perforated cylinder and molding it into a cylinder. The structure of this filter is shown in FIG. 19. Similarly, the perforated sheet includes nonwovens, woven fabrics, membrane sheets, filter papers and wire gauzes. A publicly known method, for example, a method described in JP-A 6-262013 can be used for processing these perforated sheets. When this is used, a filter having an excellent water permeability is obtained because of a large surface area of the filter material.

Figure 20:
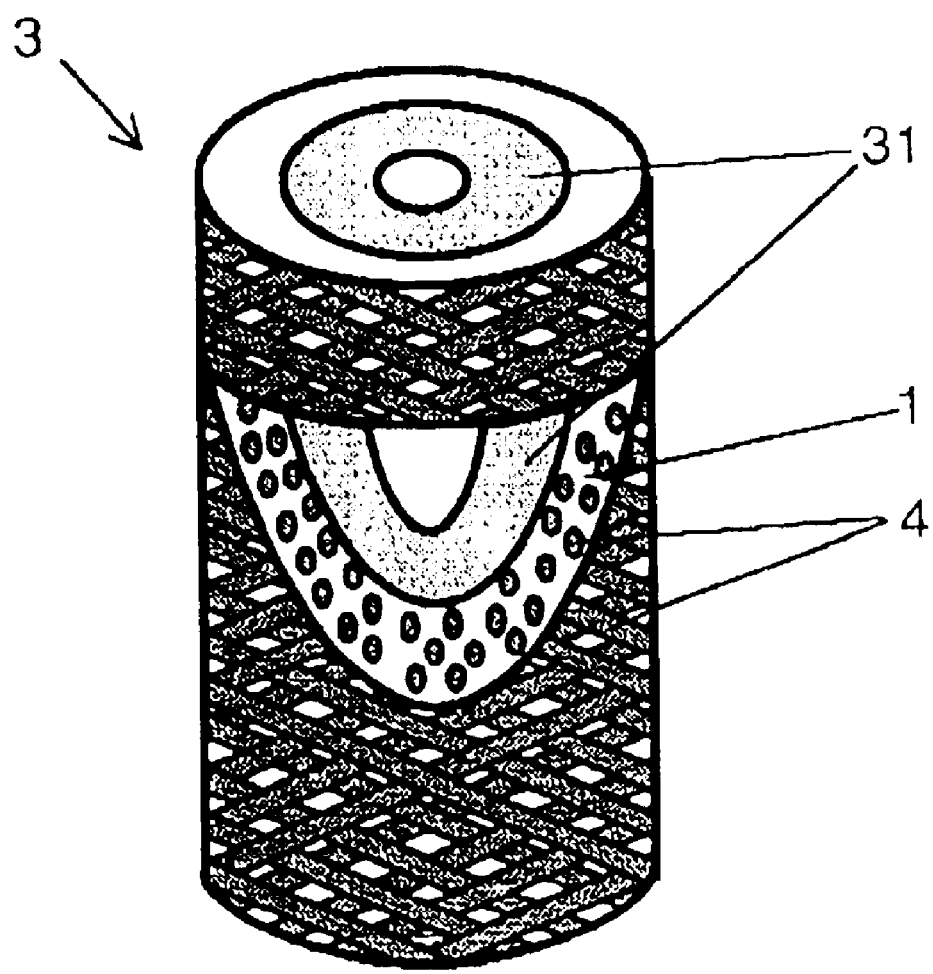
FIG. 20 is a perspective drawing of the filter cartridge according to the present invention. Code 1 represents a first filtration layer; code 3 represents the filter cartridge; code 4 represents a strip of filament nonwoven-converged matter; and code 31 represents a cylindrical molded article.

One of other useful second filtration layers includes a cylindrical molded article which comprises a thermally adherent composite fiber comprising two kinds of thermoplastic resins having a melting point difference of 10° C. or more and in which intersections of the thermally adherent composite fiber are bonded. The structure of this filter is shown in FIG. 20. When this filter material is used, this filter is so excellent that less trapped particles flow out even if a filtering pressure is raised because the fiber intersections of a second filtration layer 31 are bonded. Publicly known methods, for example, methods described in JP-B 56-43139 and JP-A 4-126508 can be used for a molding method of this cylindrical molded article.

Next, the second invention in the present invention shall specifically be described.

Figure 21:
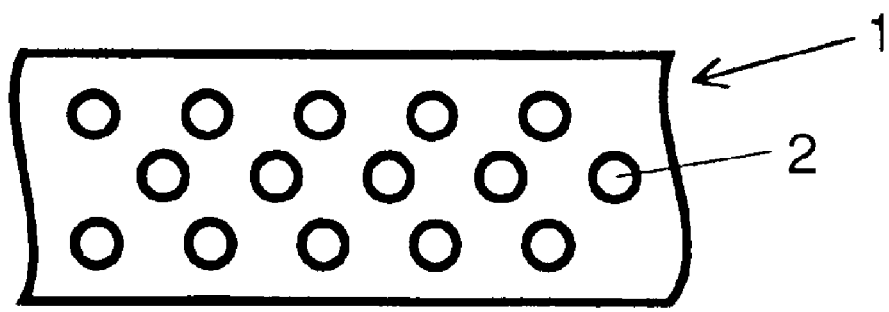
FIG. 21 is a drawing for explaining an apertural state of a strip of nonwoven having an aperture part, and a part marked by ○ represents an aperture part. Code 1 represents the strip of nonwoven having an aperture part, and code 2 represents the aperture part.

The second embodiment of the filter cartridge is a filter cartridge 1 prepared by winding a strip of filament nonwoven having an aperture part shown in FIG. 21 comprising a thermoplastic fiber obtained by bonding at least a part of fiber intersections around a perforated cylinder shown in FIG. 4 in a twill form after converged. That is, the strip of nonwoven having not only fine pores constituted by fibers but also aperture parts which are sufficiently larger than these fine pores is used as a material for a filtration layer in the filter cartridge. The presence of this aperture part reduces a flow resistance of the converged strip of nonwoven, and a suitable space is formed in an inside of the converged strip of nonwoven, so that trapped particles are increased in an amount, whereby the filter cartridge becomes excellent in a liquid permeability and a filter life.

As described above, the material used for the filter cartridge of the present invention is the strip of nonwoven (hereinafter referred to as an aperture part-containing strip of nonwoven) having an aperture part which comprises a thermoplastic fiber and in which at least a part of fiber intersections is bonded.

The aperture part-containing strip of nonwoven is obtained by providing an unprocessed nonwoven (hereinafter referred to as an original nonwoven) with an aperture part by punching and obtaining a desired width by slitting.

When calling merely the nonwoven in the following explanations, it means a general term of the aperture part-containing strip of nonwoven and the original nonwoven each described above.

The original nonwoven described above has a void rate of 60 to 95%, preferably 70 to 92%. When using the aperture part-containing strip of nonwoven obtained from the original nonwoven having a void rate of 60 to 95%, a filtration layer in the cylindrical filter is inhibited from becoming denser than necessary and sufficiently controlled in a pressure loss when it is used as a filter, and the particle trapping efficiency can be elevated more. A void rate of the original nonwoven which is controlled to 95% or less makes it easy to wind the aperture part-containing strip of nonwoven around a perforated cylinder and makes it possible to reduce more a deformation of the resulting cylindrical filter caused by a loaded pressure.

Figure 22:
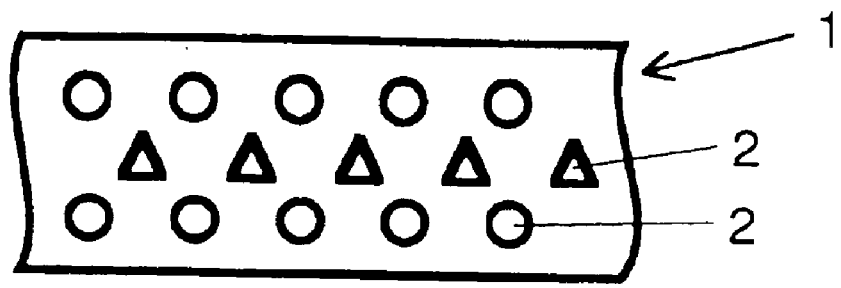
FIG. 22 is a drawing for explaining an apertural state of a strip of nonwoven having an aperture part, and parts marked by ○ and Δ represent aperture parts. Code 1 represents the strip of nonwoven having an aperture part, and code 2 represents the aperture part.

A method for providing an aperture part in the aperture part-containing strip of nonwoven described above shall be explained. A hole in the aperture part in the present invention is a larger hole such as an aperture part 2 shown in FIG. 21 unlike a fine pore formed by fibers constituting the original nonwoven, and it is defined by an aperture part having an area of 1 to 400 mm$^2$. Examples of a hole-opening method include a method in which the original nonwoven is punched by means of a punching blade to completely remove a punched fabric, a method in which the fibers are moved to the periphery by means of a needle and high pressure stream to thereby open a hole and a method in which the fibers are molten by means of a heated needle to thereby open a hole. It may stay in a state that periphery around the aperture part is fused or a state that fluffs are produced in an inside of the aperture part. A shape of the aperture part shall not specifically be restricted. It may be various, for example, circular, oval, rhombic, rectangular, square and triangular. Further, the shapes described above may be present in a mixed state as shown in FIG. 22.

The whole area of the aperture parts described above accounts for 5 to 60% based on the whole area of the, aperture part-containing strip of nonwoven including the aperture parts. If the whole area of the aperture parts is less than 5%, the water permeability and the filter life are not sufficiently elevated. On the other hand, if the area ratio of the aperture parts exceeds 60%, the aperture part-containing strip of nonwoven is broken or stretched when winding the aperture part-containing strip of nonwoven around a perforated cylinder, and it is difficult to produce a filter cartridge having a stable filter performance.

Figure 23:
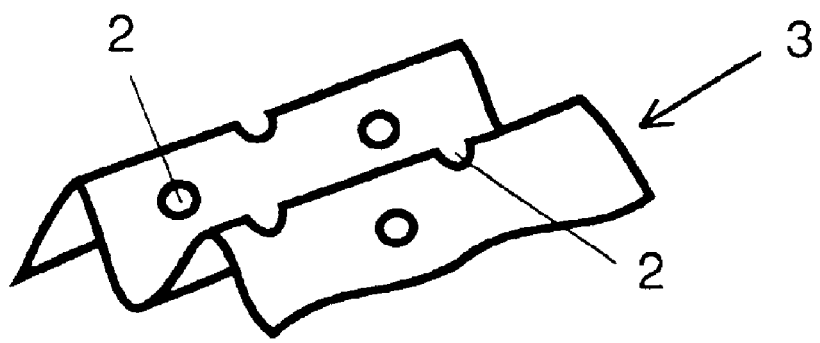
FIG. 23 is a perspective drawing for explaining an example of a state in which pleats are formed in a strip of nonwoven having an aperture part. Code 2 represents the aperture part, and code 3 represents a converged matter of an aperture part-containing strip of nonwoven or a pleated matter.

A matter having pleats (hereinafter referred to as a pleated matter) as shown in FIG. 23 is preferably used as the aperture part-containing strip of nonwoven used for the filter cartridge of the present invention. The pleats can be formed by the method described hereinabove. Other examples of a pleat-forming guide which can be used include a guide in which a cross-sectional shape is formed with an approximate wave form gap, a guide prepared by combining plural guides having different shapes and a guide in which a guide shown in FIG. 11 is used in combination with other pleat-forming guides.

In the present invention, the aperture part-containing strip of nonwoven is twisted and then wound around a perforated cylinder, whereby a filter cartridge can be prepared as well. If the aperture part-containing strip of nonwoven is twisted, a size and an apparent void rate of a converged matter in which the aperture part-containing strip of nonwoven stays in a converged state can be changed, and therefore it becomes possible to control the filter accuracy by the twisting number. Further, the pleat form is fixed by a tension and less likely to collapse, so that the filter performance is stabilized. This twisting number falls preferably in a range of 15 to 150 rounds per meter of the aperture part-containing strip of nonwoven. The twisting number of less than 15 rounds/meter scarcely provides an effect exerted by twisting. On the other hand, if it exceeds 150 rounds/meter, the aperture part-containing strip of nonwoven is strongly twisted and falls in a state that the fibers are fully packed, and the particle trapping property is deteriorated, so that it is not preferred. The filter cartridge was produced by the production process described above.

In the present invention, a porous material other than the aperture part-containing strip of nonwoven may be used for a part of the filtration layer in the filter cartridge. Capable of being given as examples thereof are polyethylene/polypropylene composite fiber nonwovens, melt blown extra fine fiber nonwovens, polyethylene fine porous membranes, polytetrafluoroethylene fine porous membranes, nonwovens prepared by mixing activated carbon fibers or antimicrobial fibers and nonwovens prepared by carrying ion exchange resins or activated carbon particles in the nonwovens. Use of such porous materials other than the aperture part-containing strip of nonwoven provides effects such as controlling the filter accuracy and providing functions including an antimicrobial property and absorptivity of metal ions.

The third invention in the present invention shall specifically be described.

The third embodiment in the present invention is a filter cartridge prepared by winding a strip of nonwoven comprising a thermoplastic fiber around a perforated cylinder in a twill form, wherein end face-sealed parts which are smooth and have elasticity in sealing are provided at both end parts thereof.

In the present invention, the end face-sealed parts are smooth, film-shaped parts integrally provided at both end parts of the filter cartridge. Obtained by providing these end face-sealed parts is a cylindrical filter cartridge for filtering a liquid which is excellent in an adhesive property with a housing.

In the present invention, the end face-sealed parts described above are preferably formed by melting or softening the strip of nonwoven constituting both end parts of the filter cartridge (hereinafter abbreviated as filter both end parts), and the resulting end face-sealed parts are integrated with the filter cartridge, so that problems such as peeling are not caused. One example thereof is shown in FIG. 4.

Next, a method for forming the end face-sealed parts at the filter both end parts shall be explained.

The end face-sealed parts are formed by melting or softening the strip of nonwoven constituting the filter both end parts by means of heat, a solvent or a supersonic wave and then solidifying them while arranging the shapes thereof so that they become smooth end faces. The strip of nonwoven comprising the thermoplastic fiber is used in the present invention, and therefore a method using heat is preferred. In such case, a heating method includes a method for heating by means of hot air or an infrared ray and a method for directly heating by bringing into contact with a hot plate. They can be heated by any method, but considering smoothness on the end face and easiness in setting the heating conditions, a method for directly heating by bringing into contact with a hot plate is preferred. One example of the filter cartridge thus prepared is shown in FIG. 4.

Heating is preferably carried out to such an extent that a thickness of fused end parts at the filter both end parts becomes 10 to 1000 μm. In this case, a thickness of the fused end parts represents a thickness of a part where the fibers of the original strip of nonwoven are turned into a film by fusing. One example thereof is shown in FIG. 24A. If this heating is weak, the filter both end parts are reduced in smoothness due to a shortage in fusing of the strip of nonwoven, so that heating shall become meaningless. On the contrary, if this heating is strong, the filter both end parts are hardened and therefore inferior in elasticity in sealing, and therefore it is not preferred. The heating conditions are varied depending on resins used and a heating method and therefore shall not unconditionally be determined, and heating is carried out for 1 to 10 seconds at a temperature which is higher by 5 to 20° C. than a melting point of the thermoplastic resin used (when using a material comprising two or more components, a melting point of a lower melting point component among them).

Figure 24:
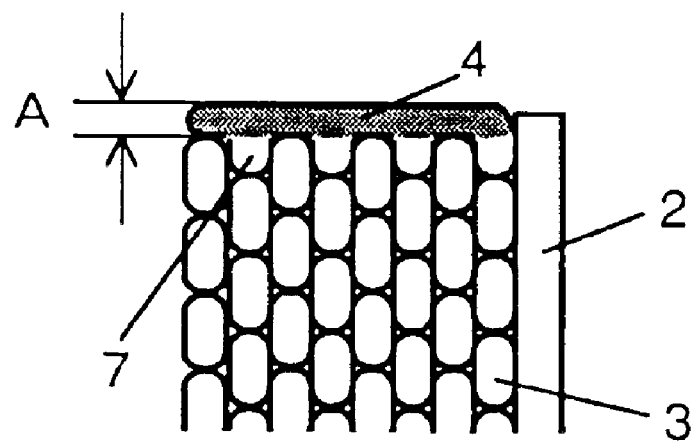
FIG. 24 is an enlarged section of the end part of a filter cartridge in which an end part is fused. Code 2 represents a perforated cylinder; code 3 represents a converged strip of nonwoven; code 4 represents a fused end part; and code 7 represents the converged strip of nonwoven bonded to the fused end part.
Figure 25:
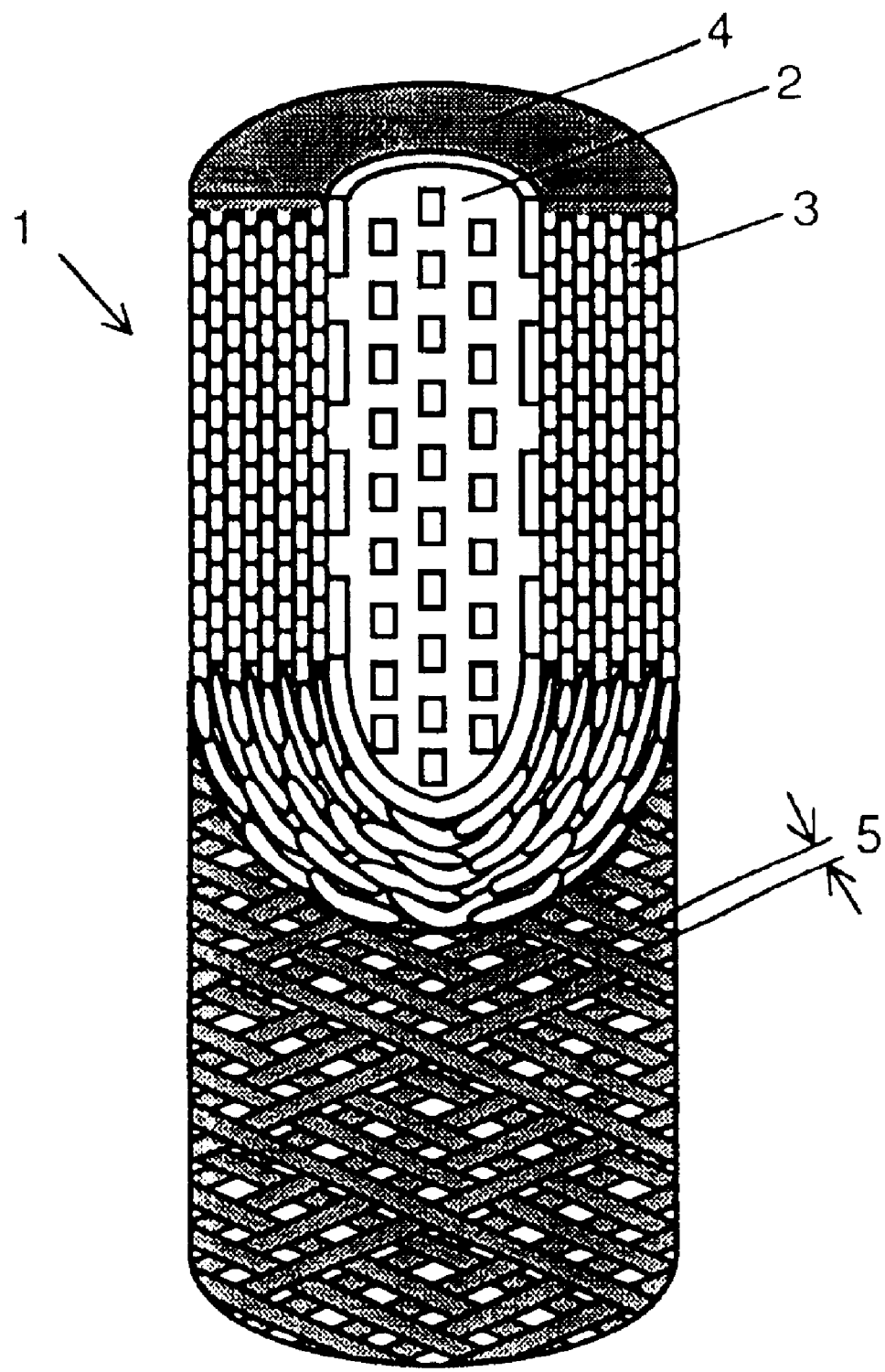
FIG. 25 is a partial cut-out perspective drawing of a filter cartridge in which an end part is fused. Code 1 represents the filter cartridge; code 2 represents a perforated cylinder; code 3 represents a converged strip of nonwoven; code 4 represents a fused end part; and code 5 represents a yarn space.
Figure 26:
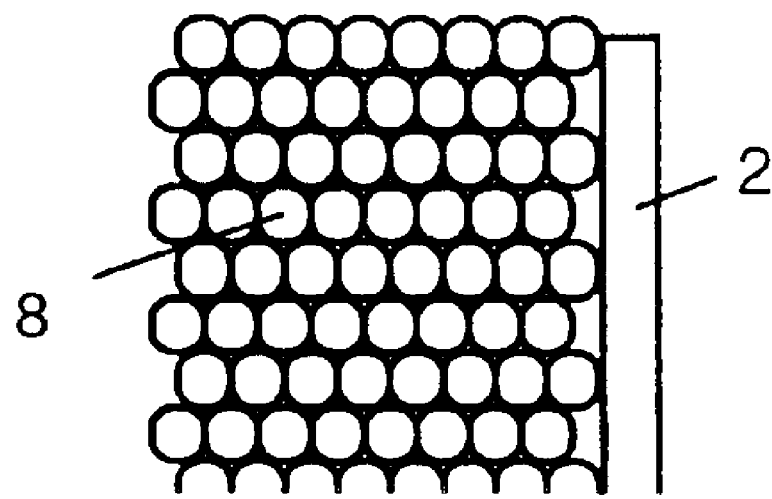
FIG. 26 is an enlarged section of an end part of a bobbin winder type filter cartridge using spun yarns. Code 2 represents a perforated cylinder, and code 8 represents a spun yarn.
Figure 27:
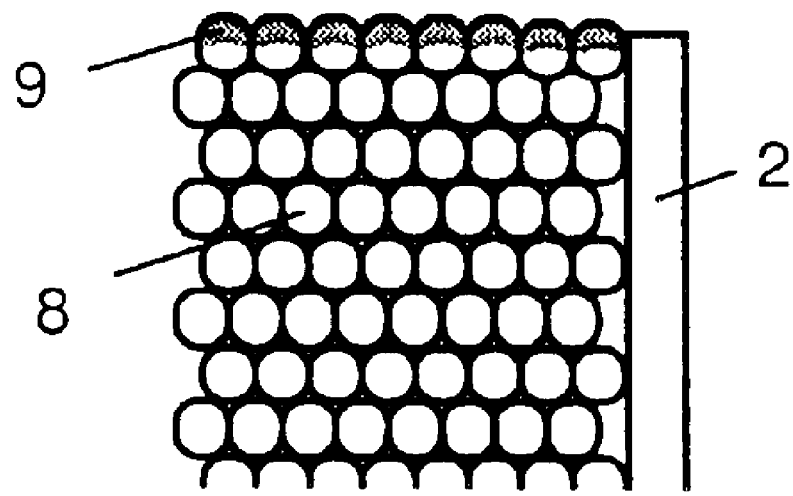
FIG. 27 is an enlarged section of an end part of a bobbin winder type filter cartridge using spun yarns in which end parts are fused. Code 2 represents a perforated cylinder; code 8 represents a spun yarn; and code 9 represents a fused end part of the bobbin winder type filter cartridge using spun yarns.

By the processing, the smooth end face-sealed parts are formed at the filter both end parts, and therefore the sealing property is improved. This effect is not obtained only by turning the filter both end parts merely into a film. Shown in FIG. 25 is a partial cut-off drawing of the filter cartridge obtained by this method, and an enlarged drawing of the end part thereof is shown in FIG. 24. This filter cartridge has a form in which a converged strip of nonwoven 3 is put together densely in an inside thereof as shown in FIG. 25. These converged strip of nonwovens 3 each have a suited elasticity as compared with that of a spun yarn. This allows the filter cartridge to be excellent in a sealing property at an end part without fusing an end face as compared with a filter cartridge prepared from a spun yarn. Further, the filter cartridge of the present invention has a structure in which a converged strip of nonwoven 7 in the vicinity of the end part is integrated with a fused end part 4 at the end part as shown in FIG. 24, and therefore it is more excellent in smoothness and elasticity. On the other hand, shown in FIG. 26 is an enlarged cross section of an end part of a bobbin winder type filter cartridge using a conventional spun yarn. The spun yarns are merely arranged at the end part of this filter cartridge, so that it has a lot of irregularities and is short of a sealing property. Further, even if an end part of a bobbin winder type filter cartridge using a spun yarn is thermally fused, the spun yarns adjacent to each other are merely bonded as shown in FIG. 27 because a spun yarn is inferior in a thermal bonding property as compared with a nonwoven, and irregularities at the end part are not smoothened. In this case, even if the temperature is further elevated, a hard film is merely formed by the spun yarns, and the end face-sealed part having a suitable elasticity is not obtained unlike the present invention.

Figure 28:
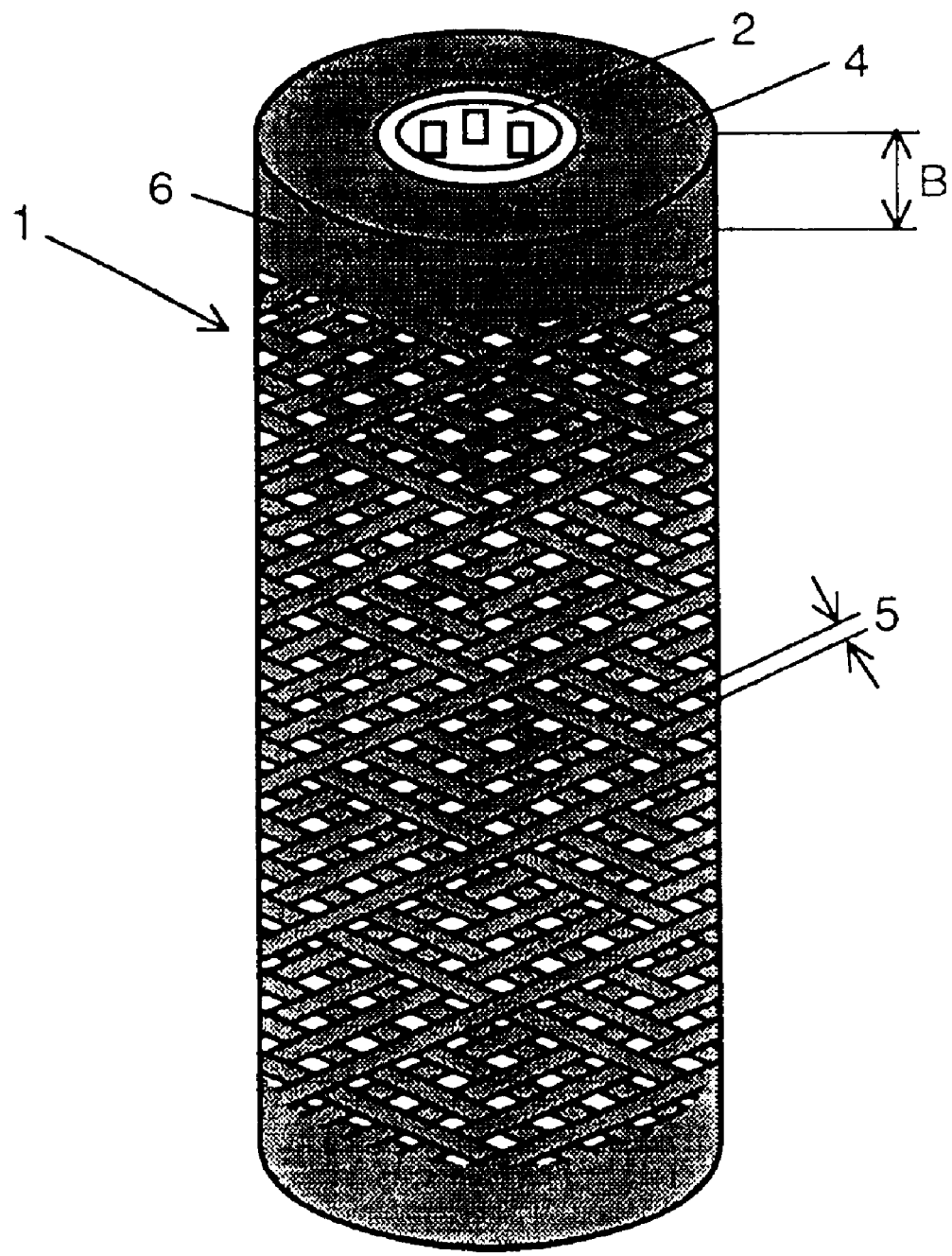
FIG. 28 is an explanatory drawing showing an appearance of the filter cartridge of the present invention which is fused up to a side face periphery. Code 1 represents the filter cartridge; code 2 represents a perforated cylinder; code 4 represents a fused end part; code 5 represents a yarn space; and code 6 represents the fused part in the side face periphery.
Figure 29:
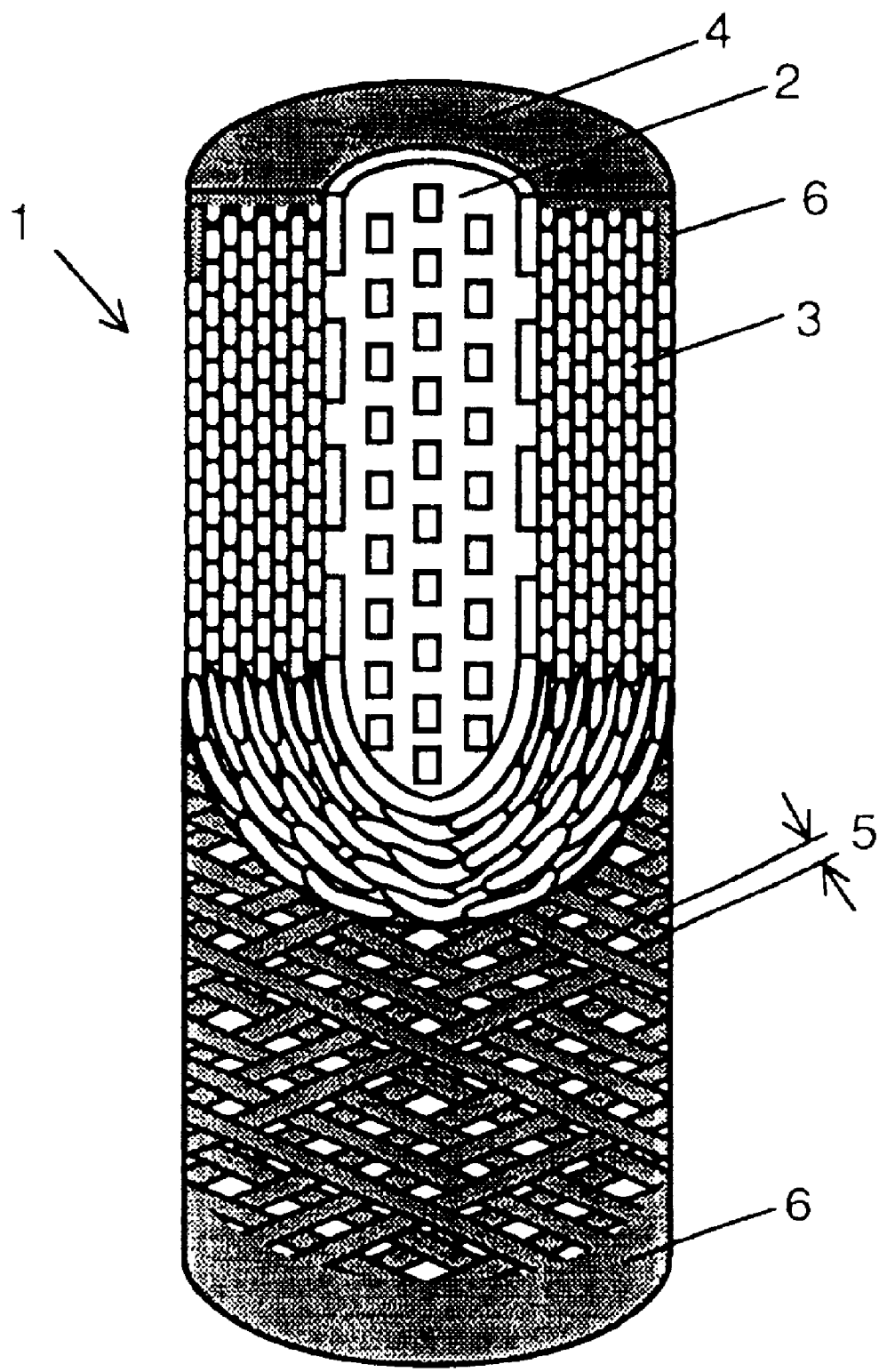
FIG. 29 is a partial cut-out perspective drawing of the filter cartridge of the present invention which is fused up to a side face periphery. Code 1 represents the filter cartridge; code 2 represents a perforated cylinder; code 3 represents a converged strip of nonwoven; code 4 represents a fused end part; code 5 represents a yarn space; and code 6 represents the fused part in the side face periphery.
Figure 30:
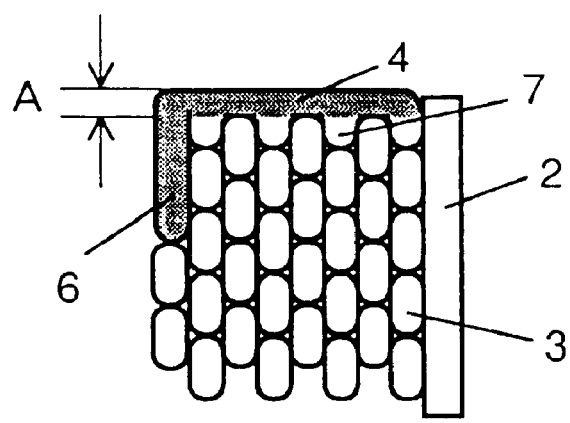
FIG. 30 is an enlarged section of an end part of the filter cartridge of the present invention which is fused up to a side face periphery. Code 2 represents a perforated cylinder; code 3 represents a converged strip of nonwoven; code 4 represents a fused end part; code 6 represents the fused part in the side face periphery; and code 7 represents the converged strip of nonwoven bonded to the fused end part.

Thus, only fusion of the strip of nonwoven constituting the filter both end parts allows the smooth end face-sealed parts to be formed to elevate the sealing property, and the strip of nonwoven constituting the end part of the filter cartridge through the periphery of the filter side face may be fused as shown in FIG. 28. This further elevates a form stability of the filter cartridge. A length B in fusion shall fall in a range where a liquid permeability of the filter cartridge is not extremely damaged. A partial cut-off drawing of this filter cartridge and an enlarged drawing of an end part thereof are shown in FIG. 29 and FIG. 30 respectively.

On the other hand, instead of fusing the strip of nonwoven constituting the filter both end parts as it is by heating, a sheet comprising the same resin as at least one of the thermoplastic resins which are the components of the thermoplastic fiber used for the strip of nonwoven constituting the filter both end parts described above is stuck on the surfaces of the filter both end parts, and it may be fused if necessary to form the end face-sealed part described above. In this case, a propylene homopolymer and a propylene-α-olefin copolymer can be deemed to be the same resin.

A method using a binder and a hot bonding method can be given as examples of the sticking method, and preferred is the hot bonding method having less problems on peeling.

The sheet described above shall not specifically be restricted as long as it has a sheet shape, such as a film, a nonwoven and a woven fabric. Further, even if the resin used for the sheet described above is different from the thermoplastic resin which is the component of the thermoplastic fiber used for the strip of nonwoven, it can be used if it has a high compatibility.

Use of a composite fiber comprising a low melting point resin and a high melting point resin for the fibers constituting the strip of nonwoven makes it easy to control a degree of fusion and therefore makes it easy as well to control a void rate of the end part.

The fourth invention in the present invention shall specifically be described.

Figure 31:
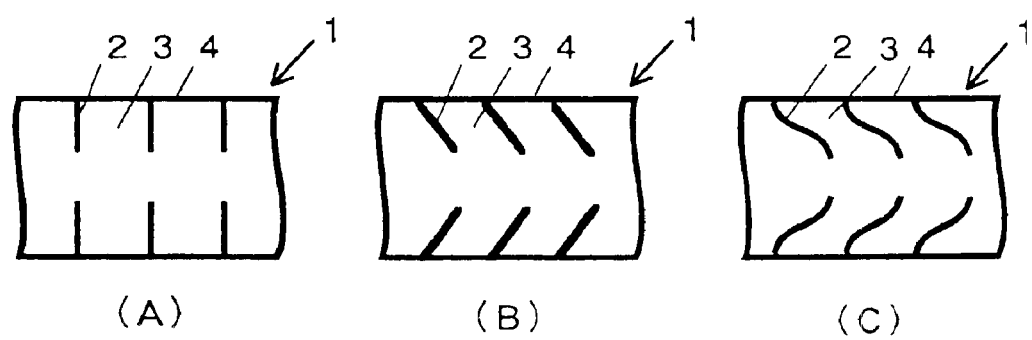
FIG. 31 is a drawing showing an example of the tongue section part of a strip of nonwoven having a tongue section part used in the present invention. Code 1 represents a nonwoven having a tongue section part; code 2 represents a cut (including a case where it is formed by removing the nonwoven); code 3 represents a tongue section part; and code 4 represents an edge of a strip of nonwoven.
Figure 32:
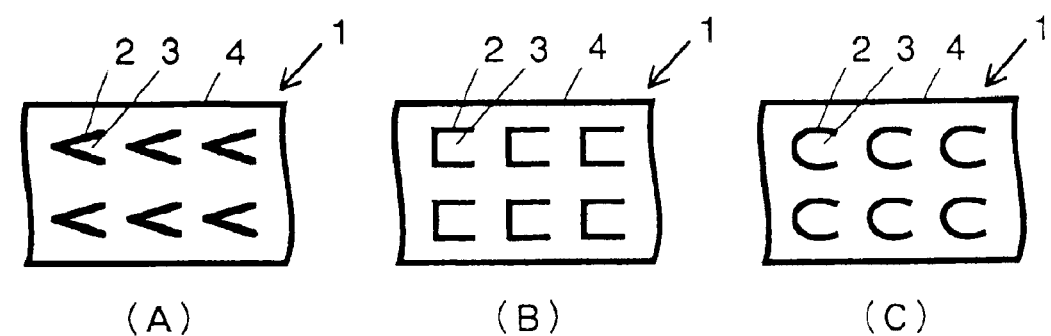
FIG. 32 is a drawing showing an example of the tongue section part of a strip of nonwoven having a tongue section part used in the present invention. Code 1 represents a nonwoven having a tongue section part; code 2 represents a cut (including a case where it is formed by removing the nonwoven); code 3 represents a tongue section part; and code 4 represents an edge of a strip of nonwoven.

The fourth embodiment in the present invention is a filter cartridge 1 prepared by converging a strip of nonwoven comprising a thermoplastic fiber obtained by bonding at least a part of fiber intersections and which has a tongue section part shown in FIG. 31 and FIG. 32 and then winding it around a perforated cylinder 2 shown in FIG. 4 in a twill form. Use of the strip of nonwoven having a tongue section part as a material for the filtration layer in the filter cartridge allows particles which passed through gaps and therefore could not be trapped in the past to be trapped by the tongue section part because of the presence of the tongue section part in a gap formed by a converged matter of the strip of nonwoven to elevate the trapping efficiency. Further, an increase in the particle trapping area brought about by irregularities in the tongue section part allows a trapping amount of the particles to grow large, whereby a filtering accuracy and a filter life of the filter cartridge becomes excellent.

Used as a material for the filter cartridge of the present invention is the strip of nonwoven (hereinafter referred to as a tongue section part-containing strip of nonwoven) which comprises a thermoplastic fiber, in which at least a part of fiber intersections is bonded and which has a tongue section part.

The tongue section part-containing strip of nonwoven described above is obtained by slitting a non-processed nonwoven (hereinafter referred to as an original nonwoven) into a desired width and then passing it through a space between a pressurized bladed roll and a rubber roll to provide cuts. Slitting may be carried out after providing the original nonwoven with cuts.

The original nonwoven described above has a void rate of 60 to 95%, preferably 65 to 92%. When using the tongue section part-containing strip of nonwoven obtained from the original nonwoven having a void rate of 60 to 95%, a filtration layer in the cylindrical filter is inhibited from becoming denser than necessary and sufficiently controlled in a pressure loss when it is used as a filter, and the particle trapping efficiency can be elevated more. A void rate of the original nonwoven which is controlled to 95% or less makes it easy to wind the tongue section part-containing strip of nonwoven around a perforated cylinder and makes it possible to reduce more a deformation of the resulting cylindrical filter caused by a loaded pressure.

Next, the tongue section part shall be explained. The tongue section part is formed by providing a part of the strip of nonwoven with cuts or removing a part of the nonwoven. Shown as examples of the tongue section part are a form in which a cut 2 which is a tongue section part 3 is given from an edge 4 of the strip of nonwoven as shown in FIG. 31(A), (B) and (C) and a form in which a cut 2 of a form which is a tongue section part 3 is given in a face of the strip of nonwoven as shown in FIG. 32(A), (B) and (C). The tongue section parts 3 formed on the strip of nonwoven may not have the same length and size. Allowed to be present in a mixed state are the parts having cuts which are different in a direction of the cuts, a form and a direction of the form, or the parts may have a form in which the forms shown in FIG. 31 and FIG. 32 are combined. Also, a position of the tongue section parts 3 in the strip of nonwoven 1 may not be completely symmetric to a longitudinal direction. Further, they may be disposed on one side. Supposing that a direction in which the tongue section part-containing strip of nonwoven 1 is precedently wound around a perforated cylinder is an upper stream and a reverse direction is a down stream, preferred are a form in which the cuts are given from the upper stream toward the down stream in the case of the form shown in FIG. 31 and a form in which a part connected to the strip of nonwoven is present at a down stream side in the case of the form shown in FIG. 32, since the tongue section parts 3 are liable to stand when the strip of nonwoven is squeezed through a guide of a winder in winding it around the perforated cylinder, and an effect exerted by the tongue section parts 3 is more notably exhibited.

Examples of a method for forming the tongue section parts on the strip of nonwoven include a method in which a metal mold for pressing having a blade for giving cuts which are tongue section parts is used to pass a strip of nonwoven through a continuous pressing machine for a tape, in which the metal mold is set, a method in which a strip of nonwoven is passed through a space pressurized by means of a roll having a blade for giving cuts which are tongue section parts at one side and a flat roll, a method in which cutting is carried out by high pressure stream and a method in which a heated blade is pressed or the nonwoven is molten and removed by means of a laser beam. Tongue section parts may be processed on an original nonwoven, and then it may be slit to obtain a tongue section part-containing nonwoven.

Figure 33:
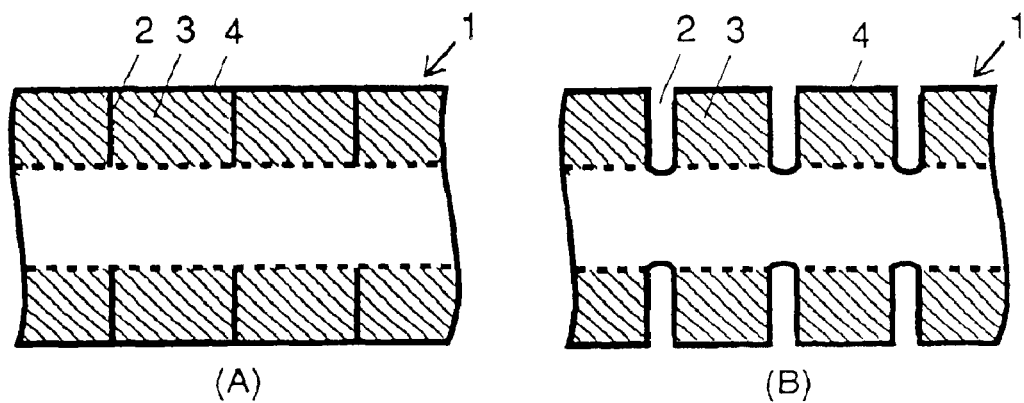
FIG. 33 is a drawing showing an area of the tongue section part shown in FIG. 31. Code 1 represents a nonwoven having a tongue section part; code 2 represents a cut (including a case where it is formed by removing the nonwoven); code 3 represents a tongue section part; and code 4 represents an edge of the strip of nonwoven.
Figure 34:
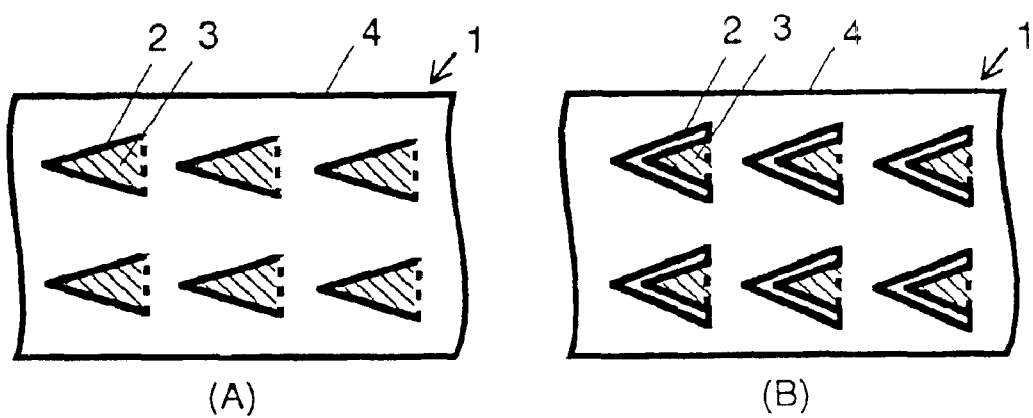
FIG. 34 is a drawing showing an area of the tongue section part shown in FIG. 32. Code 1 represents a nonwoven having a tongue section part; code 2 represents a cut (including a case where it is formed by removing the nonwoven); code 3 represents a tongue section part; and code 4 represents an edge of the strip of nonwoven.

The whole area of the tongue section parts described above accounts for 10 to 80% based on the whole area of the tongue section part-containing strip of nonwoven. When the nonwoven is removed, an area of a part thereof is not included in calculation. If the tongue section parts have an area ratio of less than 10%, a rise in the filtering accuracy and the filter life given by the tongue section parts is not revealed. On the other hand, if it exceeds 80%, the tongue section part-containing nonwoven is reduced in a strength, and it becomes difficult to process the nonwoven into a filter cartridge. An area of the tongue section parts described above corresponds to an obliquely lined part which is surrounded by an edge 4 of the strip of nonwoven, a cut 2 and a line (shown by a broken line) obtained by connecting both end parts of the cut 2 as shown in FIG. 33 (A) or (B) in the case of a form shown in FIG. 31 and an obliquely lined part which is surrounded by a cut 2 and a line (shown by a broken line) obtained by connecting ends of the cut 2 as shown in FIG. 34(A) or (B) in the case of a form shown in FIG. 32.

Preferably used as well is a method in which the tongue section part-containing strip of nonwoven described above is twisted and then wound around a perforated cylinder. If the tongue section part containing strip of nonwoven is twisted, the tongue section parts stand up on the tongue section part-containing strip of nonwoven, and a state thereof is firmly held, so that an effect given by the tongue section parts is elevated as compared with the case where the nonwoven is not twisted. Further, a void rate of the tongue section part-containing strip of nonwoven can be changed by twisting number per unit length, and therefore the filtering accuracy can be controlled. The preferred twisting number has already been described. The filter cartridge has been produced according to the process described above.

The fifth invention in the present invention shall specifically be described.

The fifth embodiment in the present invention is a filter cartridge prepared by concurrently winding at least two strips of nonwoven comprising a thermoplastic fiber around a perforated cylinder in a twill form.

Winding at least two strips of nonwovens around the perforated cylinder at the same time turns the filter cartridge of the present invention into a filter cartridge which is more excellent in a water permeability and a life than a filter cartridge prepared by winding a single strip of nonwoven. Further, controlling a width and a number of the strip of nonwoven wound makes it possible to control a filtering accuracy of the filter cartridge more easily than changing the winding conditions.

In this case, the total value of width×mass per unit area of the strip of nonwovens which are wound at the same time is preferably 200 cm g/m² or less. If this value is larger than 200 cm g/m², a rigidity of the strip of nonwoven becomes too strong, and therefore it is difficult to wind it around a perforated cylinder in a twill form. Further, the fiber amount is increased too much, and therefore it is difficult to wind the nonwoven densely. Also when a spinning width is controlled to directly prepare a strip of nonwoven, the preferred ranges of the mass per unit area and the nonwoven width are the same as those of the strip of nonwoven prepared by slitting. Further, supposing that the widths of the strip of nonwovens are designated as $L_1, L_2, L_3, \ldots L_n$ (mm) and the winding numbers of the strip of nonwovens having the respective widths are designated as $N_1, N_2, N_3, \ldots N_n$, the total value of width×winding number falls preferably in a range of 7 to 150 as shown in a relation of the following equation (A):

$$7 \leq (L_1 \times N_1) + (L_2 \times N_2) + \ldots + (L_n \times N_n) \leq 150 \quad (A)$$

provided that the total of $N_1 + N_2 + \ldots + N_n$ is an integer of 2 or more.

If this value is smaller than 7, the fiber amount becomes too small, and therefore it is difficult to control the filtering accuracy. On the other hand, if it is larger than 150, the fiber amount becomes too much, and therefore it is difficult to wind the nonwoven densely. Also when a spinning width is controlled to directly prepare a strip of nonwoven, the range of the equation (A) described above is the same as that of the strip of nonwoven prepared by slitting.

Figure 35:
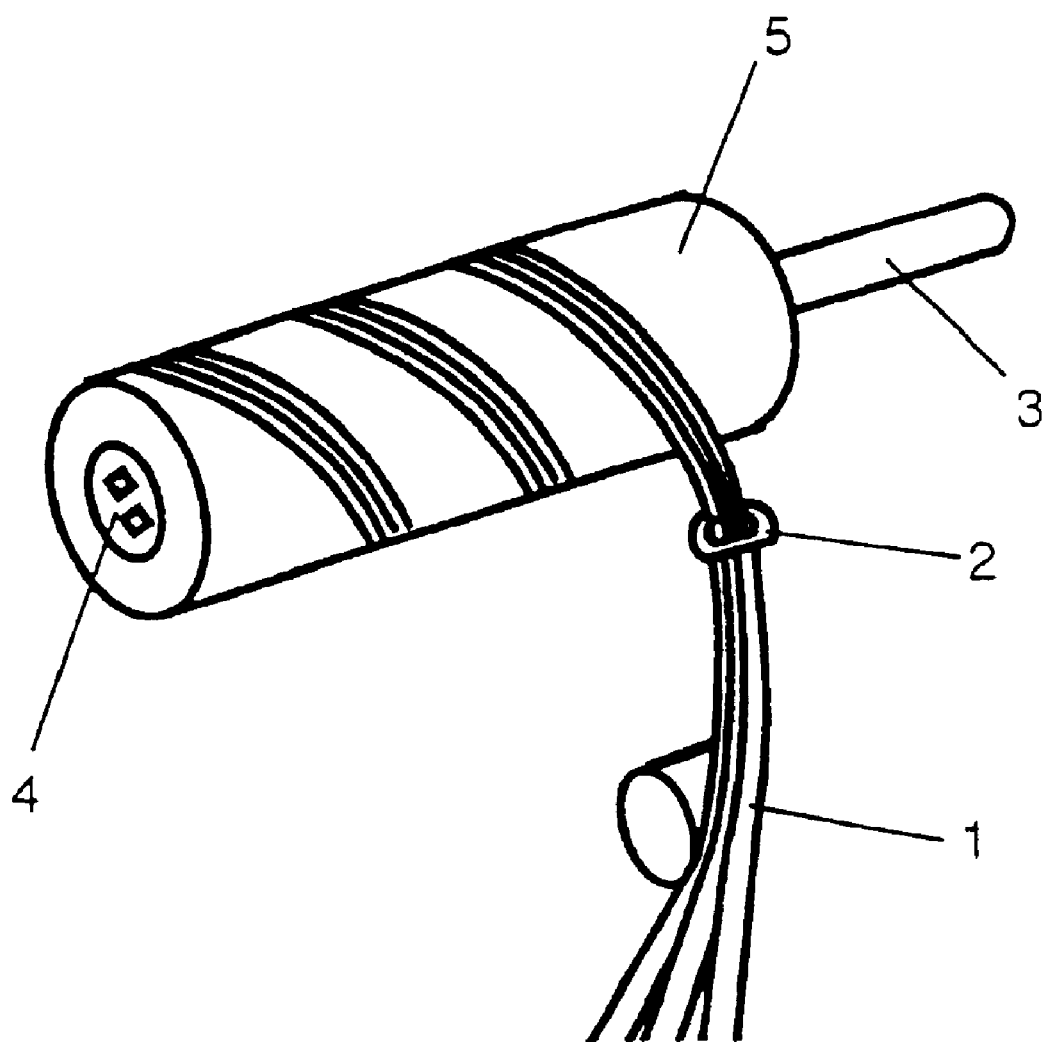
FIG. 35 is an explanatory drawing showing a state in which two or more strip of filament nonwovens are wound as they are without processing. Code 1 represents a strip of filament nonwoven or a converged matter thereof; code 2 represents a traverse guide; code 3 represents a bobbin; code 4 represents a perforated cylinder; and code 5 represents a filter cartridge.

The strip of nonwoven described above may be wound around a perforated cylinder in a twill form after processed by a method described later, or it may be wound as it is without processing. One example of the production processes in this case is shown in FIG. 35. A winder used for a conventional bobbin winder type filter cartridge can be used for the winding machine. The strip of nonwoven 1 fed passes through a traverse guide 2 of a narrow hole moving while traversing and then is wound around a perforated cylinder 4 mounted on a bobbin 3, whereby a filter cartridge 5 is prepared. Various ones having a narrow hole can be used for this traverse guide 2. Capable of being used are, for example, ones having forms such as a circular form, an elliptical form and a flat form. Further, those having an aperture part at one end of the narrow hole can be used as well.

Figure 36:
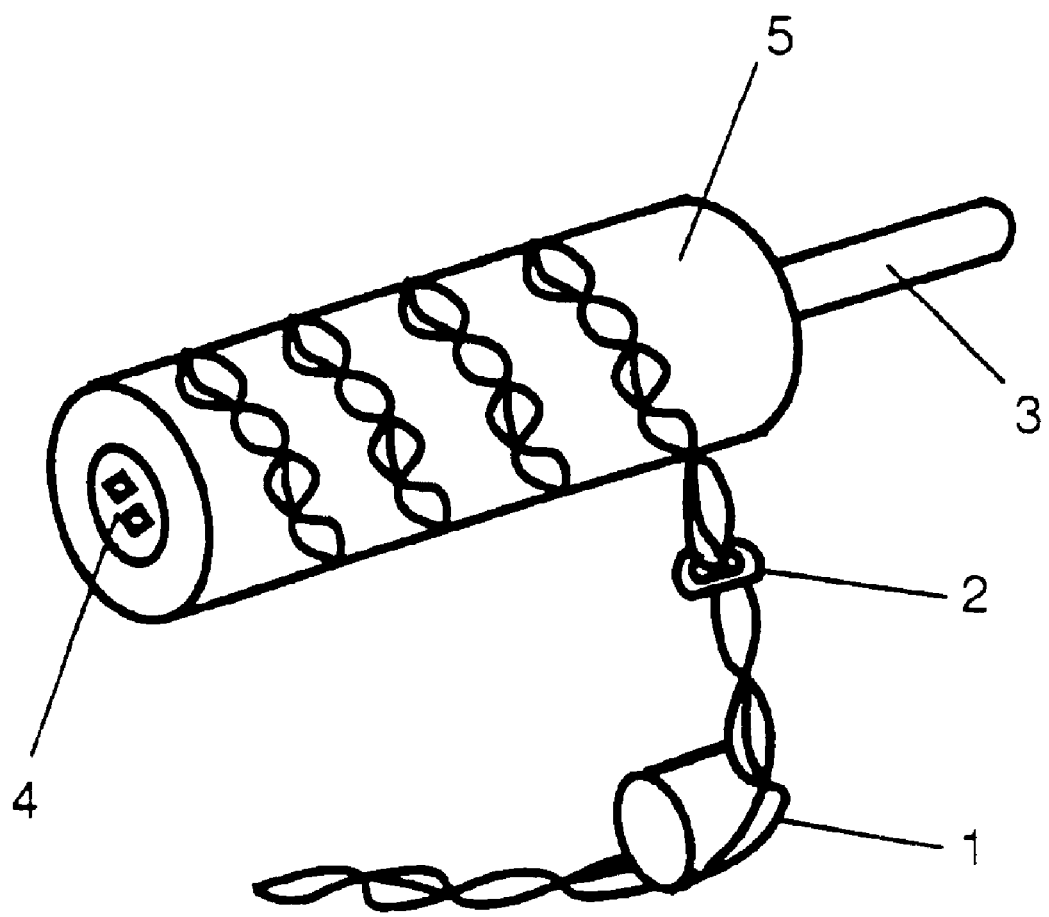
FIG. 36 is an explanatory drawing showing a state in which two or more strip of filament nonwovens are wound while twisting. Code 1 represents a strip of filament nonwoven or a converged matter thereof; code 2 represents a traverse guide; code 3 represents a bobbin; code 4 represents a perforated cylinder; and code 5 represents a filter cartridge.

On the other hand, the strip of nonwoven described above can be wound as well around a perforated cylinder in a twill form after twisted or converged into a pleated matter (hereinafter referred to as a strip of nonwoven-pleated matter). One example of production processes in twisting is shown in FIG. 36. Also in this case, a winder used for a conventional bobbin winder type filter cartridge can be used for the winding machine. The strip of nonwoven is apparently thickened by winding, so that this traverse guide 2 has preferably a larger hole diameter than in the case of FIG. 35. If the strip of nonwoven is twisted, an apparent void rate of the strip of nonwoven can be changed by the number of twisting per unit length or the twisting strength, and therefore the filtering accuracy can be controlled. In this case, the twisting number falls preferably in a range of 50 to 1000 rounds per meter of the strip of nonwoven. If this value is smaller than 50 rounds, the twisting effect is scarcely obtained. On the other hand, if this value is larger than 1000 rounds, the resulting filter cartridge is inferior in a liquid permeability, and therefore it is not preferred.

The liquid permeability can be improved by providing the strip of nonwoven with cut lines or drilling holes in it. In this case, the number of the cut lines is suitably 5 to 100 cuts per 10 cm of the strip of nonwoven. When drilling holes, a proportion of the aperture part area is suitably controlled to 10 to 80%. In winding the plural strip of nonwovens around a perforated cylinder at the same time, other yarns such as a spun yarn are wound together, whereby the filter performance can be controlled. In winding the plural strip of nonwovens at the same time while traversing, a broad nonwoven is wound together, whereby a maximum flow particle diameter in preparing a filter cartridge having a rough accuracy can be controlled as well.

EXAMPLES

The present invention shall be explained below in further details with reference to examples and comparative examples, but the present invention shall not be restricted to these examples. In the respective examples, the physical properties of the filter materials and the filtering performances were evaluated by methods described below. The evaluation results thereof are shown in Tables 1 and 2.

Winder:

A traverse width (width of traversing) was 250 mm, and a winder in which a hole of a traverse guide (12 in FIG. 5) had a diameter of 5 mm was used. An initial speed of a spindle was set up to 1500 rpm.

Mass Per Unit Area and Thickness of Nonwoven:

The nonwoven was cut off so that an area of the cut nonwoven was 625 cm² (a case of a filter cartridge in which an end face-sealed part was provided: 500 cm²), and the weight thereof was determined and converted to a weight per square meter to obtain a mass per unit area. Further, a thickness of the cut nonwoven was measured optionally at 10 points, and the values of 8 points excluding the maximum value and the minimum value were averaged to obtain the thickness (μm) of the nonwoven.

In the cases of the aperture part containing nonwoven and the tongue section part containing nonwoven, parts having lengths in which the whole areas thereof including the aperture parts were 400 cm² were cut off from the nonwovens, and the weights thereof were determined and converted to the weights per 1 m² to obtain the mass per unit area's (g/m²).

Fineness of Nonwoven:

The nonwoven was sampled at 5 spots at random, and the samples were photographed through a scanning type electron microscope, wherein 20 fibers per spot were selected at random to measure the diameters of the fibers, and an average value thereof was calculated to obtain a fiber diameter (μm) of the nonwoven. The fineness (dtex) was determined from the following equation using the fiber diameter thus obtained and the density (g/cubic centimeter) of the raw material resin of the nonwoven. When two or more kinds of fibers were mixed, the respective fibers were measured in the manner described above to calculate the finesses of the respective fibers.

(Fineness)=π(fiber diameter)$^2$×(density)/400

The cross-sectional form of the pleated matter was fixed by an adhesive and then cut at 5 spots in optional positions to photograph the cross sections thereof through a microscope. The fold number of the strip of long finer nonwoven was counted from the photographs, wherein either of inverted V folding and V folding was counted as one, and the pleat number was shown by a half of the average number in the five cut spots.

Cross-Sectional Area and Void Rate of Strip of Filament Nonwoven-Converged Matter:

The cross-sectional form of the strip of filament nonwoven converged matter was fixed by an adhesive and then cut at 5 spots in optional positions to photograph the cross sections thereof through a microscope. The photographs were subjected to image analysis to determine a cross-sectional area of the strip of filament nonwoven-converged matter. Further, the strip of filament nonwoven-converged matter was cut to a length of 10 cm at different spots to determine the void rate from the weight thereof and the cross-sectional area obtained above using the following equation:

(Apparent volume of strip of filament nonwoven-converged matter)=(cross-sectional area of strip of filament nonwoven-converged matter)×(cut length of strip of filament nonwoven-converged matter)

(True volume of strip of filament nonwoven-converged matter)=(weight of strip of filament nonwoven-converged matter)/(density of raw material resin for strip of filament nonwoven-converged matter)

(Void rate of strip of filament nonwoven-converged matter)={1−(true volume of strip of filament nonwoven-converged matter)/(apparent volume of strip of filament nonwoven-converged matter)}×100(%)

Aperture Part Area Ratio of Aperture Part-Containing Strip of Nonwoven:

A strip of nonwoven having a length in which the whole area including the aperture part was 400 cm$^2$ was cut out from the aperture part-containing strip of nonwoven, and the whole area (unit: cm$^2$) of the aperture part was measured to calculate an aperture part area ratio (%) from the following equation:

(aperture part area ratio)={(whole area of aperture part)/400 cm$^2$}×100(%)

Tongue Section Part Area Ratio of Tongue Section Part-Containing Strip of Nonwoven:

A strip of nonwoven having a length in which the whole area including the tongue section part was 400 cm$^2$ was cut out from the tongue section part-containing strip of nonwoven, and the whole area (unit: cm$^2$) of the tongue section part was measured to calculate a tongue section part area ratio (%) from the following equation:

(tongue section part area ratio)={(whole area of tongue section part)/400 cm$^2$}×100(%)

Pleat Number of Pleated Matter:

The pleated matter was fixed by an adhesive and then cut at 5 spots to photograph the cross sections thereof through a microscope. The fold number of the tongue section part-containing strip of nonwoven was counted from the photographs, wherein either of inverted V folding and V folding was counted as one. The fold number of the five cut spots was averaged, and the pleat number was shown by a half of the value thereof.

Yarn Space:

A space (shown in 32 of FIG. 6) between the strip of nonwoven present on the surface and the strip of nonwoven adjacent thereto was measured at 10 spots per one filter cartridge, and the average thereof was calculated to obtain the yarn space. A part of the tongue section part was excluded from measurement.

Void Rate of Filtration Layer in Filter Cartridge:

A major diameter, a length and a weight of the filter cartridge were measured to determine the void rate. In order to determine the void rate of the filtration layer itself, a major diameter of the perforated cylinder was used for the value of the minor diameter, and a value obtained by deducting the weight of the perforated cylinder from the weight of the filter cartridge was used for a value of the weight:

(Apparent volume of filtration layer)=π{(major diameter of filter)$^2$−(minor diameter of filter)$^2$}×(filter length)/4

(True volume of filtration layer)=(weight of filtration layer)/(density of raw material resin of filtration layer)

(Void rate of filtration layer)={1−(true volume of filtration layer)/(apparent volume of filtration layer)}×100(%)

Initial Trapped Particle Diameter, Initial Pressure Loss and Filter Life:

One filter cartridge was mounted to a housing of a circulating type filtering performance testing machine, and a flow amount was controlled to 30 liter/minute by means of a pump to carry out flow and circulation. In this case, an initial pressure loss was shown by a pressure loss before and after the filter cartridge. Next, a cake prepared by mixing 8 kinds of testing powder I prescribed in JIS Z 8901 (abbreviated as JIS 8 kinds; intermediate diameter: 6.6 to 8.6 μm) with 7 kinds of the same powder (abbreviated as JIS 7 kinds; intermediate diameter: 27 to 31 μm) in a weight proportion of 1:1 was continuously added to circulating water at 0.4 g/minute, and the solution before filtering and the filtrate were sampled after 5 minutes since starting addition. They were diluted to prescribed concentrations, and then the numbers of particles contained in the respective solutions were measured by means of a light shielding type particle detector to calculate an initial trapping efficiency in each particle diameter. Further, the value thereof was interpolated to determine a particle diameter showing a trapping efficiency of 80%. The cake was continuously added further, and when the pressure loss of the filter cartridge reached 0.2 MPa, the solution before filtering and the filtrate were sampled as well to determine a trapped particle diameter in 0.2 MPa. A filter life was shown by time consumed from starting addition of the cake until reaching 0.2 MPa. When the pressure difference did not reach 0.2 MPa even after the filter life reached 1000 minutes, the measurement was discontinued at the point of time. As described above, a perforated plastic molded article which was void in an inside was used as a dummy, and only the respective layers were formed on the same conditions to measure initial 80% trapped particle diameters in the respective layers. In the case of the strip of nonwoven having tongue section parts, sampled solutions were diluted to prescribed concentrations, and then the numbers of particles of every particle diameter contained in the respective solutions were measured by means of a light shielding type particle detector to calculate an trapping efficiency in every particle diameter. Next, the value thereof was interpolated to determine particle diameters showing trapping efficiencies of 80% and 98% to obtain a filtering accuracy (1) and a filtering accuracy (2) (μm) respectively.

Maximum Passing Particle Diameter and Sealing Property of End Face:

A cake was continuously added at 0.4 g/minute in the same manner as in measuring the initial 80% trapped particle diameters described above, and a filtrate was sampled after 5 minutes since starting addition. Particles contained in 50 cm³ of the filtrate were filtered through a nitrocellulose membrane filter paper having a pore diameter of 0.8 μm in which ruled lines of lattices with a space of 5 mm were provided. Ten lattices drawn on the filter paper were optionally selected to determine a circle-corresponding diameter of a maximum particle present therein as a maximum passing particle diameter in the filter. On the other hand, an end face of a filter cartridge prepared on the same conditions was completely sealed by an adhesive, and the filter cartridge was completely bonded to the housing by an adhesive, whereby leaking from the end face was completely stopped. The same measurement was carried out, and a result thereof was compared with the result obtained above to evaluate the sealing property.

Bubbling of Initial Filtrate and Fiber Falling:

One filter cartridge was mounted to a housing of a circulating type filtering performance testing machine, and a flow amount was controlled to 10 liter/minute by means of a pump to pass ion-exchanged water. One liter of an initial filtrate was sampled, and 25 cubic centimeter out of it was taken into a colorimetric bottle and stirred vigorously to observe bubbling 10 seconds after stopping stirring. Bubbling was judged by × when a volume of bubble (volume observed from a liquid surface up to the top of bubble) was 10 cubic centimeter or more, Δ when 5 or more bubbles having a volume of less than 10 cubic centimeter and a diameter of 1 mm or more were observed and ○ when less than 5 bubbles having a diameter of 1 mm or more were observed. Further, the initial filtrate of 500 cubic centimeter was passed through a nitrocellulose filter having a pore diameter of 0.8 μm to judge fiber falling, wherein a case where 4 fibers or more having a length of 1 mm or more per one square centimeter of the filter paper were observed was shown by X; a case where 1 to 3 fibers were observed was shown by Δ; and a case where no fibers were observed was shown by ○.

Shown below were examples in the case of the filter cartridge comprising the first filtration layer and the second filtration layer according to the first prevention of the present invention.

Example 1

Used as a second filtration layer was a matter obtained by winding a polypropylene-made melt blown nonwoven having a mass per unit area of 50 g/m², a thickness of 300 μm and a fiber diameter of 2 μm in a layer form of 1.1 round around a perforated cylinder which was a polypropylene-made injection-molded article having a minor diameter of 30 mm, a major diameter of 34 mm and a length of 250 mm and in which 180 holes of 6 mm square were drilled. A polypropylene-made spun-laid nonwoven which had a mass per unit area of 22 g/m², a thickness of 200 μm and a fineness of 2 dtex and in which fiber intersections were thermally compression-bonded by means of a hot embossing roll was used as a filament nonwoven for a strip of filament nonwoven. The filament nonwoven was slit to a width of 50 mm to obtain a strip of filament nonwoven. The second layer was provided on a bobbin of a winder, and a guide of a circular hole having a diameter of 5 mm was disposed on a yarn passage on the way to the winder to converge the strip of filament nonwoven to a diameter of about 5 mm. It was wound on the second filtration layer around the perforated cylinder at a spindle initial speed of 1500 rpm until the major diameter reached 62 mm while controlling a winding number so that a space between the strip of filament nonwovens became 1 mm, whereby a filter cartridge 3 shown in FIG. 18 was obtained.

Example 2

A cylindrical filter cartridge was obtained by the same method as in Example 1, except that the filament nonwoven was slit to a width of 10 mm and the winding number was controlled so that the yarn space became 1 mm. This filter had the same performance as in Example 1. However, time required for winding was extended more than in Example 1.

Example 3

A cylindrical filter cartridge was obtained by the same method as in Example 1, except that a sheath-core composite fiber comprising a linear low density polyethylene (melting point: 125° C.) as a low melting point component and a polypropylene as a high melting point component in a weight ratio of 5:5 was used as the structural fiber for the filament nonwoven. This filter had a longer filter life than that of the filter described in Example 1. This is considered to be attributable to the fact that since the fiber intersections in the first filtration layer were firmly bonded, the first filtration layer had a stabilized trapping capacity and load exerted on the second filtration layer was reduced.

Example 4

A cylindrical filter cartridge was obtained by the same method as in Example 3, except that the hot bonding method of the fiber intersections was changed from the hot embossing roll to a hot air-circulating type heater. This filter had a little shorter filter life than that of the filter described in Example 3. This is considered to be attributable to the fact that the fiber intersections in the first filtration layer were not so firmly bonded as in Example 3.

Example 5

A cylindrical filter cartridge was obtained by the same method as in Example 1, except that a fineness of the filament nonwoven was changed to 10 dtex. This filter had a shorter filter life than that of the filter described in Example 1.

Example 6

A cylindrical filter cartridge was obtained by the same method as in Example 1, except that the strip of filament nonwoven was not converged and was twisted by 100 rounds per meter. This filter had the same performance as that of the filter described in Example 1.

Example 7

The strip of filament nonwoven was processed into a cross-sectional form shown in FIG. 13(A) to obtain a pleated matter having 4 pleats. A cylindrical filter cartridge was obtained by the same method as in Example 1, except that the pleated matter was substituted for the converged, strip of filament nonwoven. This filter had a little longer filter life than that of the filter described in Example 1 but was increased in pressure loss. The reason why the pressure loss grew large as compared with the filter described in Example 1 is that since the pleats of the pleated matter were parallel, a filtering pressure was exerted from a direction perpendicular to the pleats, so that a void rate of the filter was reduced.

Example 8

The strip of filament nonwoven was processed into a cross-sectional form shown in FIG. 13(B) to obtain a pleated matter having 7 pleats. A cylindrical filter cartridge was obtained by the same method as in Example 7, except that the pleated matter was used. This filter was an excellent filter having the same water permeability as that of the filter described in Example 1 though it had a longer life than that of the filter described in Example 1.

Example 9

The strip of filament nonwoven was processed into a cross-sectional form shown in FIG. 13(C) to obtain a pleated matter having 15 pleats. A cylindrical filter cartridge was obtained by the same method as in Example 7, except that the pleated matter was used. This filter was an excellent filter having the same water permeability as that of the filter described in Example 1 though it had a further longer life than that of the filter described in Example 8.

Example 10

A cylindrical filter cartridge was obtained by the same method as in Example 9, except that another pleat-forming guide was used to change the pleat number of the strip of filament nonwoven to 41. This filter was an excellent filter having the same water permeability as that of the filter described in Example 1 though it had a further longer life than that of the filter described in Example 9.

Example 11

A cylindrical filter cartridge was obtained by the same method as in Example 9, except that the strip of filament nonwoven was densely converged to change a void rate of the pleated matter to 72%. This filter had a shorter life than that of the filter obtained in Example 9.

Example 12

The same melt blown nonwoven as in Example 1 was used as a nonwoven for rolling in. The same strip of filament nonwoven as in Example 1 was used as well. The strip of filament nonwoven was wound around the same perforated cylinder in a twill form on the same conditions as in Example 1 until the major diameter reached 45 mm. Then, the strip of filament nonwoven was continued to be wound in a twill form while the nonwoven for rolling in was wound in a layer form by 1.1 round. Further, only the strip of filament nonwoven was continuously wound in a twill form until the major diameter reached 62 mm to obtain a cylindrical filter cartridge. This filter had an accuracy of the same degree as in Example 1 and was a little excellent in water permeability. This is considered to be attributable to the fact that the nonwoven of a layer form was positioned in an outer side than in Example 1, so that the nonwoven was increased in a surface area.

Example 13

Prepared was a polypropylene-made melt blown nonwoven which had a fiber diameter of 1 µm and a mass per unit area of 30 g/m$^2$ and which was compressed by a flat roll until the void rate became-0.50%. A polypropylene-made spun-laid nonwoven having a mass per unit area of 22 g/m$^2$ and a fineness of 2 dtex was superposed on both sides of the melt blown nonwoven and subjected to pleat folding processing at a supercrest of 8 mm, and it was cut at 75 threads per inch. Both ends thereof were connected to obtain a cylinder, and it was disposed around the same perforated cylinder as in Example 1 and used as the second filtration layer. The first filtration layer was formed around it by the same method as in Example 1 to obtain a cylindrical filter cartridge shown in FIG. 19.

Example 14

A sheath-core composite fiber having a fineness of 2 dtex and a fiber length of 64 mm and comprising a high density polyethylene and a polypropylene was webbed by means of a card machine, and it was heated at 145° C. by means of a far infrared heater and wound around a stainless steel-made mandrel of 1.5 kg per meter until the major diameter reached 45 mm. After cooling down, the mandrel was pulled out to obtain a cylinder. A cylindrical filter cartridge was obtained by the same method as in Example 1, except that the cylinder was used for the second layer.

Comparative Example 1

A cylindrical filter cartridge was obtained by the same method as in Example 1, except that a polypropylene-made spun yarn having a diameter of 2 mm which was obtained by spinning a fiber having a fineness of 3 dtex was substituted for the strip of filament nonwoven and the yarn space was set to 1 mm. This filter cartridge had a considerably shortened filter life more than that of the filter prepared in Example 1. Further, bubbling was observed in the initial filtrate.

Comparative Example 2

A cylindrical filter cartridge was obtained by the same method as in Example 1, except that a filter paper No. 1 prescribed in JIS P 3801 which was cut to a width of 50 mm was substituted for the strip of filament nonwoven. This filter cartridge had an initial trapped particle diameter of the same degree as in Example 1, but the initial pressure loss was large, and the filter life was extremely short.

Comparative Example 3

A filament nonwoven having a fineness of 5 dtex and a mass per unit area of 50 g/m$^2$ was slit to a width of 25 cm and wound around the same second filtration layer as in Example 1 in a layer form at a linear pressure of 1.5 kg/m to obtain a cylindrical filter cartridge. This filter cartridge had an initial trapped particle diameter of the same degree as in Example 1, but it had an inferior water permeability and a short filter life.

TABLE 1

| | Long fiber nonwoven used for first filter layer | | | | | | Processing of nonwoven | | |
|---|---|---|---|---|---|---|---|---|---|
| | Mass per unit area (g/cm²) | Thickness (µm) | Fineness (dtex) | Bonding of intersection point | Resin | Slit width (mm) | Cross-sectional form | Number of pleat | Void rate (%) |
| Example 1 | 22 | 200 | 2 | Embossing | PP | 50 | Converged | — | 90 |
| Example 2 | 22 | 200 | 2 | Embossing | PP | 10 | Converged | — | 90 |
| Example 3 | 22 | 200 | 2 | Embossing | LLDPE/PP | 50 | Converged | — | 90 |
| Example 4 | 22 | 200 | 2 | TA | LLDPE/PP | 50 | Converged | — | 90 |
| Example 5 | 22 | 200 | 10 | Embossing | PP | 50 | Converged | — | 90 |
| Example 6 | 22 | 200 | 2 | Embossing | PP | 50 | Twisted | — | — |
| Example 7 | 22 | 200 | 2 | Embossing | PP | 50 | FIG. 13 (A) | 4 | 90 |
| Example 8 | 22 | 200 | 2 | Embossing | PP | 50 | FIG. 13 (B) | 7 | 95 |
| Example 9 | 22 | 200 | 2 | Embossing | PP | 50 | FIG. 13 (C) | 15 | 90 |
| Example 10 | 22 | 200 | 2 | Embossing | PP | 50 | — | 41 | 91 |
| Example 11 | 22 | 200 | 2 | Embossing | PP | 50 | FIG. 13 (C) | 15 | 72 |
| Example 12 | 22 | 200 | 2 | Embossing | PP | 50 | Converged | — | 90 |
| Example 13 | 22 | 200 | 2 | Embossing | PP | 50 | Converged | — | 90 |
| Example 14 | 22 | 200 | 2 | Embossing | PP | 50 | Converged | — | 90 |
| Comparative Example 1 | | (PP spun yarn used) | | | PP | | (PP spun yarn used) | | |
| Comparative Example 2 | 22 | 200 | — | (Filter paper No. 1) | Cellulose | 15 | None | — | — |
| Comparative Example 3 | 22 | 200 | 2 | Embossing | PP | (250) | None | — | — |

TABLE 2

| | First filter layer | | | Second filter layer | |
|---|---|---|---|---|---|
| | Winding | | Initial trapped | | Initial trapped |
| | Yarn space (mm) | Filter void rate (%) | particle diameter (µm) | Form | particle diameter (µm) |
| Example 1 | 1 | 82 | 13 | Layer form | 5 |
| Example 2 | 1 | 81 | 12 | Layer form | 5 |
| Example 3 | 1 | 81 | 12 | Layer form | 5 |
| Example 4 | 1 | 82 | 13 | Layer form | 5 |
| Example 5 | 1 | 83 | 30 | Layer form | 5 |
| Example 6 | 1 | 81 | 13 | Layer form | 5 |
| Example 7 | 1 | 82 | 11 | Layer form | 5 |
| Example 8 | 1 | 82 | 11 | Layer form | 5 |
| Example 9 | 1 | 82 | 10.5 | Layer form | 5 |
| Example 10 | 1 | 82 | 10.0 | Layer form | 5 |
| Example 11 | 1 | 83 | 30 | Layer form | 5 |
| Example 12 | 1 | 82 | 13 | Winding form | 5 |
| Example 13 | 1 | 82 | 13 | Wrinkle folding | 1 |
| Example 14 | 1 | 82 | 13 | Cylinder | 10 |
| Comparative Example 1 | 1 | 76 | 18 | Layer form | 5 |
| Comparative Example 2 | 1 | 72 | 11 | Layer form | 5 |
| Comparative Example 3 | — | 80 | 12 | Layer form | 5 |

| | Filtering performance of filter | | | | |
|---|---|---|---|---|---|
| | Initial trapped particle diameter (µm) | Initial pressure loss (MPa) | Trapped particle diameter (µm) in 0.2 MPa | Filter life (minute) | Bubbling | Fiber falling |
| Example 1 | 5 | 0.003 | 5 | 20 | ○ | ○ |
| Example 2 | 5 | 0.003 | 5 | 20 | ○ | ○ |
| Example 3 | 5 | 0.003 | 5 | 30 | ○ | ○ |
| Example 4 | 5 | 0.003 | 5 | 25 | ○ | ○ |
| Example 5 | 5 | 0.003 | 5 | 15 | ○ | ○ |
| Example 6 | 5 | 0.003 | 5 | 20 | ○ | ○ |
| Example 7 | 5 | 0.004 | 5 | 20 | ○ | ○ |
| Example 8 | 5 | 0.003 | 5 | 25 | ○ | ○ |
| Example 9 | 5 | 0.003 | 5 | 27 | ○ | ○ |
| Example 10 | 5 | 0.003 | 5 | 30 | ○ | ○ |
| Example 11 | 5 | 0.003 | 5 | 15 | ○ | ○ |
| Example 12 | 5 | 0.002 | 5 | 20 | ○ | ○ |
| Example 13 | 1 | 0.001 | 5 | 20 | ○ | ○ |

TABLE 2-continued

| | | | | | | |
|---|---|---|---|---|---|---|
| Example 14 | 10 | 0.001 | 5 | 35 | ○ | ○ |
| Comparative Example 1 | 5 | 0.003 | 5 | 10 | x | Δ |
| Comparative Example 2 | 5 | 0.006 | 5 | 8 | ○ | Δ |
| Comparative Example 3 | 5 | 0.004 | 5 | 10 | ○ | ○ |

Shown below are examples of a filter cartridge prepared by winding a strip of filament nonwoven having an aperture part according to the second invention of the present invention.

Example 15

Used as an original nonwoven was a nonwoven obtained by forming a card web comprising a mixture of 60% by weight of a polypropylene fiber having a fineness of 3.1 dtex and a fiber length of 51 mm and 40% by weight of a rayon having a fineness of 1.8 dtex and a fiber length of 38 mm and then setting an area ratio of a hot compression-bonded part to 15% by means of a hot embossing roll pressing machine. Round aperture parts were formed in the original nonwoven described above by a punching method, and then it was slit to obtain an aperture part-containing strip of nonwoven having a width of 45 mm, a mass per unit area of 30 g/m² and an aperture part area ratio of 7%. The aperture part-containing strip of nonwoven described above was passed through a pleat-forming guide shown in FIG. 11 and wound around a polypropylene-made perforated cylinder having a minor diameter of 30 mm, a major diameter of 34 mm and a length of 250 mm in a twill form to produce a filter cartridge having a major diameter of 63 mm, a length of 250 mm, a void rate of 82% in a filtration layer, a pleat number of 5 and a yarn space of 1.0 mm.

The measurement results of the filtering performance are shown in Table 3. This filter cartridge had a trapped particle diameter of about 15 μm, and the water permeability and the other filtering performances were good. In particular, the filter was less reduced in a filtering accuracy in a rise in the pressure and excellent in a filter life.

Example 16

Used as an original nonwoven was an aperture-containing nonwoven obtained by forming a card web comprising a mixture of 70% by weight of a sheath-core composite fiber having a fineness of 3.2 dtex and a fiber length of 51 mm comprising a high density polyethylene as a sheath component and a polypropylene as a core component and 30% by weight of a cotton having a fineness of 2.2 dtex and a fiber length of 18 to 36 mm, then sticking it with a needle to thereby partially form a round aperture part and thermally bonding fiber intersections by means of a hot blast through-air heater. The aperture part-containing nonwoven described above was slit to obtain an aperture part-containing strip of nonwoven having a width of 45 mm, a mass per unit area of 28 g/m² and an aperture part area ratio of 10%. The aperture part-containing strip of nonwoven described above was twisted by 30 rounds/meter, and then a filter cartridge having a major diameter of 63 mm, a length of 250 mm, a void rate of 81% in a filtration layer, a pleat number of 8 and a yarn space of 1.2 mm was produced by the same production process as in Example 15.

The measurement results of the filtering performance are shown in Table 3. This filter cartridge had a trapped particle diameter of about 14 μm, and the water permeability and the other filtering performances were good. In particular, the filter was less reduced in a filtering accuracy in a rise in the pressure and excellent in a filter life.

Example 17

Used as an original nonwoven was a spun-laid nonwoven comprising a sheath-core composite fiber comprising a low density polyethylene as a sheath component and a polyethylene terephthalate as a core component and which had a fineness of 2.8 dtex and an embossing hot compression-bonded surface area of 12% to prepare an aperture part-containing strip of nonwoven having a slit width of 40 mm, a mass per unit area of 21 g/m² and an aperture part area ratio of 15% by the same opening method as in Example 15. Further, the same production process and perforated cylinder as in Example 15 were used to produce a filter cartridge having a major diameter of 63 mm, a length of 250 mm, a void rate of 81% in a filtration layer, a pleat number of 10 and a yarn space of 1.1 mm.

The measurement results of the filtering performance are shown in Table 3. This filter cartridge was further more excellent in a filter life than the filters prepared in Example 15 and Example 16 because of an increase in an aperture part area ratio of the strip of nonwoven and a pleat number, and it was a filter suited to uses in which bubbling had to be avoided.

Example 18

Used as an original nonwoven was a spun-laid nonwoven comprising a sheath-core composite fiber comprising linear a low density polyethylene as a sheath component and a polypropylene as a core component and which had a fineness of 2.0 dtex and an embossing hot compression-bonded surface area of 14 to prepare an aperture part-containing strip of nonwoven having a slit width of 50 mm, a mass per unit area of 18 g/m² and an aperture part area ratio of 28% by the same opening method as in Example 15. The aperture part-containing strip of nonwoven described above was twisted by 25 rounds/meter, and then the same production process and perforated cylinder as in Example 15 were used to produce a filter cartridge having a major diameter of 63 mm, a length of 250 mm, a void rate of 80% in a filtration layer, a pleat number of 14 and a yarn space of 1.5 mm.

The measurement results of the filtering performance are shown in Table 3. This filter cartridge was excellent in a filter life as was the case with Example 17, and it was a filter suited to uses in which bubbling had to be avoided.

Example 19

Used as an original nonwoven was a nonwoven prepared by subjecting a polypropylene-made spun-laid nonwoven having a fineness of 2.4 dtex and a mass per unit area of 15 g/m² and a polypropylene-made melt blown nonwoven having a fineness of 0.16 dtex and a mass per unit area of 10 g/m² to embossing thermal compression bonding (thermal compression bonding area ratio: 14%) to prepare an aperture part-containing strip of nonwoven having a slit width of 45 mm, a mass per unit area of 20 g/m² and an aperture part area ratio of 20% by the same opening method as in Example 15. The aperture part-containing strip of nonwoven described above was twisted by 25 rounds/meter, and then the same production process and perforated cylinder as in Example 15 were used to produce a filter cartridge having a major diameter of 63 mm, a length of 250 mm, a void rate of 80% in a filtration layer, a pleat number of 14 and a yarn space of 1.4 mm.

The measurement results of the filtering performance are shown in Table 3. This filter cartridge was increased in a filtering accuracy by virtue of the melt blown nonwoven having a small fiber diameter but excellent as well in a water permeability and a filter life, and it was a filter suited to uses in which bubbling had to be avoided.

Example 20

A polypropylene-made melt blown nonwoven having a fineness of 0.10 dtex, a mass per unit area of 10 g/m² and a width of 250 mm was wound around the same perforated cylinder as in Example 15 by 2 rounds. The same strip of nonwoven as used in Example 18 was twisted by 25 rounds/meter and then wound on the outside thereof in twill form by the same production process as in Example 15 to produce a filter cartridge having a major diameter of 63 mm, a length of 250 mm, a void rate of 79% in a filtration layer, a pleat number of 14 and a yarn space of 1.6 mm.

The measurement results of the filtering performance are shown in Table 3. This filter cartridge was increased in a filtering accuracy because the broad melt blown nonwoven was wound in the internal layer but excellent as well in a water permeability and a filter life, and it was a filter suited to uses in which bubbling had to be avoided.

Comparative Example 4

A polypropylene-made spun yarn having a diameter of 2 mm obtained by spinning staple fibers having a fineness of 3 dtex and a fiber length of 51 mm was wound around the same perforated cylinder as in Example 15 in a twill form to produce a filter cartridge having a major diameter of 63 mm, a length of 250 mm, a void rate of 80% in a filtration layer and a yarn space of 1.5 mm.

The measurement results of the filtering performance are shown in Table 3. This filter cartridge had a good water permeability but was roughened in a filtering accuracy in 0.2 MPa. In addition thereto, it was inferior in bubbling and fiber falling.

Comparative Example 5

The same original nonwoven as used in Example 16 was slit to a width of 45 mm without providing an aperture part and twisted by 200 rounds/meter, and then it was wound around the same perforated cylinder as in Example 1 in a twill form to produce a filter cartridge having a major diameter of 63 mm, a length of 250 mm, a void rate of 79% in a filtration layer and a yarn space of 1.2 mm.

The measurement results of the filtering performance are shown in Table 3. This filter cartridge had almost the same filtering accuracy, bubbling and fiber falling as in Example 16 but was inferior in a water permeability and a filter life.

Comparative Example 6

The same original nonwoven as used in Example 19 was slit to a width of 200 mm without providing an aperture part and wound around the same perforated cylinder as in Example 15 in a twill form as it remained broad to produce a filter cartridge having a major diameter of 63 mm, a length of 250 mm and a void rate of 76% in a filtration layer.

The measurement results of the filtering performance are shown in Table 3. This filter cartridge had almost the same initial trapped particle diameter, bubbling and fiber falling as in Example 20 but was inferior in a water permeability and a filter life.

TABLE 3

| Example No. | Initial pressure loss (MPa) | Initial trapped particle diameter (μm) | Trapped particle diameter (μm) in 0.2 MPa | Filter life (minute) | Bubbling | Fiber falling |
|---|---|---|---|---|---|---|
| Example 15 | 0.003 | 15 | 17 | 322 | x | o |
| Example 16 | 0.003 | 14 | 15 | 336 | x | o |
| Example 17 | 0.002 | 14 | 16 | 369 | o | o |
| Example 18 | 0.003 | 13 | 14 | 357 | o | o |
| Example 19 | 0.004 | 12 | 14 | 318 | o | o |
| Example 20 | 0.005 | 10 | 11 | 287 | o | o |
| Comparative Example 4 | 0.003 | 16 | 23 | 295 | x | x |
| Comparative Example 5 | 0.005 | 14 | 18 | 283 | x | o |
| Comparative Example 6 | 0.007 | 11 | 12 | 231 | o | o |

Shown below are examples in the case of a filter cartridge in which an end face-sealed part was provided according to the third invention of the present invention.

Example 21

Used as a nonwoven was a polypropylene-made filament nonwoven obtained by a spun-laying process which had a mass per unit area of 22 g/m², a thickness of 200 μm and a fineness of 2 dtex and in which fiber intersections were thermally bonded by means of a hot embossing roll. Further, used as a perforated cylinder was a polypropylene-made injection-molded article which had a minor diameter of 30 mm, a major diameter of 34 mm and a length of 250 mm and in which 180 holes of 6 mm square were drilled. The filament nonwoven was slit to a width of 50 mm to obtain a strip of nonwoven. The strip of nonwoven was passed through a hole of a traverse guide provided in a winder and converged, and it was wound around the perforated cylinder at a winding number of 3.955 until the major diameter reached 60 mm to obtain a cylindrical filter cartridge. The end faces thereof were fused for 5 seconds by means of a hot plate having a surface temperature of 175° C. to obtain a filter cartridge shown in FIG. 4.

Example 22

A spun-laying spinning machine having a sheath-core type combined nozzle was used to spin a sheath-core composite spun-laid fiber comprising a low melting point polyester prepared by carrying out copolymerization using isophthalic acid as an acid component in addition to terephthalic acid as a low melting point component and polyethylene terephthalate as a high melting point component at a fineness of 2 dtex, and the fiber intersections thereof were thermally compression-bonded by means of a hot embossing roll to prepare a copolymerized polyester/polyethylene terephthalate-made sheath-core spun-laid nonwoven having a mass per unit area of 22 g/m² and a thickness of 200 μm. It was slit to a width of 5 cm to obtain a strip of nonwoven, which was wound around the same perforated cylinder as used in Example 21 on the same conditions as in Example 21 to prepare a cylindrical filter cartridge. The end faces thereof were fused for 5 seconds by means of a hot plate having a surface temperature of 165° C. to obtain a filter cartridge of the same type as shown in FIG. 4. This filter cartridge was further excellent in a sealing property as compared with the filter cartridge prepared in Example 21. This is considered to be attributable to the fact that the sheath-core composite fiber was used for the fiber, so that the nonwoven was improved in an adhesive property, and an elasticity of the end face-sealed part was elevated more.

Example 23

Used was a sheath-core composite spun-laid fiber having a fineness of 2 dtex, a mass per unit area of 22 q/m² and a thickness of 200 μm comprising a linear low density polyethylene as a low melting point component and a polypropylene as a high melting point component. It was slit to a width of 5 cm to obtain a strip of nonwoven, which was wound around the same perforated cylinder as used in Example 21 on the same conditions as in Example 21 to prepare a cylindrical filter cartridge. The end faces thereof were fused for 3 seconds by means of a hot plate having a surface temperature of 150° C. to obtain a filter cartridge of the same type as shown in FIG. 4. This filter cartridge was further excellent in a sealing property as compared with the filter cartridges prepared in Examples 21 and 22. This is considered to be attributable to the fact that the sheath-core composite fiber of linear low density polyethylene/polypropylene was excellent in an adhesive property, so that an elasticity of the end face-sealed part was elevated more.

Example 24

Used was a conventional melt-spinning machine to produce a sheath-core composite staple fiber comprising a linear low density polyethylene and a polypropylene having a fineness of 2 dtex, a cut length of 51 mm and a crimp number of 14. The staple fiber was processed into a web having a mass per unit area of 22 g/m² by means of a card machine, and the fiber intersections thereof were thermally compression-bonded by means of a hot embossing roll to prepare a staple nonwoven having a thickness of 200 μm. Winding and fusing of the end faces were carried out to obtain a filter cartridge of the same type as shown in FIG. 4, except that this nonwoven was used. A little bubbling was observed in an initial filtrate in this filter, and it had a little larger maximum passing particle diameter than in Example 23, but it was a filter having almost the same performance as in Example 23 in the other performances.

Example 25

A filter cartridge was obtained by the same method as in Example 23, except that a width of the strip of nonwoven was changed to 1 cm, and the winding number was changed to 3.964. This filter cartridge had almost the same filtering performance as in Example 23, but a winding time of the filter was extended.

Example 26

A filter cartridge was obtained by the same method as in Example 23, except that a width of the strip of nonwoven was changed to 8 cm, and the winding number was changed to 3.929. This filter cartridge had a little larger maximum passing particle diameter than in Example 23, but a sealing property of the end face was good.

Example 27

Used was a sheath-core composite spun-laid nonwoven having a fineness of 2 dtex, a mass per unit area of 22 g/m² and a thickness of 200 μm comprising a linear low density polyethylene as a low melting point component and a polypropylene as a high melting point component. It was slit to a width of 5 cm to obtain a strip of nonwoven, which was wound around the same perforated cylinder as used in Example 21 on the same conditions as in Example 21 to prepare a cylindrical filter cartridge. The same nonwoven (the fabric before slitting) as the strip of nonwoven was fused on the end faces thereof for 3 seconds by means of a hot plate having a surface temperature of 150° C. to obtain a filter cartridge of the same type as shown in FIG. 4. This filter cartridge had almost the same properties as those of the filter prepared in Example 23.

Comparative Example 7

Used was a conventional melt-spinning machine to produce a staple fiber of polypropylene having a fineness of 2 dtex, a cut length of 51 mm and a crimp number of 14, and it was spun to produce a spun yarn. The spun yarn was wound around the same perforated cylinder as used in Example 21 at, a winding number of 3.098 to obtain a filter cartridge form. The end faces thereof were fused for 5 seconds by means of a hot plate having a surface temperature of 175° C. to prepare a filter cartridge. This filter cartridge had many irregularities on end faces and was short of elasticity in the end face-sealed part, so that it was inferior in a sealing property of the end faces.

The results thereof are shown together in Table 4.

Comparative Example 8

Used was a conventional melt-spinning machine to produce a sheath-core composite staple fiber comprising a linear low density polyethylene and a polypropylene having a fineness of 2 dtex, a cut length of 51 mm and a crimp number of 14, and it was spun to produce a spun yarn. The spun yarn was wound around the same perforated cylinder as used in Example 21 at a winding number of 3.098 to obtain a filter cartridge form. The end faces thereof were fused for 3 seconds by means of a hot plate having a surface temperature of 150° C. to prepare a filter cartridge. This filter cartridge was more excellent than the filter cartridge prepared in Comparative Example 7 but had many irregularities on end faces and was short of elasticity in the end face-sealed part, so that it was inferior in a sealing property of the end faces.

TABLE 4

| | Width of nonwoven (cm) | Kind of nonwoven | Structure of fiber cross section | Void rate of filter (%) | Maximum passed particle diameter (μm) | | Sealing property |
| --- | --- | --- | --- | --- | --- | --- | --- |
| | | | | | Adhesive none | Adhesive sealed | |
| Example 21 | 5 | SB | PP single component | 79 | 15 | 15 | ○ |
| Example 22 | 5 | SB | coPET/PET S/c | 71 | 15 | 15 | ○ |
| Example 23 | 5 | SB | LLDPE/PP S/c | 78 | 15 | 15 | ○ |
| Example 24 | 5 | Card | LLDPE/PP S/c | 78 | 17 | 17 | ○ |
| Example 25 | 1 | SB | LLDPE/PP S/c | 78 | 14 | 14 | ○ |
| Example 26 | 8 | SB | LLDPE/PP S/c | 78 | 15 | 15 | ○ |
| Example 27 | 5 | SB | LLDPE/PP S/c | 78 | 16 | 16 | ○ |
| Comparative Example 7 | (Spun yarn) | — | PP single component | 79 | 23 | 15 | x |
| Comparative Example 8 | (Spun yarn) | — | LLDPE/PP S/c | 78 | 22 | 15 | x |

SB: spun-laid nonwoven
PP: polypropylene
coPET: copolymerized polyester having a low melting point
PET: polyethylene terephthalate
LLDPE: linear low density polyethylene
S/C: composite fiber Shown below are examples in the case of a filter cartridge prepared by winding a strip of nonwoven having a tongue section part according to the fourth invention of the present invention.

Example 28

Used as an original nonwoven was a nonwoven having a mass per unit area of 28.1 g/m² prepared by a card method, which comprised 70% of a polypropylene fiber having a fineness of 2.1 dtex and 30% of a rayon fiber having a fineness of 2.4 dtex and in which 20% of a nonwoven area was thermally compression-bonded by means of a hot embossing roll. This original nonwoven was slit to a width of 4 cm and then passed through a space between a pressurized bladed roll and a rubber roll, whereby V type cuts shown in FIG. 32 (A) were provided at 80 spots per meter to prepare a tongue section part-containing strip of nonwoven having a tongue section part area ratio of 20%. Further, used as a perforated cylinder was a polypropylene-made injection-molded article having a minor diameter of 30 mm, a major diameter of 34 mm and a length of 250 mm. The tongue section part-containing strip of nonwoven was delivered so that a tip of the tongue section part was turned to a winding direction and wound around the perforated cylinder at a spindle rotation number of 800 rpm until the major diameter reached 62 mm to obtain a filter cartridge having a yarn space of 1.2 mm and a void rate of 81% in a filtration layer. The measurement results of the filtering performance are shown in Table 5. The filtering accuracy (2) was elevated, and the filter life was improved as compared with that in Comparative Example 9 in which a spun yarn was used. Further, fiber falling was reduced as well.

Example 29

Used as an original nonwoven was a nonwoven having a mass per unit area of 25.3 g/m² prepared by a card method, which comprised 40% of a sheath-core composite fiber having a fineness of 2.2 dtex and a sheath core ratio of 5:5 and comprising a high density polyethylene as a sheath component and a polypropylene as a core component and 60% by weight of a cotton having a fineness of 2.1 dtex and in which fiber intersections were thermally bonded by means of a hot air-through type heater. This original nonwoven was slit to a width of 4 cm, and then the bladed roll was exchanged in the same apparatus as used in Example 28, whereby V type cuts shown in FIG. 32(A) were provided at 100 spots per meter to prepare a tongue section part-containing strip of nonwoven having a tongue section part area ratio of 35%. Further, the same one as used in Example 1 was used as a perforated cylinder. The tongue section part-containing strip of nonwoven was delivered so that a tip of the tongue section part was turned to a winding direction and wound around the perforated cylinder at a spindle rotation number of 800 rpm until the major diameter reached 62 mm to obtain a filter cartridge having a yarn space of 1.0 mm and a void rate of 83% in a filtration layer. The measurement results of the filtering performance are shown in Table 5. An increase in a void rate in the filtration layer led to an increase in a trapping area of the filter, and the filter life was elevated more than that of the filter shown in Example 28. Further, processing by means of the hot air-through type heater increased the hot bonded points, so that falling of the fibers was reduced as compared with Example 28.

Example 30

Used as an original nonwoven was a nonwoven having a mass per unit area of 20.3 g/m² prepared by a spun-laying method, which comprised 100% of a sheath-core composite fiber having a fineness of 2.4 dtex and a sheath core ratio of 5:5 and comprising a high density polyethylene as a sheath component and a polyester as a core component and in which 15% of the nonwoven area was thermally compression-bonded by means of a hot embossing roll. This original nonwoven was slit to a width of 5 cm, and then the bladed roll was exchanged in the same apparatus as used in Example 28, whereby V type cuts shown in FIG. 31(B) were provided at 100 spots per meter on both sides of the nonwoven to prepare a tongue section part-containing strip of nonwoven having a tongue section part area ratio of 40%. Further, the same one as used in Example 28 was used as a perforated cylinder. The tongue section part-containing strip of nonwoven was delivered so that a tip of the tongue section part was turned to a winding direction and wound around the perforated cylinder at a spindle rotation number of 800 rpm until the major diameter reached 62 mm to obtain a filter cartridge having a yarn space of 1.3 mm and a void rate of 82% in a filtration layer. The measurement results of the filtering performance are shown in Table 5. Bubbling was inhibited by using the filament nonwoven prepared by the spun-laying method, and falling of the fibers was reduced as compared with Example 28.

Example 31

Used as an original nonwoven was a nonwoven having a mass per unit area of 22.3 g/m² prepared by a spun-laying method, which comprised 100% of a sheath-core composite fiber having a fineness of 2.0 dtex and a sheath core ratio of 5:5 and comprising a linear low density polyethylene as a sheath component and a polypropylene as a core component and in which 12% of the nonwoven area was thermally compression-bonded by means of a hot embossing roll. This original nonwoven was slit to a width of 5 cm, and then the same cuts were provided by means of the same apparatus as used in Example 30 to prepare a tongue section part-containing strip of nonwoven having a tongue section part area ratio of 40%. Next, this tongue section part-containing strip of nonwoven was subjected to a twisting machine and wound to thereby prepare a converged matter having a twisting number of 80 rounds/meter. Further, the same one as used in Example 28 was used as a perforated cylinder. The tongue section part-containing strip of nonwoven was delivered so that a tip of the tongue section part was turned to a winding direction and wound around the perforated cylinder at a spindle rotation number of 800 rpm until the major diameter reached 62 mm to obtain a filter cartridge having a yarn space of 1.5 mm and a void rate of 83% in a filtration layer. The measurement results of the filtering performance are shown in Table 5. An effect exerted by the tongue section part was elevated by twisting, and the filter life was improved more than in Example 30.

Example 32

Used as an original nonwoven was a nonwoven which was prepared by laminating a nonwoven having a mass per unit area of 12 g/m² prepared by a spun-laying method, comprising 100% of a polypropylene fiber having a fineness of 2.4 dtex on both sides of a nonwoven having a mass per unit area of 6 g/m² prepared by a melt blowing method, comprising 100% of a polypropylene fiber having a fineness of 0.06 dtex and in which 12% of this laminated nonwoven area was thermally compression-bonded by means of a hot embossing roll. This original nonwoven was slit to a width of 5 cm, and then the same cuts were provided by means of the same apparatus as used in Example 29 to prepare a tongue section part-containing strip of nonwoven having a tongue section part area ratio of 35%. Next, this tongue section part-containing strip of nonwoven was subjected to a twisting machine and wound to thereby prepare a converged matter having a twisting number of 60 rounds/meter. Further, the same one as used in Example 1 was used as a perforated cylinder. The tongue section part-containing strip of nonwoven was delivered so that a tip of the tongue section part was turned to a winding direction and wound around the perforated cylinder at a spindle rotation number of 800 rpm until the major diameter reached 62 mm to obtain a filter cartridge having a yarn space of 1.3 mm and a void rate of 82% in a filtration layer. The measurement results of the filtering performance are shown in Table 5. The fibers having a small fineness were contained in the nonwoven, so that the filtering accuracy was elevated more than in Example 30. An effect exerted by the tongue section part was elevated by twisting, and the filter life close to that in Example 30 was shown.

Example 33

Used was the same tongue section part-containing strip of nonwoven as in Example 31. Next, this tongue section part-containing strip of nonwoven was subjected to a twisting machine and wound to thereby prepare a converged matter having a twisting number of 80 rounds/meter. Further, the same one as used in Example 28 was used as a perforated cylinder. First, a wide nonwoven prepared by a melt blowing method, comprising a polypropylene fiber having a fineness of 0.1 dtex and a mass per unit area of 24.8 g/m² was wound around the perforated cylinder by two rounds. Then, the tongue section part-containing strip of nonwoven-converged matter obtained in Example 31 was delivered thereon so that a tip thereof was turned to a winding direction and wound around the perforated cylinder at a spindle rotation number of 800 rpm until the major diameter reached 62 mm to obtain a filter cartridge having a yarn space of 1.5 mm and a void rate of 83% in a filtration layer. The measurement results of the filtering performance are shown in Table 5. The filtering accuracy was elevated by interposing the nonwoven having a small fineness into the inner layer, but the same filter life as in Comparative Example 9 in which the 1-5 filtering accuracy was considerably low was shown by virtue of an effect of the tongue section part exerted by using the twisted tongue section part-containing strip of nonwoven.

Comparative Example 9

A spun yarn of 1078 tex comprising 100% of a polypropylene fiber having a fineness of 2.2 dtex was used in place of the tongue section part-containing strip of nonwoven, and it was wound around the same perforated cylinder as used in Example 28 at a spindle rotation number of 800 rpm until the major diameter reached 62 mm to obtain a filter cartridge having a yarn space of 1.0 mm and a void rate of 82% in a filtration layer. The measurement results of the filtering performance are shown in Table 5. Both of the filtering accuracy (1) and the filtering accuracy (2) are low, and a difference thereof is large, so that the fractionating property is inferior. Further, bubbling and falling of the filter were increased very much.

Comparative Example 10

The original nonwoven used in Example 28 was slit to a width of 4 cm and wound around the same perforated cylinder as used in Example 28 at a spindle rotation number of 800 rpm until the major diameter reached 62 mm to obtain a filter cartridge having a yarn space of 1.0 mm and a void rate of 80% in a filtration layer. The measurement results of the filtering performance are shown in Table 5. The filtering accuracy (1) was equivalent to that in Example 28, but the fractionating property was inferior, and the filter life was inferior as well.

Comparative Example 11

Used as an original nonwoven was a nonwoven having a mass per unit area of 24.5 g/m² prepared by a card method, which comprised 20% of a sheath-core composite fiber having a fineness of 2.2 dtex and a sheath core ratio of 5:5 and comprising a high density polyethylene as a sheath component and a polypropylene as a core component and 80% by weight of a cotton having a fineness of 2.1 dtex and in which fiber intersections were thermally bonded by means of a hot air-through type heater. This original nonwoven was processed by the same production process as in Example 29 to prepare a tongue section part-containing strip of nonwoven having the same ratio of tongue section part area. Next, this tongue section part-containing strip of nonwoven was subjected to a twisting machine and wound to thereby prepare a converged matter having a twisting number of 180 rounds/meter. Further, the same one as used in Example 28 was used as a perforated cylinder. The tongue section part-containing strip of nonwoven was delivered so that a tip of the tongue section part was turned to a winding direction and wound around the perforated cylinder at a spindle rotation number of 800 rpm until the major diameter reached 62 mm to obtain a filter cartridge having a yarn space of 1.7 mm and a void rate of 77% in a filtration layer. The measurement results of the filtering performance are shown in Table 5. Twisting too much reduced a void rate of the converged matter, increased the initial pressure loss more than in Example 29 and reduced the filtering accuracy (2). Also, the filter life was inferior as well. Further, because of a small proportion of the thermoplastic fiber, fiber falling was increased, and bubbling was increased as well by virtue of an effect exerted by a fiber finishing agent contained in cotton.

nonwoven described above was slit to widths of 30 mm and 20 mm to obtain strip of filament nonwovens. The respective strip of filament nonwovens were wound as they were around the perforated cylinder at the same time at a spindle initial speed of 1500 rpm by means of a winder until the major diameter reached 62 mm while controlling a winding number at 3.273 so that a gap between the strip of filament nonwovens became 0 mm to obtain a cylindrical filter cartridge 5 shown in FIG. 36. The constitution of the filter cartridge and the measurement results of the filtering performances are shown in Table 6. A trapped particle diameter in this filter cartridge was about 8 μm, and the water permeability and the other filtering performances were good. In particular, the filter cartridge was less reduced in a filtering accuracy in a rise in pressure and excellent in a filter life.

Example 35

A filter cartridge was obtained by the same process as in Example 34, except that total 4 fabrics of each two strip of filament nonwovens having widths of 30 mm and 20 mm were wound as they were around the perforated cylinder at the same time while controlling a winding number at 3.714. The constitution of the filter cartridge and the measurement results of the filtering performances are shown in Table 6. This filter cartridge had such filtering performance that an increase in the number of the strip of filament nonwoven resulted in more roughened accuracy than in Example 34.

Example 36

A filter cartridge was obtained by the same process as in Example 34, except that the winding number was controlled to 4.429. The constitution of the filter cartridge and the

TABLE 5

| Example No. | Initial pressure loss (MPa) | Filtering accuracy (1) (μm) | Filtering accuracy (2) (μm) | Filter life (minute) | Bubbling | Fiber falling |
|---|---|---|---|---|---|---|
| Example 28 | 0.003 | 15 | 28 | 186 | Δ | ○ |
| Example 29 | 0.003 | 14 | 25 | 197 | Δ | ◎ |
| Example 30 | 0.003 | 16 | 22 | 211 | ○ | ◎ |
| Example 31 | 0.003 | 16 | 20 | 220 | ○ | ◎ |
| Example 32 | 0.004 | 12 | 19 | 208 | ○ | ○ |
| Example 33 | 0.005 | 8 | 15 | 152 | ○ | ○ |
| Comparative Example 9 | 0.003 | 17 | 41 | 158 | x | x |
| Comparative Example 10 | 0.004 | 16 | 35 | 154 | Δ | ○ |
| Comparative Example 11 | 0.005 | 14 | 37 | 167 | x | x |

Shown below are examples in the case of a filter cartridge prepared by winding two or more strip of nonwovens at the same time according to the fifth invention of the present invention.

Example 34

Used as a filament nonwoven was a polypropylene-made spun-laid nonwoven which had a mass per unit area of 22 g/m², a thickness of 200 μm and a fineness of 2 dtex and in which fiber intersections were thermally compression-bonded by means of a hot embossing roll. Further, used as a perforated cylinder was a polypropylene-made injection-molded article which had a minor diameter of 30 mm, a major diameter of 34 mm and a length of 250 mm and in which 180 holes of 6 mm square were drilled. The filament measurement results of the filtering performances are shown in Table 6. This filter cartridge had such filtering performance that a change in the winding number resulted in the accuracy which was more roughened than in Example 34.

Example 37

A filter cartridge was obtained by the same process as in Example 34, except that the winding number was controlled to 4.273 and that four strip of filament nonwovens having a width of 40 mm were wound as they were around the perforated cylinder at the same time. The constitution of the filter cartridge and the measurement results of the filtering performances are shown in Table 6. This filter cartridge had such filtering performance that an expansion in a width of the strip of filament nonwoven and an increase in the number of the strip of filament nonwoven resulted in the accuracy which was more roughened than in Example 34.

Example 38

A filter cartridge was obtained by the same process as in Example 34, except that the winding number was controlled to 3.476 and that two strip of filament nonwovens having a width of 3 mm were wound as they were around the perforated cylinder at the same time. The constitution of the filter cartridge and the measurement results of the filtering performances are shown in Table 6. This filter cartridge did not show a large difference in a filtering performance as compared with that in Example 34, but time required for winding was extended more than in Example 34.

Example 39

A cylindrical filter cartridge was obtained by the same process as in Example 36, except that a raw material resin for the filament nonwoven was changed to nylon 66. The constitution of the filter cartridge and the measurement results of the filtering performances are shown in Table 6. This filter cartridge had a filtering performance of almost the same degree as in the case of Example 36.

Example 40

A cylindrical filter cartridge was obtained by the same process as in Example 36, except that a raw material resin for the filament nonwoven was changed to polyethylene terephthalate. The constitution of the filter cartridge and the measurement results of the filtering performances are shown in Table 6. This filter cartridge had a filtering performance of almost the same degree as in the case of Example 36.

Example 41

A cylindrical filter cartridge was obtained by the same process as in Example 36, except that used as a constitutional fiber for the filament nonwoven was a sheath-core composite fiber comprising a high density polyethylene (melting point: 133° C.) as a low melting point component and a polypropylene (melting point: 165° C.) as a high melting point component in a weight ratio of 5:5. The constitution of the filter cartridge and the measurement results of the filtering performances are shown in Table 6. This filter cartridge had a higher accuracy than in the case of Example 36 and was such excellent in a filtering accuracy that the trapped particle diameter in 0.2 MPa was scarcely different from the initial trapped particle diameter.

Example 42

A cylindrical filter cartridge was obtained by the same process as in Example 41, except that a linear low density polyethylene (melting point: 122° C.) was used as a low melting point component. The constitution of the filter cartridge and the measurement results of the filtering performances are shown in Table 6. This filter cartridge had a filtering accuracy of the same degree as in the case of Example 41 and was more excellent in a water permeability than in Example 41.

Example 43

A cylindrical filter cartridge was obtained by the same process as in Example 42, except that a thermal compression bonding method for the fiber intersections was changed from a method using a hot embossing roll to a method using a through-air heater. The constitution of the filter cartridge and the measurement results of the filtering performances are shown in Table 6. This filter cartridge had an accuracy which was a little more roughened than in the case of Example 42.

Example 44

A cylindrical filter cartridge was obtained by the same process as in Example 36, except that a fineness of the filament nonwoven was changed to 10 dtex. The constitution of the filter cartridge and the measurement results of the filtering performances are shown in Table 6. This filter cartridge had an accuracy which was more roughened than in the case of Example 36.

Example 45

A cylindrical filter cartridge was obtained by the same process as in Example 36, except that a mass per unit area of the filament nonwoven was changed to 44 g/m². The constitution of the filter cartridge and the measurement results of the filtering performances are shown in Table 6. This filter cartridge had an accuracy which was rougher than in the case of Example 36 and stayed in the same degree as in the case of Example 35.

Comparative Example 12

A filter cartridge was obtained by the same process as in Example 34, except that one strip of filament nonwoven having a width of 50 mm was wound as it was around the perforated cylinder. The constitution of the filter cartridge and the measurement results of the filtering performances are shown in Table 6. This filter cartridge had the same filtering performance as in Example 34 but was inferior in a water permeability as well as a filter life.

Comparative Example 13

A cylindrical filter cartridge was obtained by the same process as in Comparative Example 12, except that the winding number was controlled to 4.429. The constitution of the filter cartridge and the measurement results of the filtering performances are shown in Table 6. This filter cartridge showed a filtering performance of almost the same degree as in comparative Example 12.

Comparative Example 14

A polypropylene-made spun yarn having a diameter of 2 mm prepared by spinning a fiber having a fineness of 3 dtex was used in place of the strip of filament nonwoven to obtain a filter cartridge by the same process as in Example 36. The constitution of the filter cartridge and the measurement results of the filtering performances are shown in Table 6. This filter cartridge had an initial trapped particle diameter which was considerably more roughened than in Example 36 and stayed in the same degree as in the case of Example 35. However, it was inferior in a water permeability as well as a filter life to those in the case of Example 35. Further, bubbling was present in the initial filtrate, and falling of the filter was observed.

Comparative Example 15

A cylindrical filter cartridge was obtained by the same process as in Example 36, except that a filter paper No. 1 prescribed in JIS P3801 which was cut to widths of 30 mm and 20 mm was used in place of the strip of filament nonwoven. The constitution of the filter cartridge and the measurement results of the filtering performances are shown in Table 6. This filter cartridge had an initial trapped particle diameter which was smaller than in the case of Example 36 and more roughened than in the case of Example 34. However, the initial pressure loss was large, and the trapped particle diameter in a rise in the pressure was different from the initial trapped particle diameter to a large extent. Further, the filter life was extremely shortened. Also, falling of the filter was found in the initial filtrate.

Comparative Example 16

A splittable staple fiber of an eight division type having a fineness of 4 dtex comprising polypropylene (melting point: 165° C.) and high density polyethylene (melting point: 133° C.) was turned into a web by means of a card machine and subjected to fiber splitting and hydroentangling by high pressure water to obtain a split staple nonwoven having a mass per unit area of 22 g/m². Observation of this nonwoven under an electron microscope and image analysis thereof resulted in finding that 50% by weight of the whole fibers was split into fibers having a fineness of 0.5 dtex. A cylindrical filter cartridge was obtained by the same process as in Example 36, except that this nonwoven was cut to widths of 30 mm and 20 mm and used in place of the strip of filament nonwoven. The constitution of the filter cartridge and the measurement results of the filtering performances are shown in Table 6. This filter cartridge had an initial trapped particle diameter which was smaller than in the case of Example 36, but the trapped particle diameter in 0.2 MPa stayed in the same degree. Further, a little bubbling was found in the initial filtrate, and falling of the filter was observed.

TABLE 6

| | Properties of strip of nonwoven | | | | | Structure of filter cartridge | | |
| --- | --- | --- | --- | --- | --- | --- | --- | --- |
| | Mass per unit area (g/m²) | Thickness (μm) | Fineness (dtex) | Bonding method of fiber intersections | Resin*1 for fiber | Slit width × number in strip of nonwoven (mm) | | Number of winding (round) |
| Example 34 | 22 | 200 | 2 | Embossing | PP | 30 × 1 | 20 × 1 | 3.273 |
| Example 35 | 22 | 200 | 2 | Embossing | PP | 30 × 2 | 20 × 2 | 3.714 |
| Example 36 | 22 | 200 | 2 | Embossing | PP | 30 × 1 | 20 × 1 | 4.429 |
| Example 37 | 22 | 200 | 2 | Embossing | PP | 40 × 4 | | 3.273 |
| Example 38 | 22 | 200 | 2 | Embossing | PP | 3 × 2 | | 3.476 |
| Example 39 | 22 | 200 | 2 | Embossing | Nylon 66 | 30 × 1 | 20 × 1 | 4.429 |
| Example 40 | 22 | 200 | 2 | Embossing | PET | 30 × 1 | 20 × 1 | 4.429 |
| Example 41 | 22 | 200 | 2 | Embossing | HDPE/PP | 30 × 1 | 20 × 1 | 4.429 |
| Example 42 | 22 | 200 | 2 | Embossing | LLDPE/PP | 30 × 1 | 20 × 1 | 4.429 |
| Example 43 | 22 | 200 | 2 | Air-through | LLDPE/PP | 30 × 1 | 20 × 1 | 4.429 |
| Example 44 | 22 | 200 | 10 | Embossing | PP | 30 × 1 | 20 × 1 | 4.429 |
| Example 45 | 44 | 400 | 2 | Embossing | PP | 15 × 1 | 10 × 1 | 4.429 |
| Comparative Example 12 | 22 | 200 | 2 | Embossing | PP | 50 × 1 | | 3.273 |
| Comparative Example 13 | 22 | 200 | 2 | Embossing | PP | 50 × 1 | | 4.429 |
| Comparative Example 14 | (Spun yarn was used) | | | | PP | | | 4.429 |
| Comparative Example 15 | 90 | 200 | — | — | Cellulose | 30 × 1 | 20 × 1 | 4.429 |
| Comparative Example 16 | 22 | 200 | 0.5 | — | HDPE/PP | 30 × 1 | 20 × 1 | 4.429 |

| | Filtering performance of filter cartridge | | | | | |
| --- | --- | --- | --- | --- | --- | --- |
| | Initial trapped particle diameter (μm) | Initial pressure loss (MPa) | Trapped particle diameter (μm) in 0.2 MPa | Filter life (minute) | Bubbling | Fiber falling |
| Example 34 | 8 | 0.010 | 9 | 75 | ○ | ○ |
| Example 35 | 18 | 0.003 | 19 | 660 | ○ | ○ |
| Example 36 | 13 | 0.003 | 14 | 225 | ○ | ○ |
| Example 37 | 30 | 0.001 | 30 | >1000 | ○ | ○ |
| Example 38 | 9 | 0.011 | 9 | 80 | ○ | ○ |
| Example 39 | 13 | 0.003 | 14 | 225 | ○ | ○ |
| Example 40 | 13 | 0.003 | 14 | 225 | ○ | ○ |
| Example 41 | 12 | 0.003 | 12 | 230 | ○ | ○ |
| Example 42 | 12 | 0.002 | 12 | 230 | ○ | ○ |
| Example 43 | 13 | 0.001 | 13 | 250 | ○ | ○ |
| Example 44 | 30 | 0.001 | 30 | >1000 | ○ | ○ |
| Example 45 | 17 | 0.003 | 18 | 650 | ○ | ○ |
| Comparative Example 12 | 8 | 0.013 | 9 | 60 | ○ | ○ |
| Comparative Example 13 | 8 | 0.013 | 9 | 55 | ○ | ○ |
| Comparative Example 14 | 18 | 0.005 | 22 | 300 | × | × |
| Comparative Example 15 | 11 | 0.022 | 20 | 30 | ○ | × |
| Comparative Example 16 | 10 | 0.010 | 13 | 80 | △ | × |

*1 Slashed(/) two kinds of resins show a resin of sheath component/core component Industrial Applicability As described above, the filter cartridge of the present invention is balanced in characteristics such as a liquid permeability, a filter life and stability in a filtering accuracy. Further, it is characterized by that bubbling is not observed in the filtrate.

What is claimed is:

1. A filter cartridge comprising a first filtration layer and a second filtration layer wherein the second filtration layer has an initial 80% trapped particle diameter that is 0.05 to 0.9 times as large as an initial 80% trapped particle diameter in the first filtration layer, and the first filtration layer is prepared by winding a strip of filament nonwoven in a twill form around the second filtration layer so as to make a cylindrical form ad wherein the strip of filament nonwoven formed by a spun-laying method comprises thermoplastic fiber and the thermoplastic fiber is aligned with longitudinal edges of the strip to produce openings having a length oriented alone a length of the strip and a width oriented between longitudinal edges of the strip wherein the length of the openings is substantially greater than the width of the openings.

2. The filter cartridge as described in claim 1, wherein the strip of filament nonwoven is turned into a pleated matter having 4 to 50 pleats and wound around a perforated cylinder in a twill form.

3. The filter cartridge as described in claim 2, wherein at least a part of the pleats of the pleated matter is arranged in non-parallel.

4. The filter cartridge as described in claim 2, wherein the pleated matter has a void rate of 60 to 95%.

5. The filter cartridge as described in claim 1, wherein the first filtration layer of the filter cartridge has a void rate of 65 to 90%.

6. The filter cartridge as described in claim 1; wherein the thermoplastic fiber is a thermally adherent composite fiber comprising a low melting point resin and a high melting point resin, difference in melting point between both resins being 10° C. or more.

7. The filter cartridge as described in claim 6, wherein the low melting point resin is a linear low density polyethylene and the high melting point resin is a polypropylene.

8. The filter cartridge as described in claim 1, wherein fiber intersections in the strip of nonwoven are bonded by thermal compression bonding by means of a hot embossing roll.

9. A filter cartridge as described in claim 1, wherein the strip of nonwoven has a width of 0.5 cm or more, and a product of a width cm and a mass per unit area (g/cm$^2$) of the strip of nonwoven is 200 or less.

* * * * *